United States Patent
Parham

(10) Patent No.: US 9,329,716 B2
(45) Date of Patent: May 3, 2016

(54) SYSTEM FOR PROJECTING CONTENT TO A DISPLAY SURFACE HAVING USER-CONTROLLED SIZE, SHAPE AND LOCATION/DIRECTION AND APPARATUS AND METHODS USEFUL IN CONJUNCTION THEREWITH

(71) Applicant: MUV INTERACTIVE LTD., Herzliya (IL)

(72) Inventor: Rami Parham, Beer Yaakov (IL)

(73) Assignee: MUV INTERACTIVE LTD., Herzliya (IL)

( * ) Notice: Subject to any disclaimer, the term of this patent is extended or adjusted under 35 U.S.C. 154(b) by 0 days.

(21) Appl. No.: 14/734,620

(22) Filed: Jun. 9, 2015

(65) Prior Publication Data

US 2015/0346892 A1 Dec. 3, 2015

Related U.S. Application Data

(63) Continuation of application No. 14/001,036, filed as application No. PCT/IL2011/000184 on Feb. 23, 2011, now abandoned.

(60) Provisional application No. 61/282,513, filed on Feb. 23, 2010.

(51) Int. Cl.
*G06F 3/041* (2006.01)
*G06F 3/01* (2006.01)
(Continued)

(52) U.S. Cl.
CPC .............. *G06F 3/0414* (2013.01); *G06F 3/014* (2013.01); *G06F 3/033* (2013.01); *G06F 3/0304* (2013.01);
(Continued)

(58) Field of Classification Search
CPC .. G06F 1/163; G06F 3/014; G06F 2203/0331
USPC .................................................. 345/156, 157
See application file for complete search history.

(56) References Cited

U.S. PATENT DOCUMENTS 4,988,981 A 1/1991 Zimmerman
5,285,287 A 2/1994 Shikama
(Continued)

FOREIGN PATENT DOCUMENTS

EP 1853062 11/2007
EP 1998572 12/2008
(Continued)

OTHER PUBLICATIONS

Riker, "Samsung Galaxy Beam: world's first Android projector phone", internet URL http://eee.engadget.com/2010/06/15/samsung-galaxy-beam-worlds-first-android-projector-phone-on-sa/, published Jun. 15, 2010.
(Continued)

*Primary Examiner* — Koosha Sharifi-Tafreshi
(74) *Attorney, Agent, or Firm* — Roach Brown McCarthy & Gruber, P.C.; Kevin D. McCarthy

(57) ABSTRACT

A system having a finger-wearable sleeve having an IR light-emitting diode (LED), an IR camera; and a controller associated with the IR camera. The controller is configured to communicate with a host computer that utilizes a visual content projector to project visual content onto the screen. And based on signals received from the IR camera (1) trigger a first input functionality in the host computer, wherein the first input functionality is based on a location on the screen where an IR beam from the IR laser impinges, and (2) trigger a second input functionality in the host computer, wherein the second input functionality is based on a location on the screen near where an IR beam from the IR LED is emitted.

23 Claims, 63 Drawing Sheets

(51) Int. Cl.
*G06F 3/0354* (2013.01)
*G06F 3/044* (2006.01)
*G06F 3/0486* (2013.01)
*G06F 3/0484* (2013.01)
*G06F 3/0488* (2013.01)
*G06F 3/0485* (2013.01)
*G06F 3/03* (2006.01)
*G06F 3/0346* (2013.01)
*G06F 3/038* (2013.01)
*G06F 3/042* (2006.01)
*H04N 9/31* (2006.01)
*G06F 3/033* (2013.01)

(52) U.S. Cl.
CPC ............ *G06F 3/0346* (2013.01); *G06F 3/0354* (2013.01); *G06F 3/0386* (2013.01); *G06F 3/03542* (2013.01); *G06F 3/03543* (2013.01); *G06F 3/03547* (2013.01); *G06F 3/044* (2013.01); *G06F 3/0425* (2013.01); *G06F 3/0485* (2013.01); *G06F 3/0486* (2013.01); *G06F 3/0488* (2013.01); *G06F 3/04842* (2013.01); *H04N 9/31* (2013.01); *G06F 2203/0331* (2013.01)

(56) References Cited

U.S. PATENT DOCUMENTS

| | | | |
|---|---|---|---|
| 5,453,759 | A | 9/1995 | Seebach |
| 5,760,771 | A | 6/1998 | Blonder |
| 6,128,004 | A | 10/2000 | McDowall |
| 6,198,485 | B1 | 3/2001 | Mack |
| 6,587,090 | B1 | 7/2003 | Jarra |
| 7,006,079 | B2 | 2/2006 | Kidode |
| 7,042,438 | B2 | 5/2006 | McRae |
| 7,057,604 | B2 | 6/2006 | Bajramovic |
| 7,134,080 | B2 * | 11/2006 | Kjeldsen ............... H04N 5/74 348/E5.137 |
| 2001/0044858 | A1 * | 11/2001 | Rekimoto ............. G06F 3/0317 710/1 |
| 2003/0020885 | A1 | 1/2003 | Suzuki |
| 2003/0048280 | A1 | 3/2003 | Russell |
| 2003/0137489 | A1 | 7/2003 | Bajramovic |
| 2003/0222849 | A1 | 12/2003 | Starkwater |
| 2003/0227437 | A1 | 12/2003 | Ramirez |
| 2005/0052412 | A1 * | 3/2005 | McRae ............... A63F 13/06 345/158 |
| 2006/0001646 | A1 | 1/2006 | Hai |
| 2006/0012567 | A1 | 1/2006 | Sicklinger |
| 2006/0181686 | A1 | 8/2006 | Matsuda |
| 2007/0013716 | A1 | 1/2007 | Kjeldsen |
| 2008/0042995 | A1 | 2/2008 | Li |
| 2008/0095468 | A1 | 4/2008 | Klemmer |
| 2008/0151198 | A1 | 6/2008 | Hine |
| 2008/0180395 | A1 * | 7/2008 | Gray ................. G06F 3/0346 345/157 |
| 2008/0317331 | A1 | 12/2008 | Winn |
| 2009/0160883 | A1 | 6/2009 | Sonobe |
| 2009/0278999 | A1 | 11/2009 | Ofune |
| 2009/0322680 | A1 * | 12/2009 | Festa ................. G06F 3/0346 345/160 |
| 2010/0188428 | A1 | 7/2010 | Shin |
| 2010/0199232 | A1 * | 8/2010 | Mistry ................. G06F 1/163 715/863 |

FOREIGN PATENT DOCUMENTS

| | | |
|---|---|---|
| GB | 2442973 | 4/2008 |
| WO | 0237466 | 5/2002 |
| WO | 2004055726 | 7/2003 |
| WO | 2009024971 | 2/2009 |
| WO | 2009125258 | 10/2009 |
| WO | 2010053260 | 5/2010 |
| WO | 2010064094 | 6/2010 |

OTHER PUBLICATIONS

Rahaman, "Medium Access Control for Power Line communications: An Overview of the IEEE 1901 and ITU-T G.hn Standards". IEEE, Jun. 2011, pp. 182-191.

European Office action for European Application No. 11712018.8, dated Jun. 12, 2014.

* cited by examiner

|   | Work mode | Active light source | Software operation mode |
|---|---|---|---|
| 1 | Touch interaction | Vertical IR led | Touch algorithm |
| 2 | Remote projected screen interaction | IR Laser | Mouse pad algorithm |
| 3 | Remote tangible screen interaction | Horizontal IR Led | Mouse pad algorithm |
| 4 | Laptop/Desktop computer interaction | Vertical IR Led | Mouse pad algorithm |
| 5 | Power point interaction | Red Laser | Passive algorithm |
| 6 | Surface interaction | IR Laser | Touch algorithm |
| 7 | Off | - | Stand off |

Fig. 5A

| Signal Type | From Device | Input Content |
|---|---|---|
| IR Events | IR Sensor | 1. IR positioning in space<br>2. Which light source created the signal<br>3. GMouse Unique Identifier (User ID)<br>4. GMouse Hand Identification (Left/Right) |
| RF Events | sleeve | 1. Event type<br>2. Sleeve Unique Identifier (User ID) |

| | | |
|---|---|---|
| (1) Before Action | | The mouse position on the computer screen, before the IR sensor reads any IR signals. |
| (2) IR Action | [B / A] | The user activates an IR source at point A, moves it all the way to point B and deactivates the IR source. |
| (3) Result | Pointer [B / A]<br>Absolute Possition [B / A] — Mouse UP<br>Touch [B / A] — Mouse Down<br>Mouse Pad | different Operation Modes are seen to lead to different results on the screen. only process that simulates a click is Touch process. only Mouse pad process took initial mouse position into consideration; Touch & absolute position processes just moved cursor to absolute position taken from IR. |

Fig. 7a

| | | |
|---|---|---|
| (1) Before Action | | earth as seen by Google Earth. |
| (2) IR Action | | IR action: rotating of IR positioning relative to each other and also increasing distance between points. |
| (3) Result | | Result: rotated and zoomed-in Earth. |

Fig. 7b

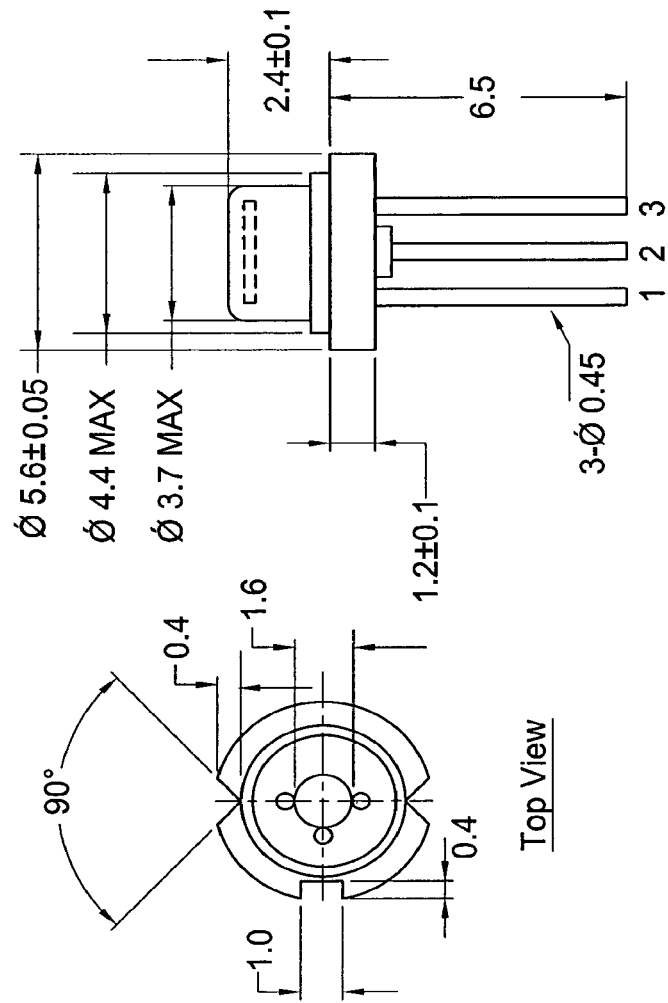
Fig. 8d
Fig. 8c
Top View
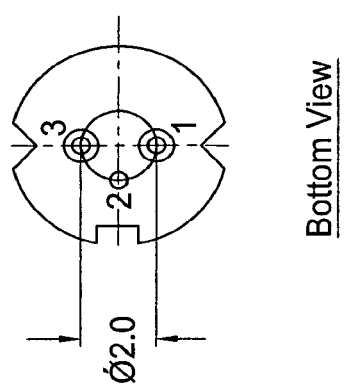
Bottom View
Fig. 8b

| Term | Description |
|------|-------------|
| ADC | Analog Digital Converter |
| COMM | Communication |
| DFD | Data Flow Diagram |
| HW | Hardware |
| IR | Infra Red |
| LED | Light Emitted Diode |
| LS | Light Source |
| MCU | Multipoint Control Unit |
| PC | Personal Computer |
| RF | Radio Frequency |
| SMD | Surface mount technology |
| SW | Software |
| USB | Universal Serial Bus |
| WM | Work Mode |

| Event name | Event code | Description |
|---|---|---|
| MLCL_D | 0x08 | Mouse Left Click of left hand – Down |
| MLCL_U | 0x28 | Mouse Left Click of left hand – Up |
| MRCL_D | 0x18 | Mouse Right Click of left hand – Down |
| MRCL_U | 0x38 | Mouse Right Click of left hand – Up |
| MLCR_D | 0x48 | Mouse Left Click of right hand – Down |
| MLCR_U | 0x68 | Mouse Left Click of right hand – Up |
| MRCR_D | 0x58 | Mouse Right Click of right hand – Down |
| MRCR_U | 0x78 | Mouse Right Click of right hand – Up |
| LSC_D_N | 0x80+N | Left Scroll Down by N positions |
| LSC_U_N | 0xA0+N | Left Scroll Up by N positions |
| RSC_D_N | 0xC0+N | Right Scroll Down by N positions |
| RSC_U_N | 0xD0+N | Right Scroll Up by N positions |

Fig. 9f:

| Term | Description |
|---|---|
| ADC | Analog Digital Converter |
| COMM | Communication |
| DFD | Data Flow Diagram |
| DLL | Dynamic-Link Library |
| HID | Human Interface Device |
| HID | Human Interface Device |
| HW | Hardware |
| IR | Infra Red |
| LED | Light Emitted Diode |
| LS | Light Source |
| MCU | Multipoint Control Unit |
| PC | Personal Computer |
| RF | Radio Frequency |
| SPI | Serial Peripheral Interface |
| SW | Software |
| TBD | To Be Defined |
| USB | Universal Serial Bus |
| WM | Work Mode |
| DMA | Direct Memory Access |

Fig. 15A
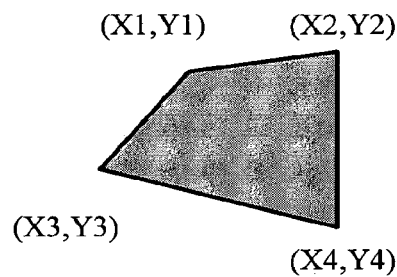
(X1,Y1) (X2,Y2)
(X3,Y3)
(X4,Y4)
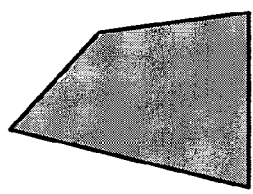 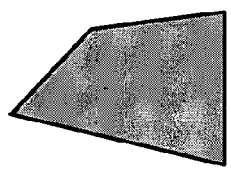 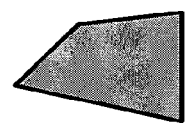 
Fig. 15B    Fig. 15C    Fig. 15D    Fig. 15E

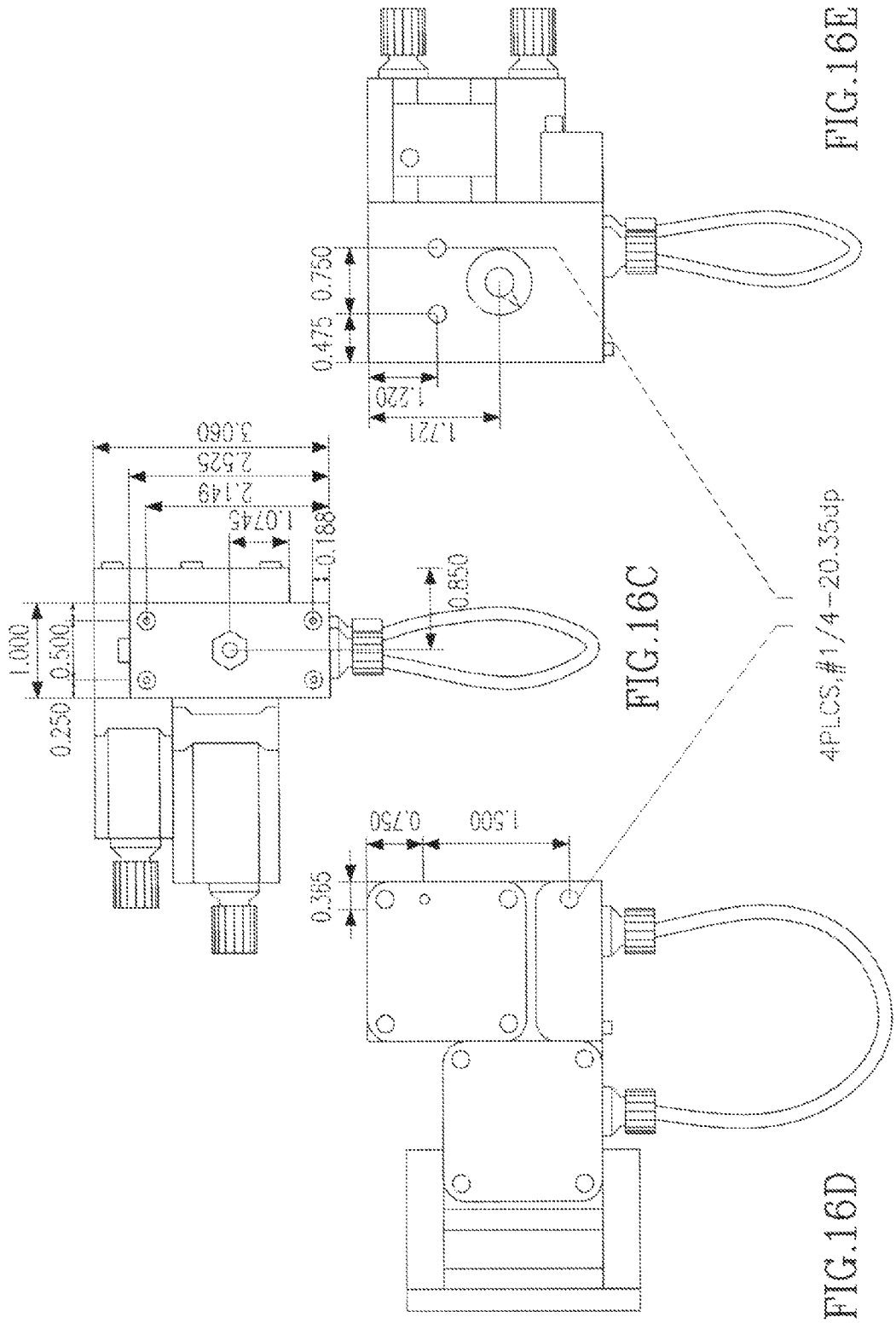

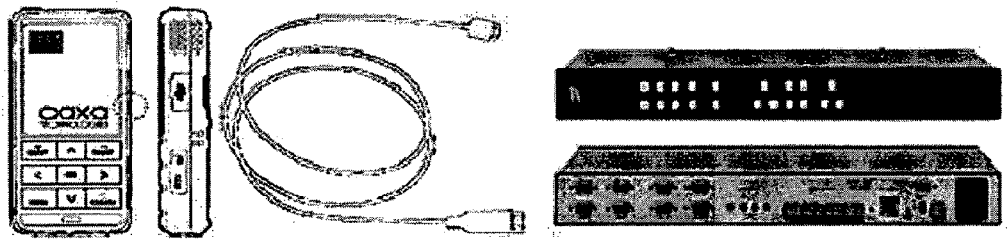

Fig. 20

Pan-Tilt Performance

|  | PTU-D46-17 | PTU-D46-70 | PTU-D46-17P70T |
|---|---|---|---|
| Rated Payload | 6 lbs (2.72 kg) | 9lbs (4.08 kg) | 9 lbs (4.08 kg) |
| Max Unloaded Speed (@ 30 VDC) | 300°/second | 60°/second | 300°/second (Pan) 60°/second (Tilt) |
| Resolution | 0.013° | 0.003° | Pan: 0.013° Tilt: 0.003° |

Fig. 21

Pan-Tilt Features

| Tilt Range | -47° to +31° from level (78° range) with extended range enabled for 80° down (111° range) |
|---|---|
| Pan Range | +/-159° (+/- 180° with extended range mode enabled) |
| Pan Speed Min | <min. resolution>/second |
| Tilt Speed Min | <min. resolution>/second |
| Duty Cycle | High duty cycle, or 3-5 million cycles |
| Acceleration/Deceleration | Trapezoidal. On-the-fly speed and position changes |

Step 2310: The agent is pointed to an area a user wants to project a screen to

Step 2320: The system waits for the user to define the 4 edge points (vertices) of the desired screen.

Step 2330: the user uses his input device, to touch one of the edge points, IR sensor captures that point's position and saves it as (X1,Y1).

Step 2340: The projection unit projects a visual feedback, a small blue dot for example, to point (X1, Y1) for user's convenience.

Step 2350: according to blue dot position the user may select, by touch, the next edge point, IR sensor captures that point's position and saves it (X2,Y2).

Step 2360: Step 2340 is repeated; now the user can see two blue points

Step 2370: The user defines, similarly, the next 2 edge points

Step 2390: The user saves the characteristic of this surface

Step 2395: From now on, when the user wants to move the screen on the same surface or change its size, the system may remember the relative angle of that surface and adjust accordingly

Fig. 24

2410: Drag the IR sensor unit to point to the TV. The functionality may be similar to the screen dragging functionality described herein, e.g using the IR laser located on the input device of Figs. 1a – 9f.

↓

2420: Once the IR sensor unit of the agent has been pointed at (say) the TV, e.g. as confirmed in a predetermined manner using a suitable user input device, the system save the pointed at direction e.g. as a vector parameter (x,y,z).

↓

2430: user tells the system where exactly the TV's IR sensor is. E.g. Touches IR sensor e.g. with a pointing finger or Points IR laser to the TV's IR sensor

↓

2440: the result is that an IR light is emitted from (or reflected from, if the laser is used) the TV's IR sensor.

↓

2450: The system saves that point as (X1,Y1). Having completed "set-up" steps 2410 – 2450, the system now has 2 parameters stored:

i. (x,y,z) - ii. (X1,Y1)

↓

2460: When the user wants to control TV (say) using projected remote control, the emitter unit of the agent apparatus is automatically directed to the vector direction saved at the setup stage (x,y,z). When user selects suitable input option, IR emitter unit emits the relevant information to point (X1,Y1) which is exactly where the TV's IR sensor is located.

FIG. 26a

2610: A user is working on an object, say a Word document called 'My business plan' on point X of the area.

↓

2620: After the user finishes working on the document, the user wants to move it to an object or virtual location, e.g. the 'My document' folder which is in position Y in the area.

↓

2630: The user moves the object 'My business plan' in the direction of the object 'My documents'.

↓

2640: While it is being moved, the Agent changes its encoding of its laser beams to 'move'.

↓

2650: Where an overall engine is created between the scopes of the two Agents, the controlling agent of the object 'My documents' understands that another Agent has moved to it a specific object and gives the user feedback of some sort – visual, audio etc.

↓

2660: After the user 'leaves' the object 'My business plan' in the territory of 'My documents' the processes of Fig. 26b occur

FIG. 26b a. The controlling Agent (termed herein No. 5 by way of example) on the object 'My document' emits an encoded laser signal which says 'I'm Agent number 5, please identify yourself'

↓ b. The Agent controlling the object 'My business plan' (termed herein No. 2 by way of example) emits an encoded laser signal which says 'I'm Agent number 2'.

↓ c. Agent No. 5 sends a message to the overall engine with the following command: 'save Agent number 2 in Agent number 5'.

↓ d. The overall engine, which, as stated, knows exactly which objects each Agent is projecting at any given time, sends the following message to the engine controlling the environment (like Windows): "Save the file 'My business plan' in the folder 'My document'".

FIG. 27A

2710: The borders of the projected object may be delineated by a number of scattered points of laser beams that come from the Agent.

↓

2720: When the Agent is alerted that the projected object is nearing the edge of its control it immediately sends out a switch request to all the other Agents. This request encompasses identification, description of the current position of the projected object and all other relevant information which may facilitate communication.

↓

2730: At the same time, the acting Agent delineates the borders of the projected object by specific encoding of the laser beams that were described in point 1.

↓

2740: The relevant Agent reacts to the message sent as described in point 2 (naturally, the Agent has to be available and in the appropriate position relative to the projected object).

↓

2750: If there are a number of Agents that are equally appropriate to all the conditions – the choice may be random.

FROM FIG. 27A

↓

2760: The chosen Agent focuses on the relevant object.

↓

2770: Simultaneously, the overall engine, which has full knowledge of which objects are being projected by which Agents at any given moment, alerts the replacement Agent which object it should be projecting.

↓

2780: The replacement Agent alerts the current Agent that it is ready to switch.

↓

2790: When the fields of vision of the two Agents overlap, the communication between them may be more complex both from direct wireless communication and from appropriate encoding of their laser beams.

↓

2795: At the end of this process, the controlling Agent stops projecting, and the replacement Agent starts to project the relevant object and turns into the controlling Agent of that Object.

Fig. 28

2810: Agent is hung from the ceiling in the center of a house

↓

2820: It is connected to an energy source and a personal computer

↓

2830: projector unit of Agent projects image of computer on wall

↓

2840: IR-camera unit of Agent photographs area of screen continuously

↓

2850: user controls content of screen using G-Mouse (IR unit of Agent transfers to engine position of points of light it sees to control cursor)

↓

2860: When the user wants to move from the content of the screen to control of the characteristics of the screen he informs the engine

↓

2880: From this moment, engine may use points and characteristics of light it identifies (and its wireless communication with user) to control characteristic/s (location, size, shape) of screen

↓

2890: When user wants to return to content of screen, Agent returns to regular mechanism or mode such that position of points of light and wireless communication are transmitted to input device application as cursor control.

Fig. 29

2910: The point of light is found in a specific coordinate in the Scope of the IR-camera $(X_1, Y_1)$

2920: The user moves this point of light

2930: The Agent, in response, updates the position of the IR Camera in order to maintain the same relative coordinates $(X_1, Y_1)$

2940: The position of the projection unit of the agent may change accordingly based on the position of the IR-camera. Thus, the position of the screen may change according to the user's pointing location. The result may be a Drag&Drop of the entire screen like the well-known Drag&Drop of windows/objects in engines.

Fig. 30

> 3010: 2 points of light found in specific coordinates in the scope of the IR-camera are moved by a user.
>
> ↓
>
> > 3020: When the points get close to each other, the projector unit of the Agent reduces the size of the screen
> >
> > ↓
> >
> > > 3020i: A relative movement on the horizontal/vertical axis may cause a reduction of the screen on the axis in a manner that is proportional to the movement of the points of light.
> > >
> > > ↓
> > >
> > > 3020ii: A relative motion on the axes may cause a reduction in the screen on the two axes simultaneously proportional to the motion of the points of light.
> >
> > ↓
>
> 3030: When the lights move away from each other, the projecting unit of the Agent may enlarge the screen in the same manner as described in step3020, sub-steps i and ii respectively.
>
> ↓
>
> > 3040: When the points move in the same direction the screen may move as a unit in the correct direction as described above with reference to Fig. 29.

Fig. 31

3110: When the points move in a circle in the same direction, the Agent may revolve on its axis, thus causing the projecting screen to turn on its central point.

↓

3120: When one point stays the same and the other point moves in a correlated motion, the screen may change shape (turn, grow bigger/smaller) in relation to the anchor point.

↓

3130: The user may touch 4 points on the projected area and the agent may project a rectangle screen between those points.

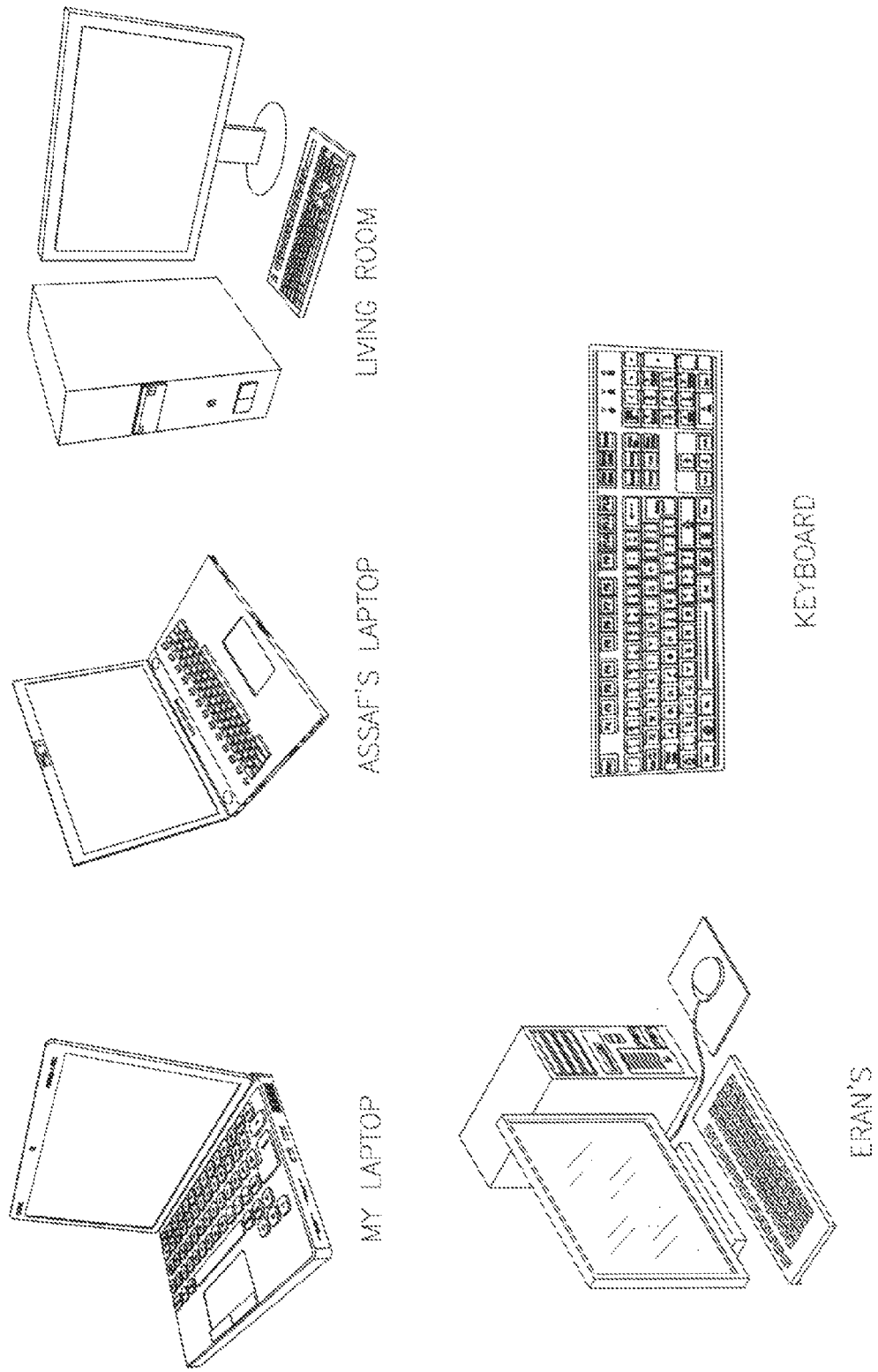

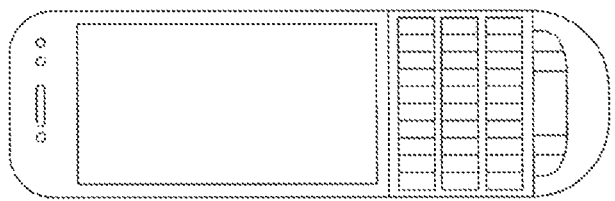
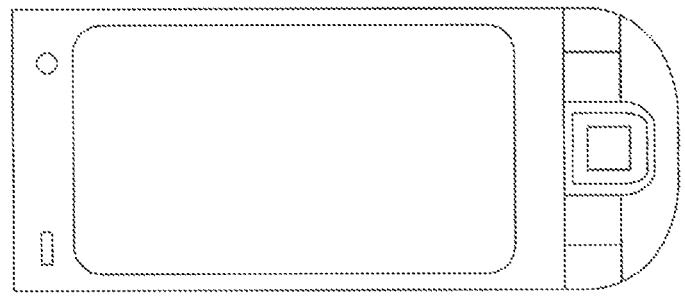
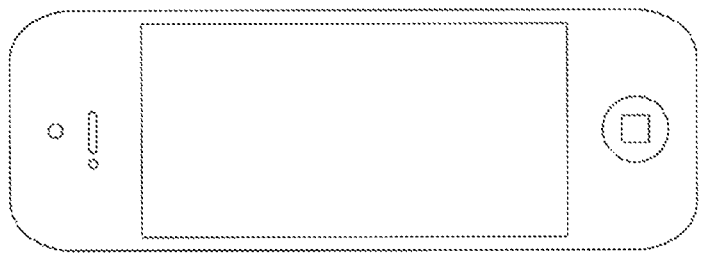
FIG. 32B

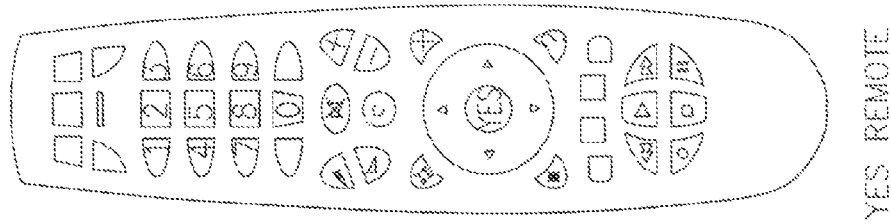
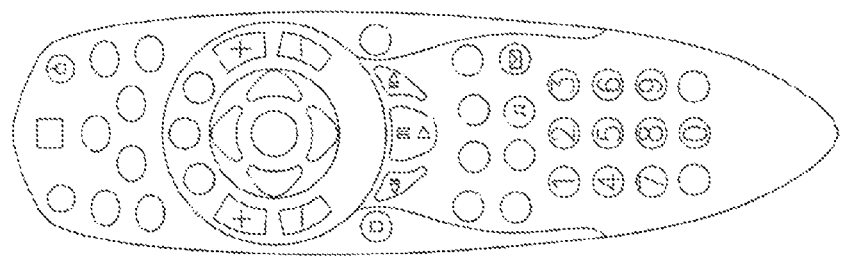
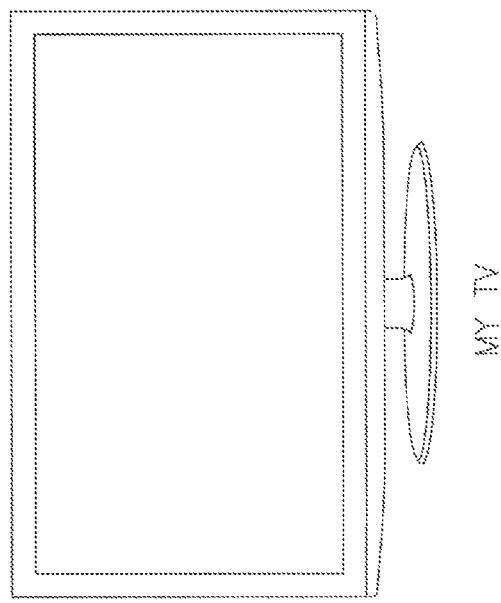
FIG. 32C

SYSTEM FOR PROJECTING CONTENT TO A DISPLAY SURFACE HAVING USER-CONTROLLED SIZE, SHAPE AND LOCATION/DIRECTION AND APPARATUS AND METHODS USEFUL IN CONJUNCTION THEREWITH

REFERENCE TO CO-PENDING APPLICATIONS

Priority is claimed from U.S. provisional application No. 61/282,513 entitled "Multi-disciplinary personal input device and application thereof" and filed 23 Feb. 2010; and from PCT Application No. PCT/IL2010/000834 "Wearable device for generating input for computerized systems", filed Oct. 13, 2010 claiming priority from U.S. provisional application 61/272,610 filed 13 Oct. 2009 and entitled "Wearable Input Device".

FIELD OF THE INVENTION

The present invention relates generally to projecting content onto a surface and more particularly to input devices controlling projection of content onto a surface.

BACKGROUND OF THE INVENTION

Conventional technology pertaining to certain embodiments of the present invention is described in the following publications inter alia:
1. U.S. Pat. No. 5,453,759: Pointing device for communication with computer systems
2. WO 2009024971 (A2): Finger-worn Devices and Related Methods of Use
3. WO 0237466 (A1): Electronic User Worn Interface Device
4. WO 2010053260 (A2): Mouse Controlled Via Finger Movements in Air
5. U.S. Pat. No. 6,198,485 (B1): Method and Apparatus for Three-Dimensional Input Entry
6. US2006001646: Finger Worn and Operated Input Device
7. U.S. Pat. No. 4,988,981 (A): Computer Data Entry and Manipulation Apparatus and Method
8. US2008042995: Wearable Signal Input Apparatus for Data Processing System
9. U.S. Pat. No. 7,057,604 (B2): Computer Mouse on a Glove
10. US 2003227437: Computer Pointing Device and Utilization System
11. GB 2442973 (A): Finger Worn Computer Mouse with an Optical Sensor on a Pivoting Arm
12. U.S. Pat. No. 6,587,090: Finger Securable Computer Input Device
13. US 2006012567: Miniature Optical Mouse and Stylus
14. US 2009322680: Radio Frequency Pointing Device
15. U.S. Pat. No. 7,042,438 (B2): Hand Manipulated Data Apparatus for Computers and Video Games
16. US 2010188428 (A1): Mobile Terminal with Image Projection
17. WO 2009125258 (A1): Communication Terminals with Superimposed User Interface
18. WO 2010064094 (A1): Portable Electronic Device with Split Vision Content Sharing Control and Method
19. WEB: Mobile Phone with a Built-In Projector
20. US 2008317331: Recognizing Hand Poses and/or Object Classes
21. WO 2004055726 (A1): Interface System
22. U.S. Pat. No. 7,006,079 (B2): Information Input System Gestural computing is known. Gyro mouse devices are known. Multi-touch technology is known. Optic touch technology is known.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide a system for projecting content to a display surface having user-controlled size, shape and location/direction and apparatus and methods useful in conjunction therewith. Regarding apparatus useful in conjunction therewith:

Certain embodiments of the present invention seek to provide a convenient, intuitive wearable input device. There is thus provided, in accordance with at least one embodiment of the present invention, a convenient, intuitive wearable input device.

Certain embodiments of the present invention seek to provide a system for generating computerized input to electronic devices including some or all of the following components, interacting between them e.g. as shown and described herein:
1. at least one wearable input device
2. an optical sensor such as an IR camera having optic communication with the sleeve device
3. a software application resident on the controlled host and having typically bi-directional wireless communication with the sleeve device and with the sensor, wherein the wearable input device includes some or all of:
   a. State selection actuator selecting wearable input device's work mode
   b. A signal terminal and processing unit
   c. Wireless communication controller (emitter) and wireless receiver on the sleeve device and the controlled host
   d. Energy supply
   e. Optional sleeve Memory unit.
   f. Light sources e.g. some or all of:
      i. Infra red/Near Infra red laser (includes a feedback circuitry for laser activation monitoring)
      ii. Infra red/Near Infra red LED (light emitting diode)
      ii. Optionally, red/green Laser (includes a feedback circuitry for laser activation monitoring)
   g. 2 buttons with half press and full press mode and with haptic feedback whose clicks may be interpreted by the software application as mouse right clicks and mouse left clicks respectively
   h. Optionally, touch pad scrolling bar for remote scrolling functionality
   i. Force sensor actuator triggering one of the light sources depending on work mode.

Typically, the optic sensor has a spatial field of view which is as wide as possible given application-specific and/or technical constraints. The optic sensor is typically positioned and selected to point at a controlled screen such that its field of view includes the entire screen or to point at a user e.g. such that its field of view includes at least the user's hands. The sensor's filtering is such as to match the optics characterization of the wearable input device's light sources, e.g. in terms of frequencies, power, and distribution. The force sensor actuator, also termed herein "force sensor" may for example comprise a conventional button mechanism.

In an example embodiment of the present invention, each wearable input device may include some or all of the following:

1. State selection actuator which alternates between work modes
2. Signals terminal and processing unit such as not but limited to MCU controlled system, embedded in wearable sleeve, with I/O's, serial interface, signal conversion capabilities.
3a. Wireless communication controller (emitter) on wearable sleeve for emitting wireless information from sleeve to controlled host.
3b. For applications in which it is desired to enable 2-way communication (from host to sleeve/IR Camera), a wireless communication controller (emitter) on controlled host (e.g. USB dongle) for emitting wireless information from controlled host to sleeves/IR Camera.
3c. For applications in which it is desired to enable 2-way communication (from host to sleeve, a wireless receiver on wearable sleeve for receiving wireless information from host.
3d. Wireless receiver on controlled host (e.g. USB dongle) for receiving wireless information from sleeve/s and/or IR Camera.
4. Conventional apparatus for supplying and monitoring energy e.g. battery powered system with low battery monitoring, charging during work mode capability and battery over-voltage and under-voltage protection.
5. Optional sleeve memory unit e.g. with compatible interface to the MCU 2 for storing data (e.g. user preferences, user ID/nickname etc.).
6a1. light source e.g. Infra-red/Near Infra-red laser to generate optic signals to the IR camera.
6a2. If required, due to eye safety and regulatory issues, feedback circuitry for laser activation monitoring operative to notify the system when a laser is activated (e.g. red laser/IR laser). Typically located adjacent the monitored laser diode/s.
6b. light source: Infra-red/Near Infra-red LED, both vertical and horizontal, to create optic signals to the IR camera. Horizontal light source facilitates remote physical screen control and surface control inter alia. Vertical light source facilitates front projection touch control and laptop/desktop control.
6c1. Optional Red Laser operative for emphasis and visual pointing.
7. Optional battery charging indicator e.g. light which indicates battery being charged and/or low battery indicator e.g. light and/or, if mandated for eye safety and regulatory issues, a laser activation indicator e.g. light, and/or current work state indicator e.g. light.
8. 2 buttons with haptic feedback, each having 2 press options: half and full press, operative to trigger light sources activation and to trigger wireless events transmission.
9. Touch pad scrolling bar operative to trigger scroll up/down events, for applications in which it is desired to provide remote scrolling abilities rather than, say, locating the cursor on the scroller of the screen and dragging it up and down each time it is desired to scroll the page.
10. Force sensor actuator operative to trigger light sources activation, typically embedded within the sleeve's substrate or body.
11a. For applications in which it is desired to receive voice input via speech recognition, a microphone typically embedded in the wearable sleeve.
11b. Speaker embedded in wearable sleeve, for applications in which it is desired to provide voice output (e.g. indicating a current work mode).
12. Wearable finger sleeve body/substrate which is suitable in terms of flexibility, texture, weight, and strength.

The above may be operative in conjunction with some or all of the following:
13. Software on the controlled host
14. IR camera to detect IR signals and send them to the software application, located so as to point at the screen and/or the user, depending on desired work mode.

The one or more wearable input devices e.g. 2 sleeves; optical sensor e.g. IR camera, and software application resident e.g. on the controlled host, may be served by conventional apparatus for charging and data transition from/to the host e.g. Micro USB to USB cable and matching micro USB port on the sleeve/s. The Micro USB port, located anywhere on the sleeve, preferably at the bottom of the finger, typically connects the sleeve to a host with a USB port (e.g. computer) so as to charge the battery, send data and receive data.

Each wearable input device also may comprise the following optional components:
16. Accelerometer for detecting depth motion
17. Gyro for detecting rotational motion
18. Flash memory which enables the sleeve to act as a 'wearable disc on key'

It is appreciated that various sub-combinations of the above components have a very wide variety of applications, such as but not limited to the following:

A. An input system, including components 3a, 3d, 8, 9 above, which mimics or preserves mouse functionality e.g. left click, right click, scrolling using buttons and scroller similar to those in a regular mouse.

B. A wearable input device, e.g. including components 1, 6a1, 6b, 10, 14 above, which is operative both when the optic sensor points at the screen (the 'natural' state for projected screens) and when the optic sensor points at the user (the 'natural' state for tangible screens).

C. A wearable input device, e.g. including components 6b, 10, 14 above, having an operating mode in which touch/multi touch abilities are executed by pressing the screen with the fingertip—e.g. as in conventional touch screens.

D. A wearable input device, e.g. including components 1, 6a1, 6b, 10, 14 above, having an operating mode in which remote cursor control is executed by joining the thumb and the forefinger in a 'pinching' like manner, e.g. as shown in FIGS. 4d-4e, which affords ergonomic and intuitive motion for the human hand such that to the user it seems like s/he is holding the cursor with her or his thumb and forefinger and moving it around.

E. A wearable input device, e.g. including components 1, 3a, 3d, 6a1, 6b, 8, 9, 10, 14 above, which enables both remote and touch interaction rather than either remote or touch solution but not both.

F.—A wearable input device, e.g. including components 1, 3a, 3d, 6a1, 6b, 6c1, 8, 9, 10, 14 above, having multiple, e.g. 5, interactive environments enabling convergence of input devices rather than mandating one such device per environment.

G.—A wearable input device, e.g. including components 3a, 3d, 6b, 8, 9, 10, 14 above providing Laptop/desktop interaction in which, typically, at least the entire keyboard area has 2 roles: keyboard+mouse pad which may be alternated in zero setup time e.g. by joining the forefinger and the thumb together, typically such that mouse functionality including some or all of left click, right click and scrolling is in thumb reach.

Certain embodiments of the present invention seek to provide a touchless embodiment which prevents or diminishes screen amortization and, in view of absence of friction between the finger and the screen, enables faster and smooth movements by the user.

There is thus provided, image projector apparatus as shown and described herein. The present invention typically includes at least the following embodiments:

Embodiment 1

Image projector apparatus comprising:

a user input device operative to accept from a user, at least one parameter defining projection of visual content, other than the content itself; and a visual content projector projecting desired visual content, on a surface area, in accordance with said at least one parameter including generating digitally modified visual content from said desired visual content such that said digitally modified visual content, when projected on said surface area, represents said content in accordance with said at least one parameter.

It is appreciated that the above apparatus has a wide variety of applications, such as but not limited to the following categories of applications:

a. Projection of Virtual input devices such as but not limited to Keyboards, mouse pads, remote controls; acceptance of touch or remote inputs from a user viewing the projected virtual input device and transferring these inputs to the system controlled by the input device.

b. Projection of a user-selected environment's display screen contents, in real time, including off-screen (projected screen) viewing of movies, power point and other content.

c. a. Projection of a pre-designed GUI to control an environment, e.g. in a manner equivalent to a custom made virtual remote control which has no physical counterpart.

d. System-generate content such as but not limited to the main screen of FIG. 25 displaying environments (electronic systems) for which the system can support, e.g. applications (a) or (b) above.

Embodiment 2

Apparatus according to embodiment 1 wherein said parameter comprises a user-selected surface area at a user-given location.

Embodiment 3

Apparatus according to embodiment 2 wherein said visual content projector is operative to save said at least one parameter as a bookmark and to retrieve said parameter and project future visual content accordingly, responsive to user selection of said bookmark.

Embodiment 4

Apparatus according to embodiment 1 wherein said surface area is not orthogonal to the optical path of the projector and wherein the system is operative to project an image having any shape S on said surface area without distorting said shape S.

Embodiment 5

Apparatus according to embodiment 4 wherein said shape S comprises a rectangle.

Embodiment 6

Apparatus according to embodiment 1 wherein said visual content projector defines a rectangular display area included in said surface and projects the visual content onto said rectangular display area as a rectangular projection display.

Embodiment 7

Apparatus according to embodiment 1 wherein said parameter comprises a user-preferred size of the surface area and wherein said visual content projector reduces/expand the projection responsively to the user's preferred size of surface area.

Embodiment 8

Apparatus according to embodiment 1 wherein said parameter comprises a user-preferred shape of the surface area and wherein the system is operative to project an image having any shape S onto said user-preferred shape.

Embodiment 9

Apparatus according to embodiment 1 wherein said visual content projector generates a virtual input device for at least one of the following electronic systems serving the user: a telephone, computer, television, remote control device, audio player, smart home application, including:

projecting content representing a user interface controlling at least some functionality of the electronic system, accepting at least one of:
a. a user's remote selection of at least one location within the projected content corresponding to a user-selected input option within the user interface, and
b. A user's touch selection of at least one location within the projected content, corresponding to the user-selected input option, and transmitting the user-selected input option to the electronic system.

Embodiment 10

An image projection method comprising:

Providing a user input device operative to accept from a user, at least one parameter defining projection of visual content, other than the content itself; and Providing a visual content projector projecting desired visual content, on a surface area, in accordance with said at least one parameter including generating digitally modified visual content from said desired visual content such that said digitally modified visual content, when projected on said surface area, represents said content in accordance with said at least one parameter.

Embodiment 11

Apparatus according to embodiment 1 wherein said user input device comprises a wearable input device operative to control an electronic system, the input device comprising:

a wearable substrate;

an IR laser source mounted on said wearable substrate and operative to emit a laser beam impinging on a screen at a location whose coordinates depend on motion of the user wearing the input device; and a laser spot detector operative to detect coordinates of said location within said screen and accordingly to control said electronic system.

Embodiment 12

Apparatus according to embodiment 1 wherein said user input device comprises an IR-based apparatus for controlling an electronic device, the apparatus comprising:
an IR camera configured to be mountable on an electronic device, the electronic device having an input area, the IR camera's field of view including said input area, the IR camera being operative to sense IR signals generated by an input device worn on at least one user's hand, when said hand is operating on said input area; and
a controlling functionality operative to receive said IR signals from said IR camera and to control said electronic device accordingly.

Embodiment 13

Apparatus according to embodiment 1 wherein said user input device comprises a wearable input device serving a human user, the device comprising:
a wearable substrate; and
at least one force sensor mounted on said wearable substrate and operative to sense pressure patterns applied by the human user which mimics the pressure patterns the human user would apply to a mouse button; and
a controlling functionality operative to receive signals, indicative of said pressure, from said force sensor and to control a normally cursor-based electronic device accordingly, including commanding the electronic device to respond to each pressure pattern applied by the human user, as it would respond to the same pressure pattern were it to have been applied by the human user to a cursor-based input device operating said electronic device.

Embodiment 14

Apparatus according to embodiment 1 wherein said user input device comprises wearable input apparatus operative to provide multi-touch control of an electronic system when Embodiment said apparatus is worn by a human user, the input apparatus comprising:
a first wearable input device operative to control the electronic system when mounted on the human user's right hand; and
a second wearable input device which is a mirrored copy of the first wearable input device and is operative to control the electronic system when mounted on the human user's left hand.

Embodiment 15

Apparatus according to embodiment 1 wherein said user input device comprises wearable input apparatus operative to control an electronic system when worn by a human user, the input apparatus comprising:
a finger-wearable substrate configured to be mounted on a user's finger and having a tip portion configured to be mounted on the user's finger tip; and
a force sensing device mounted on said tip portion and including at least one force sensor and being operative to sense pressure applied by the human user's thumb when the user presses thumb to finger, and to control said electronic system at least partly in accordance with at least one characteristic of said pressure.

Embodiment 16

Apparatus according to embodiment 15 and wherein said force sensing device comprises an annular substrate configured to pivot around the user's finger on which a plurality of force sensors are mounted, such that, by rotating said annular substrate, the user selectably positions any of said plurality of force sensors at a location on his finger tip which is accessible to his thumb.

Embodiment 17

A method according to embodiment 10 and also comprising providing a wearable input device which is operative in any of a selectable plurality of interactive environments.

Embodiment 18

A method according to embodiment 10 and also comprising providing a wearable input device operative to control an electronic system, the providing comprising:
providing an IR laser source mounted on a wearable substrate and operative to emit a laser beam impinging on a screen at a location whose coordinates depend on motion of the user wearing the input device; and
providing a laser spot detector operative to detect coordinates of said location within said screen and accordingly to control said electronic system.

Embodiment 19

Apparatus according to embodiment 1 wherein said visual content projector is operative to project, in real time, contents shown on a display screen of a user selected electronic system.

Embodiment 20

Apparatus according to embodiment 14 operative to distinguish between input streams emanating from each of the user's hands and to handle both of said input streams concurrently.

Embodiment 21

Apparatus according to embodiment 16 wherein said annular substrate comprises at least one light source selectably triggered by at least one of said force sensors respectively.

Embodiment 22

Apparatus according to embodiment 21 wherein said at least one light source comprises at least one LED.

Embodiment 23

Apparatus according to embodiment 11 wherein said laser spot detector comprises an IR camera arranged such that its field of view includes said screen.

Embodiment 24

Apparatus according to embodiment 11 wherein said screen may comprise a projected screen and said laser spot detector may be mounted on a projector projecting said projected screen.

Embodiment 25

Apparatus according to embodiment 24 wherein said projector comprises an image projector in a handheld device.

Embodiment 26

Apparatus according to embodiment 11 wherein said laser spot detector comprises an optic-sensitive functionality of the screen itself.

Embodiment 27

Apparatus according to embodiment 11 wherein said electronic system comprises a computer.

Embodiment 28

Apparatus according to embodiment 11 wherein said electronic system comprises a portable communication device.

Embodiment 29

Apparatus according to embodiment 11 wherein said screen comprises a physical screen.

Embodiment 30

Apparatus according to embodiment 11 wherein said laser source comprises an IR laser source.

Embodiment 31

Apparatus according to embodiment 23 having at least two user-selectable modes of operation including a remote mode of operation utilizing said laser source and said laser spot detector and a touch mode of operation.

Embodiment 32

Apparatus according to embodiment 31 wherein said touch mode of operation utilizes:
a light source mounted on the wearable input device and activated by an actual touching of the screen by the user;
a sensor which senses a location of the light source and
a controller which receives the light source location from the sensor and controls the electronic system accordingly.

Embodiment 33

Apparatus according to embodiment 31 wherein selectability of said selectable modes is activated by a human user who pinches thumb to finger.

Embodiment 34

Apparatus according to embodiment 31 wherein selectability of said selectable modes is activated by a human user who operates a two-manner press functionality of a pressable element on the wearable input device.

Embodiment 35

Apparatus according to embodiment 31 wherein said screen is projected from the front.

Embodiment 36

Apparatus according to embodiment 31 wherein said screen is projected from the rear.

Embodiment 37

Apparatus according to embodiment 13 wherein said controlling functionality is also operative to receive signals, indicative of a mouse-sliding operation simulated by said wearable substrate and to control a normally mouse-operated electronic device accordingly, including commanding the electronic device to respond to each mouse-sliding operation simulated by the human user using said substrate, as it would respond to the same mouse-sliding operation were it to have been applied by the human user to a mouse operating said electronic device.

Embodiment 38

Apparatus according to embodiment 14 wherein said first and second wearable input devices are enantiomers which are mirror images of each other.

Embodiment 39

Apparatus according to embodiment 14 and also comprising an optical sensor operative to simultaneously sense positions of a plurality of light points generated by both input devices simultaneously.

Embodiment 40

Apparatus according to embodiment 14 and also comprising a controlling application operative for simultaneously receiving and simultaneously processing positions of a plurality of light points generated by both input devices simultaneously and for controlling a host device accordingly.

Embodiment 41

Apparatus according to embodiment 39 wherein said optical sensor comprises an IR sensor and said light points generated by both input devices simultaneously comprise IR light points.

Embodiment 42

Apparatus according to embodiment 1 wherein said user input device comprises a touchless user input system comprising:
a rear projection unit located at the bottom of a surface which projects onto the surface at an angle acute enough to accommodate the small distance between the screen and the projecting unit;
a wearable input device emitting light; and
a rear optical sensor located behind the screen e.g. adjacent the projecting unit, which is operative to see said light emitted by said wearable input unit.

Embodiment 43

A system according to embodiment 42 and also comprising a force sensing actuator on said wearable input device which triggers emission of said light.

Embodiment 44

A system according to embodiment 42 wherein a user joins thumb and finger together adjacent a desired screen location, said light comprises IR light which impinges upon the surface at said desired screen location and wherein said rear sensor detects the points on the screen from which the laser beams are scattering.

Embodiment 45

Apparatus according to embodiment 11 wherein said IR laser source comprises a near-IR laser source.

Embodiment 46

Apparatus according to embodiment 36 wherein the remote mode of operation utilizes a LED as a light source and wherein said screen comprises a physical screen and said sensor is pointing at the user.

Embodiment 47

Apparatus according to embodiment 1 wherein said user input device comprises a wearable input device which includes an optic sensor and which, when worn by a human user, provides inputs to an electronic device, the input device having a first operating mode in which the optic sensor points at a screen and a second operating mode in which the optic sensor points at the user.

Embodiment 48

An input device according to embodiment 47 wherein said screen comprises a projected screen.

Embodiment 49

Apparatus according to embodiment 1 wherein said user input device comprises a wearable input device which, when worn by a human user, provides inputs to an electronic device, the input device having a "touch" operating mode in which the human user presses a screen which is not a touch-screen and the electronic device is controlled as though said screen were a touch screen.

Embodiment 50

Apparatus according to embodiment 33 which provides to a human user an experience as though the user were holding a cursor with thumb and forefinger and moving said cursor.

Embodiment 51

Apparatus according to embodiment 11 wherein said user input device comprises a wearable input device which, when worn by a human user, provides inputs to an electronic device, the input device having a "touch" operating mode in which the human user presses a screen and the electronic device is controlled as though said screen were a touch screen; and a remote operating mode in which the human user interacts with the screen remotely from afar.

Embodiment 52

Apparatus according to embodiment 11 wherein said user input device comprises a wearable input device which is operative in any of a selectable plurality of interactive environments.

Embodiment 53

Apparatus according to embodiment 52 wherein said plurality of environments includes a front projected screen environment.

Embodiment 54

Apparatus according to embodiment 52 wherein said plurality of environments includes a rear projected screen environment.

Embodiment 55

An input device according to embodiment 52 wherein said plurality of environments includes a desktop computer environment.

Embodiment 56

An input device according to embodiment 52 wherein said plurality of environments includes a laptop computer environment.

Embodiment 57

An input device according to embodiment 52 wherein said plurality of environments includes a mobile device with an embedded pico projector.

Embodiment 58

An input device according to embodiment 52 wherein said plurality of environments includes a interactive surface environment.

Embodiment 59

A method according to embodiment 10 and also comprising providing IR-based apparatus for controlling an electronic device, including:

providing an IR camera configured to be mountable on an electronic device, the electronic device having an input area, the IR camera's field of view including said input area, the IR camera being operative to sense IR signals generated by an input device worn on at least one user's hand, when said hand is operating on said input area; and providing a controlling functionality operative to receive said IR signals from said IR camera and to control said electronic device accordingly.

Embodiment 60

A method according to embodiment 10 and also comprising providing a wearable input device serving a human user, including:

mounting at least one force sensor on a wearable substrate, wherein said force sensor is operative to sense pressure patterns applied by the human user which mimics the pressure patterns the human user would apply to a mouse button; and providing a controlling functionality operative to receive signals, indicative of said pressure, from said force sensor and to control a normally cursor-based electronic device accordingly, including commanding the electronic device to respond to each pressure pattern applied by the human user, as it would respond to the same pressure pattern were it to have been applied by the human user to a cursor-based input device operating said electronic device.

Embodiment 61

A method according to embodiment 10 and also comprising providing wearable input apparatus operative to provide multi-touch control of an electronic system when said apparatus is worn by a human user, including:

providing a first wearable input device operative to control the electronic system when mounted on the human user's right hand; and providing a second wearable input device which is a mirrored copy of the first wearable input device and is operative to control the electronic system when mounted on the human user's left hand.

Embodiment 62

A method according to embodiment 10 and also comprising providing wearable input apparatus operative to control an electronic system when worn by a human user, including:

providing a finger-wearable substrate configured to be mounted on a user's finger and having a tip portion configured to be mounted on the user's finger tip; and mounting a force sensing device on said tip portion, the force sensing device including at least one force sensor and being operative to sense pressure applied by the human user's thumb when the user presses thumb to finger, and to control said electronic system at least partly in accordance with at least one characteristic of said pressure.

Embodiment 63

Apparatus according to embodiment 1 wherein said user input device includes IR-based apparatus for controlling an electronic device, the apparatus comprising:

an IR camera configured to be mountable on an electronic device, the electronic device having an input area, the IR camera's field of view including said input area, the IR camera being operative to sense IR signals generated by an input device worn on at least one user's hand, when said hand is operating on said input area; and a controlling functionality operative to receive said IR signals from said IR camera and to control said electronic device accordingly, wherein wireless communication actuators on the input device send signals directly to said electronic device.

Embodiment 64

A method according to embodiment 10 and also comprising providing a touchless user input system, including:

providing a rear projection unit located at the bottom of a surface which projects onto the surface at an angle acute enough to accommodate the small distance between the screen and the projecting unit;

providing a wearable input device emitting light; and providing a rear optical sensor operative to be disposed behind the screen e.g. adjacent the projecting unit, which is operative to see said light emitted by said wearable input unit.

Embodiment 65

A method according to embodiment 10 and also comprising providing a wearable input device, including:

providing a wearable input device which includes an optic sensor and which, when worn by a human user, provides inputs to an electronic device, the input device having a first operating mode in which the optic sensor points at a screen and a second operating mode in which the optic sensor points at the user.

Embodiment 66

A method according to embodiment 10 and also comprising providing a wearable input device, including:

providing a wearable input device which, when worn by a human user, provides inputs to an electronic device, the input device having a "touch" operating mode in which the human user presses a screen which is not a touch-screen and the electronic device is controlled as though said screen were a touch screen.

Embodiment 67

A method according to embodiment 10 and also comprising providing a wearable input device, including:

providing a wearable input device which, when worn by a human user, provides inputs to an electronic device, the input device having:

a "touch" operating mode in which the human user presses a screen and the electronic device is controlled as though said screen were a touch screen; and a remote operating mode in which the human user interacts with the screen remotely from afar.

Embodiment 68

Apparatus according to embodiment 32 wherein said light source comprises a LED.

Embodiment 69

Apparatus according to embodiment 9 wherein the communication between the electronic system and its user interface employs a known protocol and wherein transmitting includes impersonating said user interface to said electronic system.

Embodiment 70

Apparatus according to embodiment 69 wherein said user interface comprises a remote control device and said protocol comprises at least one of RC5 and RC6.

When a remote control device, of an environment e.g. electronic device with which the user desires to interact, uses an IR communication protocol, a remote control setup process typically is provided in which the system is informed where the environment's IR sensor is located.

Embodiment 71

Apparatus according to embodiment 9 wherein said user interface comprises a keyboard.

Embodiment 72

Apparatus according to embodiment 1 and having at least two user-selectable modes of operation including a remote mode of operation.

Embodiment 73

Apparatus according to any of the preceding apparatus embodiments and also comprising a state selector selecting between modes of operation of said apparatus and wherein said state selector is controlled by a manual operation by the user in which the user presses together his thumb and a finger wearing said input device.

Embodiment 74

Apparatus according to embodiment 1 wherein said visual content project includes more than one projecting unit respectively projecting at least first and second visual contents on respective at least first and second surface areas.

Embodiment 75

Apparatus according to embodiment 1 and also comprising a video camera.

Embodiment 76

Apparatus according to embodiment 1 and also comprising at least one speaker generating at least one audio presentation of at least one apparatus output.

Embodiment 77

Apparatus according to embodiment 1 and also comprising microphones to receive voice commands from the user.

Embodiment 78

Apparatus according to embodiment 1 and also comprising at least one light source which enable communication with at least one electronic system which employs optic communication.

Embodiment 79

Apparatus according to embodiment 78 wherein said light source comprise at least one of an IR LED and a laser.

Embodiment 80

Apparatus according to embodiment 78 wherein said electronic system which employs optic communication comprises at least one of a TV, air conditioner, and a counterpart image projector apparatus according to embodiment 1.

Embodiment 81

Apparatus according to embodiment 1 wherein the system is operative to route between different visual projection environments including projecting and controlling an individual environment from among several visual projection environments at each individual moment according to a user's selection of environment.

Embodiment 82

Apparatus according to embodiment 81 wherein said visual projection environment includes at least one of: a visual projection task; a visual projection application; and an interaction, including at least one visual projection operation, with an electronic system.

Embodiment 83

Apparatus according to embodiment 1 wherein the system is operative to analyze topography of a room and, responsively, to alter at least one projection characteristic governing said projector's projection of said desired visual content, to achieve a desired shape.

Embodiment 84

Apparatus according to embodiment 83 wherein the system uses short length sonar wave technology to achieve alteration of said projection characteristic of the screen.

Embodiment 85

Apparatus according to embodiment 84 wherein the system uses depth sensing cameras to achieve alteration of said projection characteristic of the screen.

Embodiment 86

Apparatus according to embodiment 1 which is operative to accept from a user, and save, at least one bookmarks each including at least one attribute of a plurality of agents and to subsequently and selectably request all of said agents' attributes together.

This embodiment is also referred to herein as provision of selectable "work modes", such as a Party work mode vs. a Productive work mode.

Embodiment 87

Apparatus according to embodiment 1 wherein a rear projection screen is operative to be extracted upon request.

Embodiment 88

Apparatus according to embodiment 87 wherein said rear projection screen is also interactive by content and place.

Embodiment 89

Apparatus according to embodiment 1 which includes RTLS (real time locating system) functionality informing the system where a user thereof is located.

Embodiment 90

Apparatus according to embodiment 89 wherein the system is operative to selectably project content only within a defined vicinity around the user. Such content is referred to herein as "individual content".

Embodiment 91

Apparatus according to any of the preceding embodiments wherein each of a plurality of units can move independently relative to others from among the plurality of units.

Embodiment 92

Apparatus according to embodiment 91 wherein said plurality of units comprises a plurality of Projecting units within said visual content projector.

Embodiment 93

Apparatus according to embodiment 91 wherein said plurality of units comprises a plurality of Video camera units Embodiment 94

Apparatus according to embodiment 91 wherein said plurality of units comprises a plurality of IR sensor units.

Embodiment 95

Apparatus according to embodiment 91 wherein said plurality of units comprises a plurality of IR emitter units.

Embodiment 96

A computer program product, comprising a computer usable medium having a computer readable program code embodied therein, said computer readable program code adapted to be executed to implement any of the methods shown and described herein.

Embodiment 97

A computer usable medium on which resides a controlling functionality according to any of the preceding embodiments.

In accordance with an embodiment of the invention there is still further provided a computer usable medium on which resides a controlling functionality. Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 1b is a pictorial isometric illustration of the device of FIG. 1a.

FIG. 5a illustrates an exemplary plurality of work modes according to which the sleeve device of FIGS. 4a-4b may operate, and which work modes are typically selectable as alternative states, using the state selection actuator 60 of FIGS. 4a-4b.

FIGS. 6a-6b and 7a-7b are illustrations useful in understanding methods of operation of a software application typically resident on the controlled host e.g. computer or mobile communication device being controlled by inputs generated using the input generating system shown and described herein, all in accordance with certain embodiments of the present invention.

FIGS. 9a-9f are useful in understanding software components of a wearable input device constructed and operative in accordance with certain embodiments of the present invention.

FIGS. 15a-15e are pictorial illustrations useful in understanding the method of FIG. 23.

FIGS. 16a-22 illustrate aspects of an example agent apparatus constructed and operative in accordance with certain embodiments of the present invention.

FIGS. 23, 24, 26a-31 are simplified flowchart illustrations of optional methods of operation of certain embodiments of the present invention.

FIGS. 32a-32f are example screenshot illustrations of menus which are respectively displayed responsive to a user selection of the exemplary 6 menu options shown in FIG. 25 respectively.

DETAILED DESCRIPTION OF CERTAIN EMBODIMENTS

Figure 1A:
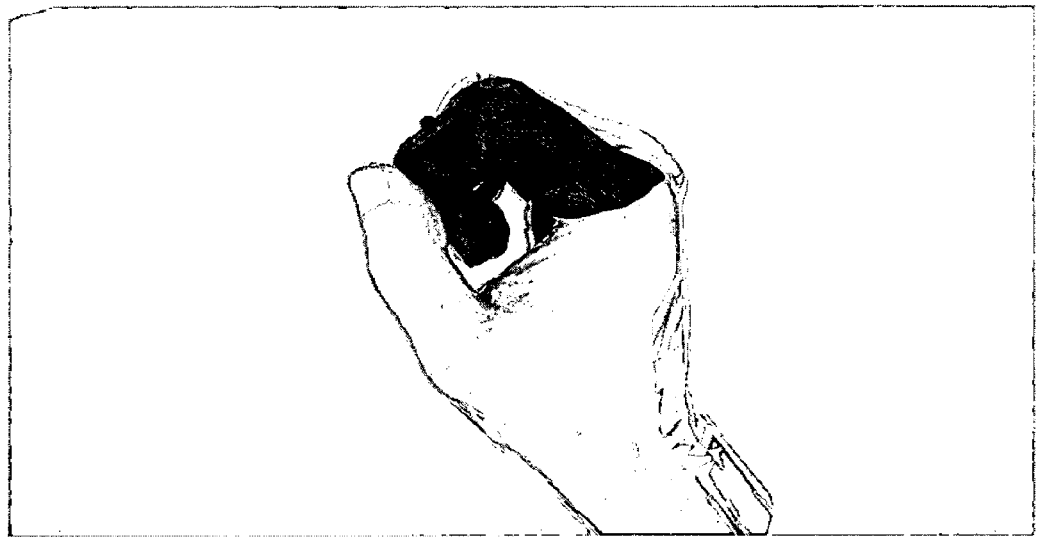
FIG. 1a is a pictorial side-view illustration of a wearable input device constructed and operative in accordance with one embodiment of the present invention.
Figure 1B:
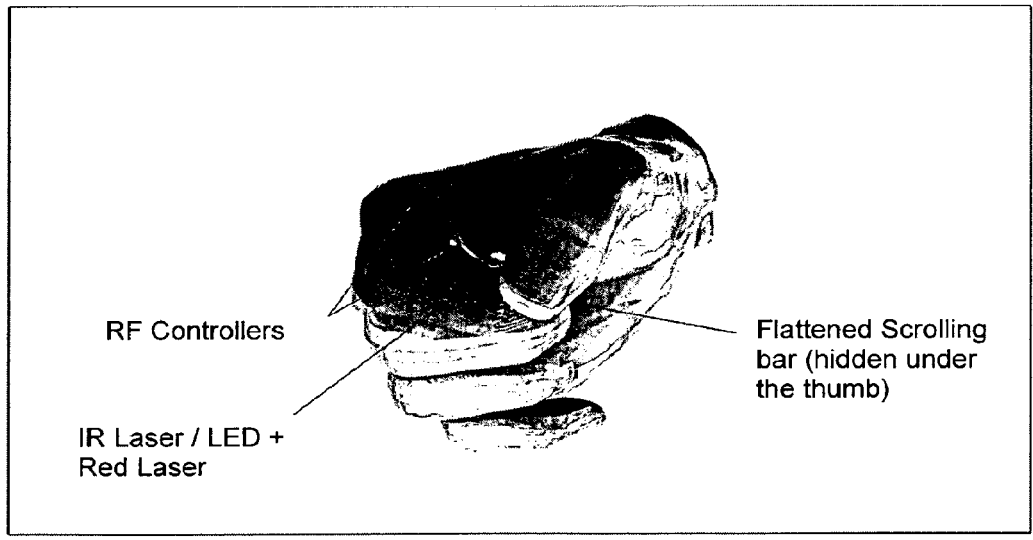
Figure 1C:
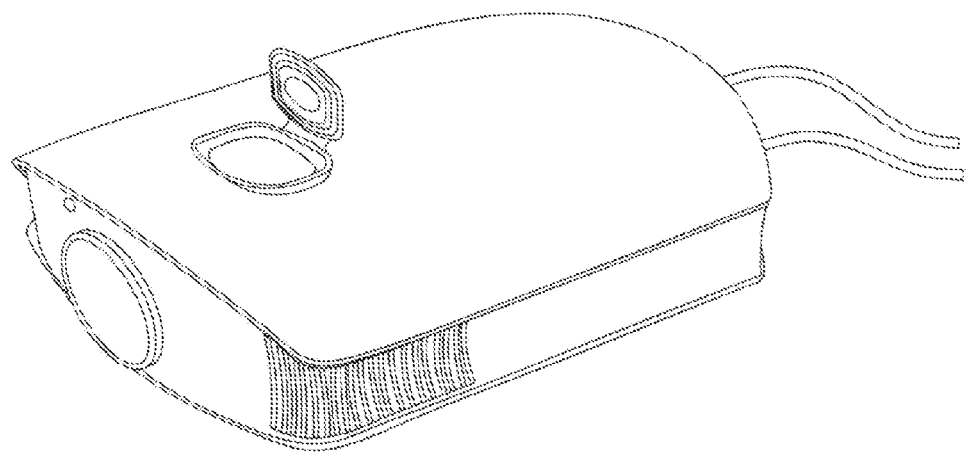
FIG. 1c is a pictorial illustration of an IR camera mounted on an image projector, facing a screen onto which an image is being projected by the projector, all in accordance with an embodiment of the present invention.

FIG. 1a is a pictorial illustration of the Input device. The Input device, as shown in FIG. 1b, typically includes some or all of an IR laser/LEG and red laser, RF controllers and a flattened scrolling bar, typically accessible by a user's thumb. The mode of operation of the apparatus of FIGS. 1a and 1b is typically as follows: First, the two RF control buttons are able to transmit, to a PC application residing on the controlled computer, mouse clicks, e.g. left and right, in a way similar to the way a cordless mouse operates. The scroll bar is a touch-sensitive electronic pad which simulates the operation of a scroll-wheel, creating signals that are transferred to the PC application using RF communication. The input device's touch scroll bar is not visible in FIG. 1b as it is right under the thumb in the image. In summary, the scrolling operation of the input device is typically effected by an intuitive sliding of the thumb along on one side of the finger. Mouse cursor control, using the input device, according to certain embodiments of the invention, is now described in detail. A laser ray in the IR/near IR spectrum is emitted from the input device, and strikes the screen at a given point. That point's coordinates are transferred to the PC application. Any suitable method may be employed to detect that point, such as but not limited to any of the following methods a-c:

a. After striking the screen, the laser ray is scattered into the space of the room. An IR camera is constantly videoing the screen and detects the points on the screen where the laser beams are being scattered from it. The camera then sends this input to the PC application. At projector environments, the IR camera may be mounted on the projector facing the screen as shown in FIG. 1c.

b. Two or more IR cameras are located on the ribs of the screen, constantly videoing the screen and sending their input to a Central Computing Unit. Then, using mathematic & trigonometric computations on the integrated input, the CCU detects the contact point between the laser beams and the screen, sending it to the PC application.

c. The screen as a whole is an optic sensitive screen, which self-detects the striking point of laser beams at a given range of the electromagnetic spectrum.

The apparatus of FIG. 1b and/or variations thereof illustrated and described herein typically includes some or all of the following, suitably positioned e.g. as shown: horizontal IR led 10, vertical IR led 10, IR laser 30, red laser 40, scroller 50, buttons 60 and 70, state selector 80, force sensing actuator 90, IR led 100, technology box 110 in which suitable non-location sensitive components may be concentrated, speakers and microphone 120, flexible body 140 with paper battery inside, indicator LEDs 150 and on/off switch 160. It is appreciated that the wearable input device of the present invention is sometimes termed herein "sleeve" although the configuration thereof may or may not resemble an actual sleeve such as a finger-wearable sleeve.

According to certain embodiments, the image is not projected onto the screen on the user's side, as in a conventional projector, but rather from the back. The laser beam penetrates the transparent screen, refracting somewhat, and is absorbed in an IR camera disposed at the back of the screen. The camera sees the point on the screen from which the beam arrived and thereby discerns the location on the screen pointed at by the user.

A module of the PC application receives some or all of the above-mentioned inputs such as but not limited to some or all of: mouse clicks, scroll messages, beams striking point, and integrates them into the OS, masquerading as a regular or multi-touch mouse. The user receives feedback to her or his actions as if s/he were using a mouse; for example, the mouse cursor moves on the screen, clicks open windows and menus, etc. The interaction continues.

Figure 1D:
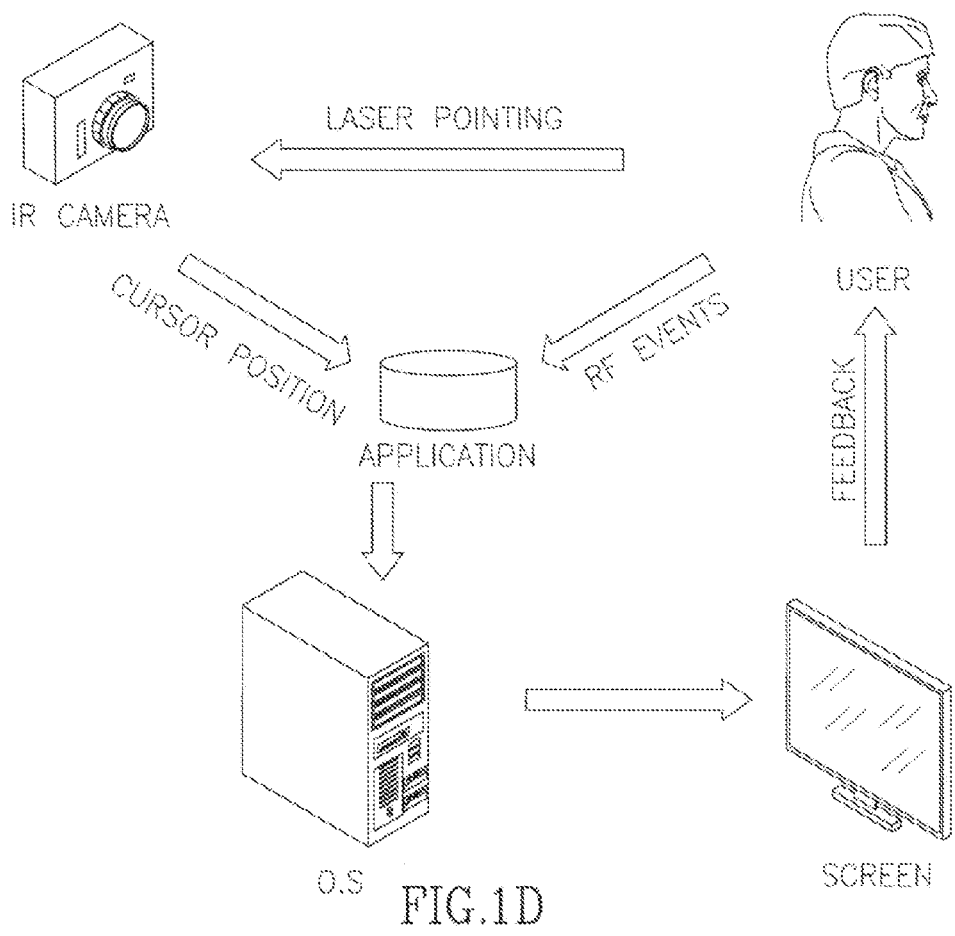
FIG. 1d is a pictorial diagram of a first method whereby a wearable input device constructed and operative in accordance with certain embodiments of the present invention controls a computerized application.

FIG. 1d is a graphical representation of the process, as a low resolution process breakdown.

The input device typically comprises some or all of the following components:
a. on/off switch
b. light sources (typically, IR laser+IR LED+Red Laser)
c. state selection button as described below
d. one or more indicator lights
e. touch pad scrolling bar
f. two buttons constructed in a two press manner—half and full press as described below
g. rechargeable energy unit
h. wireless communication unit
i. micro controller unit The input device body is made of a combination of flexible polymers with memory shape which easily conform themselves to the user's physical dimensions.

The input device may be worn on any of the user fingers of each hand.

Figure 1E:
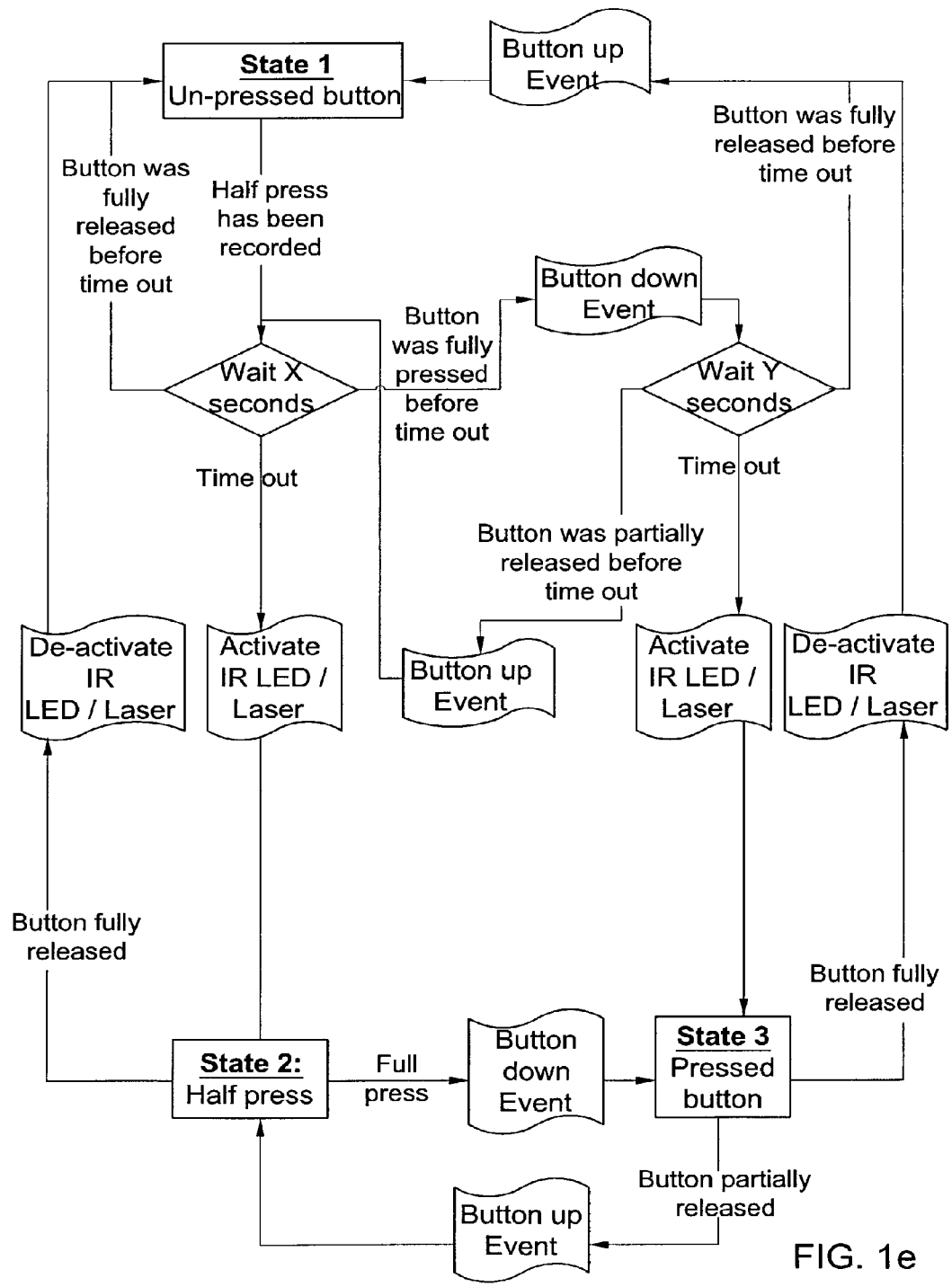
FIG. 1e is a diagram of a state-chart for a half-press mechanism constructed and operative in accordance with an embodiment of the present invention.
Figure 1F:
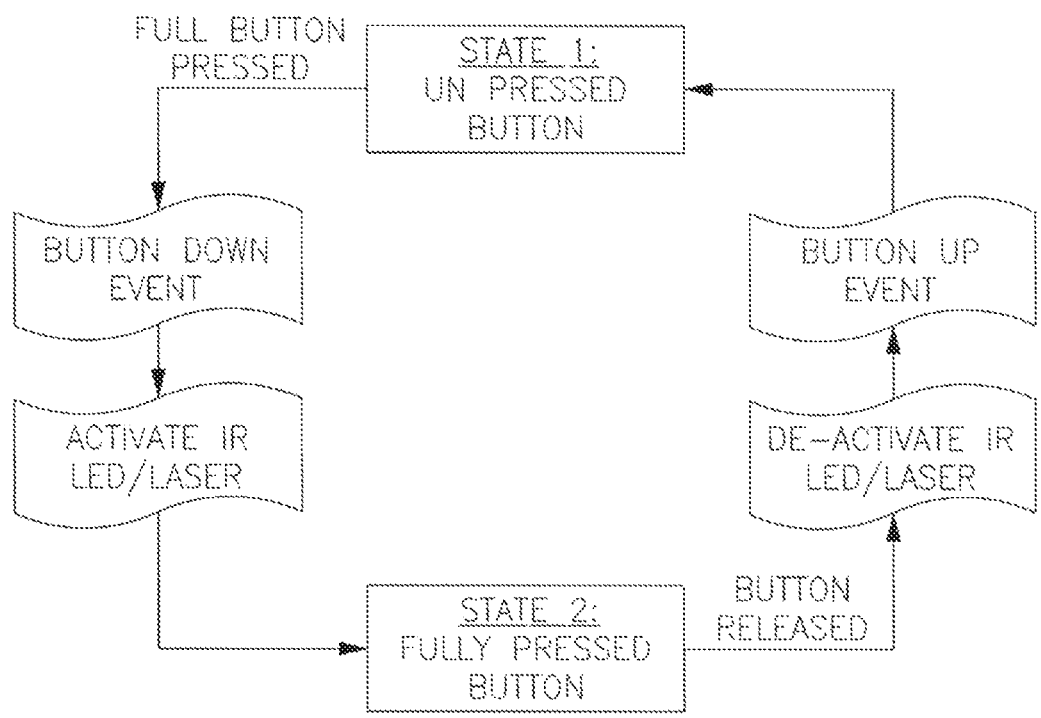
FIG. 1f is a diagram of a state-chart for a touch-screen mechanism constructed and operative in accordance with an embodiment of the present invention.
Figure 1G:
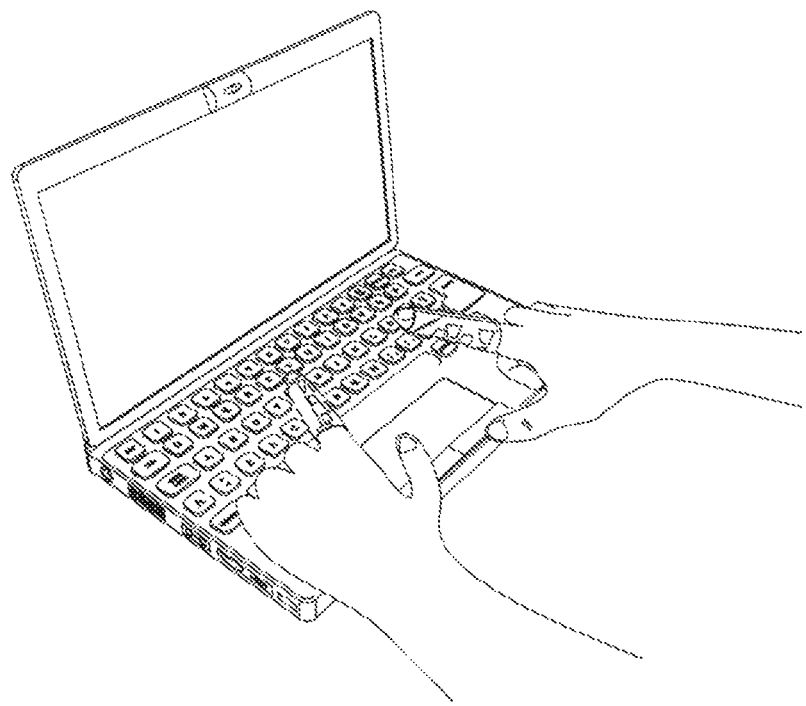
FIG. 1g is a pictorial illustration of an IR camera mounted adjacent a computer screen, facing down toward a typical location of a user's hands on an input device such as a keyboard associated with the computer screen, all in accordance with an embodiment of the present invention.
Figure 1H:
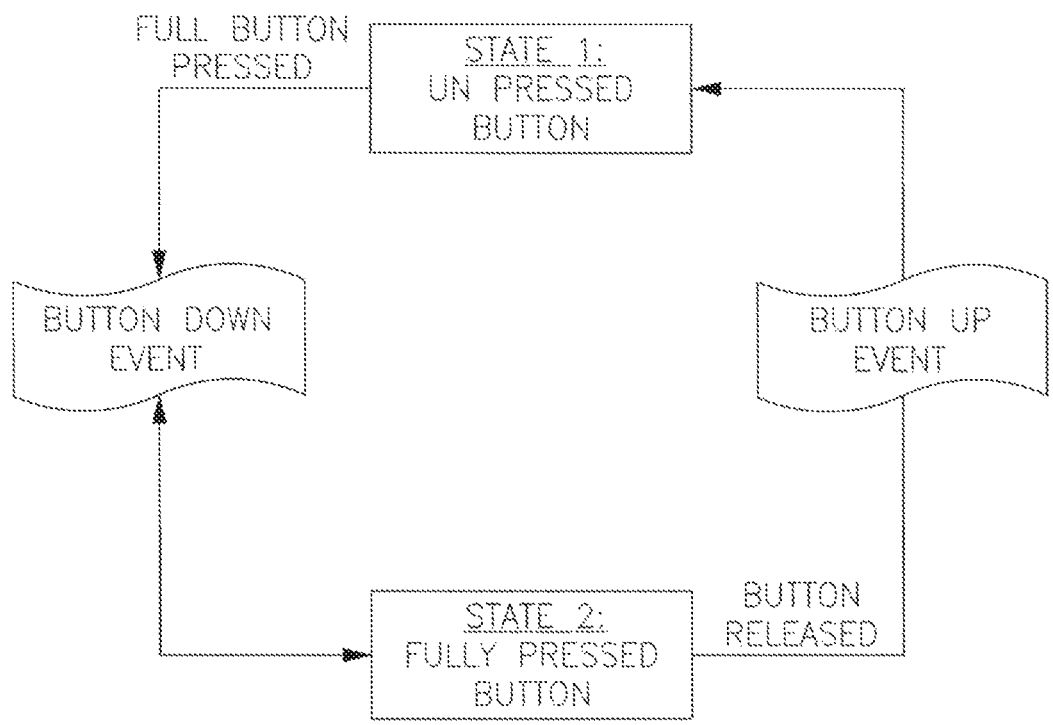
FIG. 1h is a diagram of a state-chart for a continuous PC mechanism constructed and operative in accordance with an embodiment of the present invention.

Half and full press: The two RF controllers located at the second & third parts of the finger e.g. as shown in FIG. 1b, are constructed in a two-press manner—half & full press. Since the input device is a wearable mouse, it constantly follows any hand movement. Therefore, the user is typically afforded the ability to choose when s/he wants it to influence the cursor position and when not. The half press mechanism helps him to easily achieve this ability as described with reference to the state-charts of FIGS. 1e, 1f, and 1h, inter alia. The input device is typically multi-state and may be in one of several different states a-e at any given moment, such as but not limited to some or all of the following:

a. IR Laser state: enables remote control of large screens, as described above. The behavior of the operation algorithm is described in FIG. 1e which is a suitable half press state-chart b. Red Laser state: the device switches to a laser-pointer mode, emitting instead of an IR laser detectable by the IR camera, a red laser at the human eye viewable spectrum. Using this mode the user may switch from controlling the mouse to highlighting important features on the screen, similar to the way a regular laser-pointer works. Although the user has no effect on the cursor position, the other functionality of the input device, such as clicking and scrolling abilities, continue to work regularly.

c. IR LED mode 1—touch screen: This mode enables the user to easily transform any large screen into a multi-touch screen. In this mode, the user may work with the input device adjacent to the screen while the active light source may be the IR LED instead of the IR laser. Operation, according to certain embodiments, is illustrated in FIG. 1f which is a touch screen state-chart. In order to help the user distinguish the exact contact point between the IR LED and the screen, the IR LED may have a stretching mechanism which may enable it to protrude from the input device similarly to a stylus pen.

d. IR LED mode 2—personal computer: This mode enables the user to control desktop and laptop computers. In this mode's settings, the IR camera is located at the upper rib of the computer screen, facing down towards the user's hand which is typically lying on the keyboard, as shown at FIG. 1g. The user uses both hands to work with the keyboard and when s/he wishes to move the mouse cursor or execute any other mouse operation such as clicking or scrolling, s/he does not need to lift her or his hand from the keyboard and hold the mouse—s/he uses the input device while her or his hands are still on the keyboard. The IR camera located on the computer's screen detects the IR signals being emitted from the input device and sends them to PC application module on the controlled computer which transforms them into mouse movements on the screen. The behavior of the operation algorithm is as shown at FIG. 1e—half press state chart.

e. IR LED mode 3—continuous PC: This mode may be exactly the same as IR LED mode 2—personal computer (d), except that the IR LED typically works constantly. Therefore, typically, any movement always influences the cursor position without the need to half press the button first. The behavior of the operation algorithm is described in FIG. 1h which is a continuous PC state-chart.

The input device enables the user in front of any kind of audience to achieve total remote mouse control, typically including some or all of the following: Left click, Right click, Cursor control, scrolling, double click, typically while offering advantages such as but not limited to some or all of the following:

a. The user is not limited to a single position and may walk freely around the presentation area, as large as it may be.
b. The presenter does not need to hold anything in her or his hands. Both her or his hands are totally free and s/he may use her or his body language in a full, natural manner and even hold objects during the presentation. Furthermore, the input device is built in such a way as to leave the tip of the pointing finger totally free, which allows him to comfortably type on a keyboard without first laying another object down.

c. The user may turn the input device into a laser pointer at any point while still maintaining control of any mouse functionality except for cursor position, such as but not limited to some or all of the following: Left click, Right click, scrolling, double click.

d. The user may use any kind of big screen, whether an LCD screen or a projection screen, as a touch screen.

Using the input device with desktop and laptop computers, the user may have full control of the keyboard and mouse while both her or his hands remain on the keyboard. The advantages of such an approach may include but are not limited to some or all of the following: a. Effectiveness—the user's work rate increases as the move from mouse to keyboard requires zero setup time. Many users are wary of the constant move of hands from mouse to keyboard and work with one hand on the mouse and one hand on the keyboard. This approach suffers from limitations because keyboards are planned for two-hand use.

b. Ergonomics—The frequent move from keyboard to mouse wears the wrist and shoulder joints—phenomena which are overcome by certain embodiments of the input device shown and described herein. Additionally, it is known that daily work with a regular mouse may, in the long-term, create issues such as Carpal Tunnel Syndrome and Repetitive Stress Injury. Beyond the pain, these effects cause considerable financial loss due to decreased work rate and, in more serious cases, punitive damages. The ability to work without needing to lift the hands every time to hold another object may drastically decrease such phenomena.

c. Space resources—the mouse located next to the computer requires additional table space, especially when padding surfaces are provided due to an inherent lack of ergonomics. This limitation becomes critical especially when working in limited spaces, usually with a laptop.

Figure 1I:
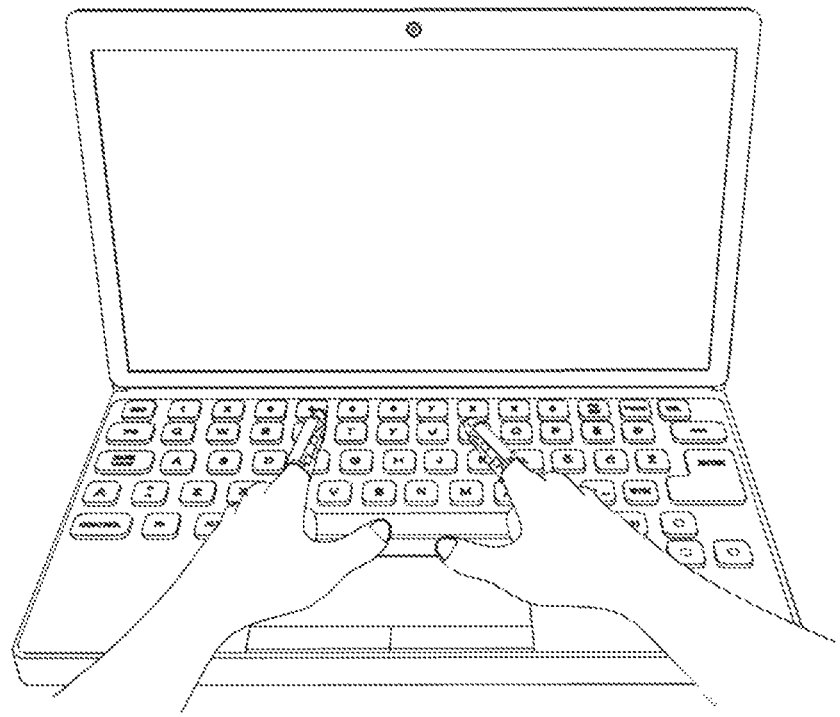
FIG. 1i is a pictorial illustration of a user's hands on the keyboard of FIG. 1g, wherein the user is wearing an input device constructed and operative in accordance with an embodiment of the present invention, and is using the input device to control the keyboard and mouse without removing his hands from the keyboard, due to the operation of the IR camera of FIG. 1g in conjunction with the input device, all in accordance with an embodiment of the present invention.
Figure 2A:
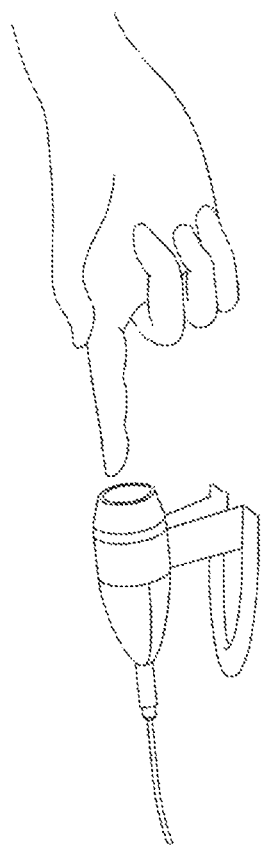
FIGS. 2a-2d are pictorial illustrations of respective stages in the interaction of a wearable input device constructed and operative in accordance with an embodiment of the present invention, with a docking station constructed and operative in accordance with an embodiment of the present invention.
Figure 2B:
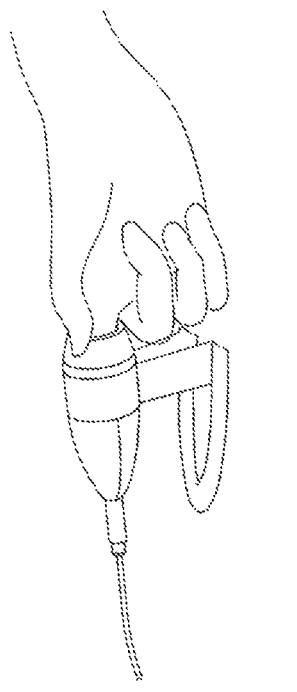
Figure 2C:
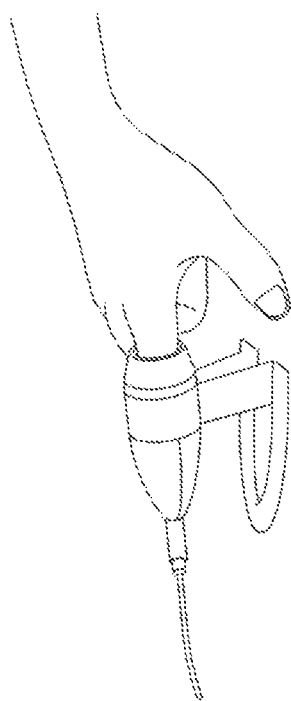
Figure 2D:
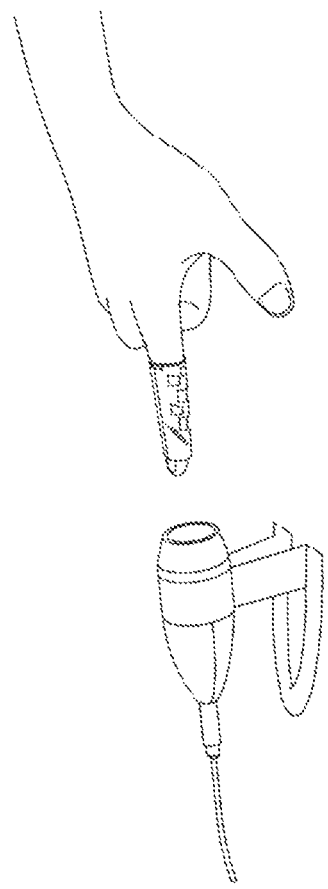

Laptop control may be performed using an IR camera hooked on the top of the screen. According to certain embodiments, the IR camera facing the keyboard area becomes embedded in laptops at manufacturing stage. This may transform the input device into a completely independent unit, communicating with the laptop without the need for external devices. FIG. 1i illustrates a possible implementation in which the IR camera is embedded into the laptop's body.

The input device market is moving towards multi-touch control e.g. iPhone and other devices. This multi-touch control, however, has barely been extended into desktop and laptops due to price & limitations of touch-screen technology. An input device worn on one of the fingers of both the left and right hands brings multi-touch functionality to desktop/laptop/media center/projector screen applications. The ability to control objects on the screen using both hands in an intuitive way is useful for everyday computer work-flow.

Having described various modes of operation for the input device and each mode's advantages, a docking station useful in association with the input device is now described. Referring now to FIGS. 2a-2d, the interaction between the input device and the docking station may be as follows:

a. The user inserts her or his finger into the docking station while the input device is on the finger.
b. The user rotates her or his finger 90 degrees clockwise
c. The user takes the finger out of the docking station, leaving the input device inside.

The action of wearing the input device is symmetrical:
a. The user inserts her or his finger into the docking station
b. The user rotates her or his finger 90 degrees counter-clockwise
c. The user takes the finger out of the docking station with the input device on it, ready to be used. The advantages of the docking station may include but are not limited to some or all of the following:

a. The docking station enables the user to wear and remove the input device from her or his hand quickly and efficiently, but more important—without the use of the other hand.
b. The input device is typically formed of relatively gentle micro-electronics. The docking station shall protect the input device while in transit, e.g. in a laptop bag.
c. The docking station shall provide a very respectable casing for the input device
d. The docking station may connect to electricity and be used as the input device's charger. Furthermore, the docking station may be equipped with an internal large capacity rechargeable battery, and so able to charge the input device even when the docking station is not connected to electricity. This overcomes the space limitations in the input device, extending its battery life much further.

Conventionally, cordless input devices such as wireless keyboards or mouse devices often function in a way allowing them to communicate with a single specific plug which has their ID encoded into it. In this mode of operation, moving the control from one computer to the next typically involves the user disconnecting the plug from the first computer and reconnecting it to the second computer. A more convenient mode, which is used mainly in Bluetooth devices such as cell phones and earpieces allows the user to connect any device to any other device using a process called "Pairing" in which the devices are authorized to work with each other. The PC application, the IR camera and the entire input device's design typically enable the user to work in this mode of operation. Advantages created by this communication mode may include but are not limited to some or all of the following:

a. All for one—Every input device, given sufficient authorization, instantly assumes full control of the computer.
b. One for all—An input device, given sufficient authorization, instantly assumes full control of every other computer that is input device enabled according to certain embodiments of the present invention.
c. Groups—The user control of the input device PC application may enable the definition of user groups, and so enable multi-user control of the controlled computer.

Examples may include but are not limited to the following:
a. During a lecture, while the presenter is presenting, the active user group shall be "presenter" but when students ask questions, the presenter switches the active user group to "student" and the entire discussion becomes interactive.
b. During a board meeting, while the marketing director is presenting, the user group may include, say, a marketing director, the CEO and the chairman. The CEO and chairman may intervene and assume control at any point during the meeting, resulting in a dynamic, multi-user control system which revolutionizes the way people collaborate with computers.

These advantages transform the input device into a product with 'network effect'—the customer value of owning input device increases with the amount of input devices. The input device is no longer the computer's mouse, it is a personal mouse just as cell phones are a personal rather than an office communication device.

A Multi Disciplinary Personal Input Device constructed and operative in accordance with an alternative embodiment of the present invention is now described. The Input device's components may include some or all of the following:
1. On/Off switch
2. 3 or more light sources including: such as but not limited to some or all of the following:
   a. Infra red laser
   b. Infra red LED
   c. Red Laser
3. 1 or more indicator lights
4. 1 or more buttons constructed in a two press manner—Half and full press
5. 1 or more Microphones
6. 1 or more Speakers
7. Selection controller
8. Touch pad scrolling bar
9. Force sensors
10. Rechargeable energy unit
11. Memory unit
12. Wireless communication unit
13. Micro controller unit The Input device body may be made of a combination of flexible polymers with memory shape which easily conform themselves to the user's physical dimensions and enable him to freely move her or his finger. The Input device may be worn on any of the user fingers on each hand, e.g. as shown in FIG. 1b.

The controls that are controlled by the thumb are on the upper part of the finger
The light source is found at the front of the finger, typically in the middle joint.
Red Laser
IR Laser
IR LED
The edge of the Input device which is positioned, when worn by the user, at the edge of her or his finger, typically pivots or revolves, typically a full 360 degrees, such that some or all of the following four components may be disposed azimuthally at the tip of the user's finger, e.g. on its four sides respectively, approximately 90 degrees apart:
   a. Touch pad scrolling bar
   b. Force sensor
   c. IR LED+Force Sensor (both not shown)
   d. Speakers: The other components are not placement sensitive and may be placed anywhere on the Input device. The Input device's Operating Mechanism typically includes some or all of the following: RF Controllers, Scroll bar, cursor position control, integration of mouse clicks, scroll messages, beam striking point into a controlled device's operation system and provision of user feedback re her or his own actions e.g. as with a mouse, light sources, half-press mechanism, force sensing mechanism. Each of these is described in detail below, according to example embodiments of the present invention.

RF Controllers: The two or more RF controllers may be located at the 2nd & 3rd parts of the finger but not necessarily e.g. as shown in FIG. 1b). Each of them is able to transmit direct events to the application residing on the controlled device via any kind of wireless communication. The controlled device may be a Laptop/Desktop computer, mobile phone, camera, television and substantially any device that employs Human-Computer-Interaction (HCI). Those events may then be interpreted as mouse clicks (e.g. left and right) in a way similar to the way a cordless mouse operates.

Scroll bar: The scroll bar is a touch-sensitive electronic pad which simulates the operation of a scroll-wheel, creating signals that are transferred to the application in the same way. The Input device's touch scroll bar is not visible in FIG. 1b as it is right under the thumb in the image. In summary, the scrolling operation of the Input device is typically effected by sliding of the thumb along one side of the finger in any direction.

Cursor position: Input device control of the cursor position, according to certain embodiments, is now described, using the remote control environment being operated by the IR Laser as an example. Other environments/light sources, as described below, may share the same control scheme. A laser beam in the IR/near IR spectrum is emitted from the Input device, and strikes the screen at a given point. That point's coordinates are transferred to the application.

Figure 3:
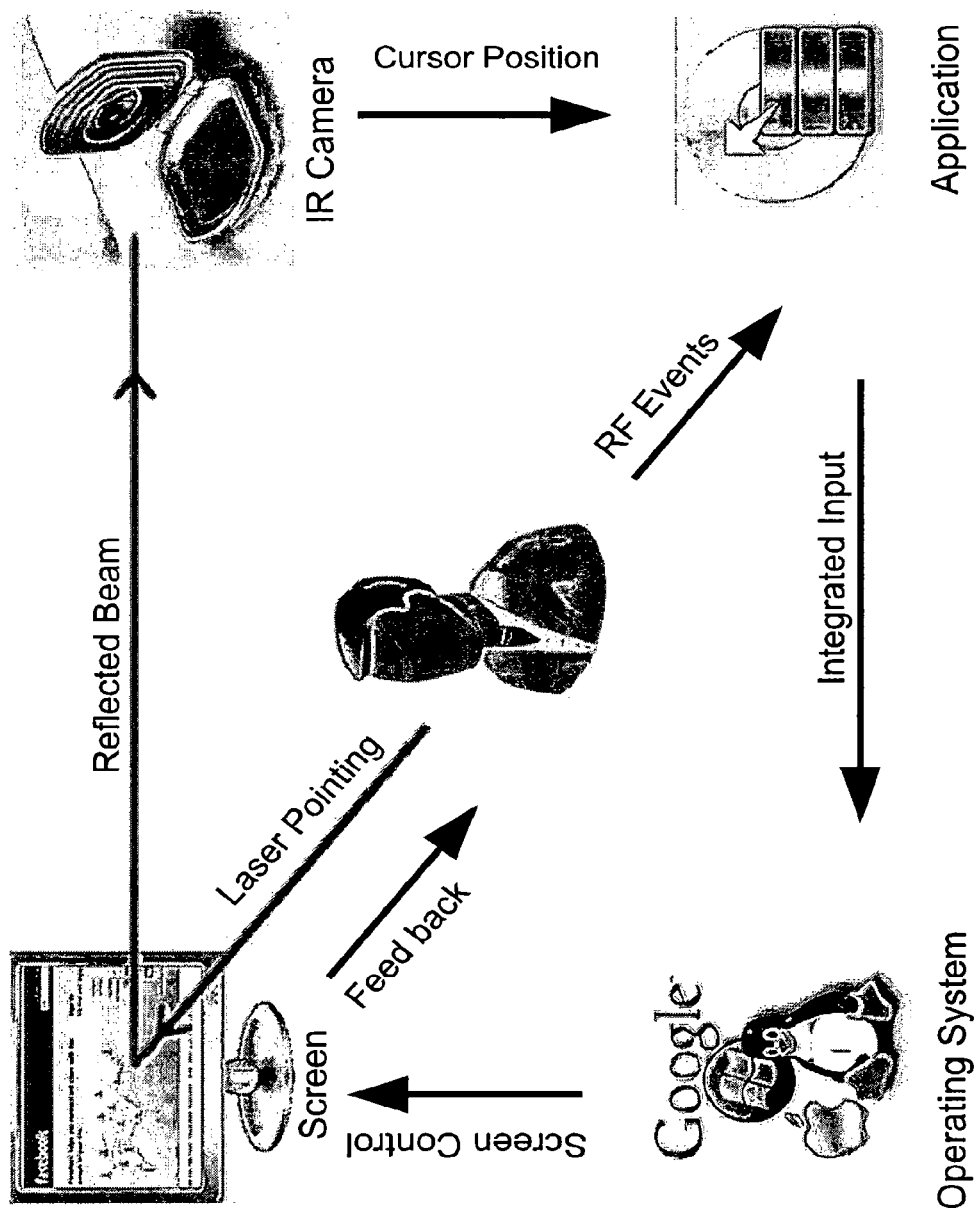
FIG. 3 is a pictorial diagram of a second method whereby a wearable input device constructed and operative in accordance with certain embodiments of the present invention controls a computerized application.

There are several ways to detect that point such as but not limited to some or all of the following:
a. After striking the screen, the laser beam is scattered into the space of the room. An IR camera is constantly videoing the screen area and detects the points on the screen where the laser beams are being scattered from. The camera has been pre calibrated to know the exact area of the screen within its field of view, so that it may convert the light source's absolute position to its exact relative position on the screen. The camera then sends this input to the application. Alternatively, part/all of the abovementioned processing may take place in the application on the controlled device rather than at the camera.
b. Two or more IR cameras are located on the ribs of the screen, constantly videoing the screen and sending their input to a Central Computing Unit (CCU). Then, using mathematical and trigonometric computations on the integrated input, the CCU detects the contact point between the laser beams and the screen, sending it to the PC application.
c. The screen as a whole is an optic sensitive screen, which may self-detect the striking point of laser beams at a given range of the electromagnetic spectrum.
d. The image is typically not projected onto the screen frontally, i.e. from the side of the user, but rather from behind (back projection). The laser beam hits the screen, scatters in the space of the room, and is absorbed by the IR-camera that is positioned behind the screen close to the projector. The camera sees the point on the screen from where the beam emanates, and thus identifies where on the screen the user is pointing. Integration of mouse clicks, scroll messages, beam striking point into a controlled device's operation system and provision of user feedback re her or his own actions: a module of the application typically receives some or all of the abovementioned inputs, including e.g. some or all of mouse clicks, scroll messages, and beam striking points, and integrates them into the controlled device's OS. The user receives feedback to her or his actions as if s/he were using a mouse, e.g. the mouse cursor may move on the screen, click open windows and menus, etc) and the interaction continues. FIG. 3 is a pictorial diagram of this process according to certain embodiments.

Light Sources: As described above, the Input device typically includes several light sources such as but not limited to some or all of the following:
a. Infra red laser—may be positioned e.g. Laterally on the finger between the first and second joints (middle of the finger e.g.) or Parallel to the finger between the second and third joints (base of the finger e.g.).
b. Red Laser—may be positioned as described below for Infra red laser.

c. Infra red LED—may be positioned on the finger tip on the revolving piece. However, the source of the IR LED may also be positioned on any part of the finger.

The camera typically identifies the source of the IR LED exactly in the same manner as it identifies the point where the laser beam scatters as described above—the rest of the process is as described above. The camera cannot of course identify the actual red laser beam; instead it emphasizes elements on the screen without the ability to act upon those elements.

Since the Input device is a wearable device, it constantly follows hand movement. Therefore, the user has the ability to choose when s/he wants it to influence the cursor position and when not.

The control of the sources of light may be affected by one or both of two mechanisms, half-press and force-sensing, each described in detail below. The user may determine which light source each mechanism controls at any given moment, either from the application interface and from the Input device itself, e.g. using the Selection Controller. In addition, the user may always choose to leave the light source on continuously in order to manipulate the pointer location at all times.

Half Press Mechanism: Each of the RF controllers is constructed in a two press manner—half & full press. The operational algorithm of the mechanism above is described in FIG. 1e which is a state chart of the half press mechanism. When the Button Up/Down Event is implemented, it may be used by wireless communication and by a different encoding of the source that is emitted from the Input device and that is received by the IR-camera which effects a system command when a specific control is pressed. In effect, all the information that is transferred by wireless communication may be transferred by any specific encoding of the light source.

Force Sensing Mechanism: The revolving part at the finger tip has a specific type of force sensor such as but not limited to FSR. When the applied force exceeds a specific threshold which may be user-configurable, the appropriate light source is turned on. After the applied force falls below the threshold or goes to zero, the light source turns off. Enable/Disable may be enacted with this mechanism using the pad of the finger in the area of the finger nail of the inner/crossing finger respectively. The user may enable this in any suitable matter, such as but not limited to:

a. Placing a capacitor along the length of the nail where the input is the direction of its discharge; or b. A physical control positioned in the area of the fingernail. Light Source Interpretation according to certain embodiments is now described. Typically, the Input device application may work in multiple modes of operation such as touch screen mode, mouse pad mode, and position only mode, e.g. as described below. The transition between modes may be enacted using the Selection controller of the Input device and from the interface of the application. App_Touch Screen: When the light source is turned on, the application positions the cursor in the appropriate place and executes a Left Click down. When the light source is turned off the application executes a Left Click Up in the exact place where the light source appeared before turning off. When the light source moves, the application executes a mouse movement. Since typically, this only happens between Left Click Down and the Left Click up, it therefore acts as a Drag&Drop. When the light source turns on/off/on/off the application interprets this action as a double click. App_Mouse Pad: The light source is always implemented as a mouse movement typically with exceptions such as but not limited to some or all of the following: i. Left Click: Less than a second (or other user-selectable time-period) has passed from the moment it was turned on to the moment it was turned off, and if during this time period, e.g. second, the light source did not move, even minutely.

ii. Double Click/Drag and Drop: A small movement of the finger between the two clicks may nullify the Double Click implementation by the operating system. Therefore, each single click executes a timer. If the system identifies another click at this time, notwithstanding location, the second click may be implemented exactly in the same place as the first click. If the system identified that the light turned on only during this time without turning off, without regard to location, the system implements a Drag&Drop exactly from the position of the first click. App_Position Only: In this situation status, the light source is implemented as a mouse movement only and cannot execute any type of mouse clicks.

Dots per Inch: optionally, in the IR LEG configuration, tracking the user may reduce the dpi, using a keyboard for example, thereby to enable the user to pinpoint very smaller icons with greater ease.

An ejectable stylus option may be provided according to which a small stylus is connected to the Input device which protrudes slightly from the finger tip. The connection to the finger tip may be executed by screwing, applying pressure or any other mechanical application. This mechanism enables the user to have maximum specificity at the point of contact with the screen for applications in which precision is important. The stages of operation may include some or all of the following, suitably ordered e.g. as follows:

a. When the user wants to press with her or his finger on a specific area, the Stylus touches the area, because it protrudes, and therefore pressure is applied b. The base of the Stylus, which completely absorbs the pressure applied on the Stylus, pushes on the Force sensor typically located on the revolving side of the finger and effects an on/off of the IR LED.

c. Instead of scattering the light from the IR LED bulb, the light enters the stylus from one end connected to the bulb and exits only from the other side which contacts the screen, similar to the operation of fiber optics.

d. The camera identifies the light source from the point of the Stylus. Optionally, a Pressure differentiation feature is provided according to which the Input device communicates to the application the level of pressure put on the Force sensing mechanism. The application may relate to the light sources differently based on the level of pressure applied. Thus the user may execute different actions based on how much pressure s/he puts on the surface.

For example, gentle pressure may execute mouse movement whereas more pressure would execute a Drag &Drop. The mechanism may also be controlled via the interface of the application. For example, thresholds of different pressure points and/or the appropriate actions they perform may each be configurable.

Optionally, a Red Laser feature is provided according to which the device switches to a laser-pointer mode, emitting, instead of an IR laser detectable by the IR camera, a red laser at the human eye viewable spectrum. Using this mode the user may switch from controlling the mouse to highlighting important features on the screen, similar to the way a regular laser-pointer works. It is important to note that although the user has no effect on the cursor position, the other functionality of the Input device, such as clicking and scrolling abilities, continue to work regularly. Optionally, a Multi-touch feature is provided according to which an Input device worn on one or more fingers of both hands enables the user to interact with the screen using a complete multi-touch ability.

Different encoding of the source of light enables the application to connect between appropriate sources of light from the Input device and from the user's perspective from the appropriate hand or finger.

Optionally, Four Way Scrolling enhanced input is provided. Using a Input device, the user may effect 4-way scrolling whereby one hand is responsible for horizontal scrolling and the other hand for vertical scrolling, without constantly moving the cursor back and forward. This is useful in programs like Excel, drawing boards and substantially any application where the file is larger than the visible screen size. The user may determine the role of each hand and finger. When the system receives events from a different devices, or hands/fingers, simultaneously it may alternate passing them to the system, passing an event from each device alternately until all events have been passed. The outcome is circular scrolling on the screen that is completely open and free.

Optionally, enhanced remote text input is provided. The Input device enables effective use of virtual keyboards whereby the user may type freely with two or more fingers in a much more intuitive way and also use shortcuts such as but not limited to Ctrl+C, Windows+E. Optionally, programmable gestures are provided.

The Input device application includes several common gestures such as, the @ to open a mail application, or the V sign to promptly open and close a virtual keyboard. This option typically also enables the user to create an unlimited number of personalized gestures, each of which may execute a commonly used action of the user. In addition, an engine may be provided that alerts the user, and in certain cases blocks the user, from creating a new form that is too similar to a form already in use, thereby to decline the True-Negative in the system.

Typically, the mode of operation of this option is as follows: a. Clicking on a button/combination of buttons, e.g. Double right click, notifies the application that the user is requesting to switch to Gesture command mode.

b. The application gives feedback to the user that s/he is now in Gesture Command mode.

c. The user receives feedback from the screen with regard to the shape s/he is trying to draw in an attempt to help the user draw more accurate 'forms'.

d. At the end of the process, the system analyzes the form and implements the appropriate command. Optionally, Embedded Flash Memory, e.g. Disk on Key, is provided. The Input device has internal flash memory such that it serves as a disk-on-key as well. Transferring information may be executed in a number of methods including using a USB port, using the Input device docking station e.g. as described below, WIFI and other connection methodologies.

The internal memory of the Input device enables the controlled environment to immediately load the user's preferences including for example gestures that s/he's created, dpi preferences etc.

Optionally, an embedded speaker and microphone is provided. The speaker is located on the rotating finger tip apparatus while the microphone may be placed anywhere. In this manner, the Input device may serve a communications function, e.g. a Blue tooth earpiece, where the user places her or his finger wearing the Input device next to her or his ear.

Optionally, Multiple Environments are provided.

The Input device is a personal control mechanism and is not intended for a specific work environment like a personal computer. By a pairing mechanism, the Input device may control any environment that supports it, e.g. like the communication between a Blue Tooth device and multiple cellular phones.

The user may go from device to device, click on her or his unique user-ID and start interacting with it.

Optionally, social interfacing is provided.

The IR camera and the Input device control application may handle several light sources simultaneously and therefore enables several users to share work space in the same environment. Due to the fact that the Input device is a personal control device, the system may associate sources of light to different users and therefore to relate to them in a different mode. Different encoding of the light source for each user in addition to the wireless communication may accurately identify each user at the time of the social interfacing. This individual identification enables management of different interactive permissions for every user. In addition, groups may be established, enabling permissions to be switched between sets of people rather than individuals.

Optionally, ergonomic posture is provided in that the Input device utilizes the hand's and wrist's natural hand position. Traditional mice are designed around the "palm down" posture that has been proven to contribute to Repetitive Stress Injury (RSI) and Carpal Tunnel Syndrome (CTS). The Input device applies a clinically proven technique to relieve pressure from the median nerve in the wrist which is similar to the 'Hand shake position'. This position has been shown to reduce muscle load and the incidence of discomfort associated with RSI and CTS.

Optionally, ergonomic customization is provided in that the Input device is available in several sizes for maximum comfort to the user. The differences in size may be around the circumference and the length of the Input device. In addition, as described above, the Input device body may be made of a combination of flexible polymers with memory shape which may easily conform themselves to the user's physical dimensions.

Optionally, bidirectional synchronization is provided. Bidirectional communication between the controlled environment and the Input device enables automatic synchronization between the settings of the application to the internal settings of the Input device and vis. vs. For example:

a. Control over the level of the laser beam through the application b. A change in the work modes of the application may cause the active light source to change as well.

The mechanism of the bidirectional synchronization optionally enables the system to pre-define the users' modes of operation such that any changes in one direction may automatically synchronize in the other direction. The user may always add additional operational modes.

Examples of how the mechanism may be applied to several popular work modes are now described. Settings for the Input device may include setting one of, say, two mechanisms for turning on the light source, e.g. Half Press Mechanism and Force Sensing Mechanism as described herein; setting one of, say, three Light Sources (IR LED, IR Laser and Red Laser); and setting one of, say, three modes of operation in the application e.g. App_Touch Screen, App_Mouse Pad and App_Movement Only. Examples of available modes of operation for the Input device and their settings may include but are not limited to the following:

a. Touch Screen: Force Sensing Mechanism+IR LED+App_Touch ScreenMouse b. Pad: Force Sensing Mechanism+IR LED+App_Mouse Pad c. Remote Control: Half Press Mechanism+IR Laser+App_Movement Only d. Nearby Control (also referred as 'KeyTop' control E.g. as described below): Half Press Mechanism+IR LED+App_Movement Only e. Red Laser: Half Press Mechanism+Red Laser+App_Movement Only Examples of compatible Environments are now described, but are not intended to be limiting:

1. Projected Environments: The IR camera may be mounted on the projector facing the screen as shown in FIG. 1e. In projector environments, the user has full control, from anywhere in the area and may also control the projected screen with multitouch. This capability typically is provided regardless of whether the projection is from the rear or the front e.g. due to the mechanism that revolves at the fingertip and/or due to the use of lasers. In addition, this architecture works with any projector such as pico projects whether they are standalone or embedded in another device.

2. Physical screens: Control of physical (also termed herein "tangible") screens, such as but not limited to LCD or plasma, may, if desired, be effected in exactly the same manner as projected, non-physical screens. The IR-camera is positioned such that it is facing the user. In this manner, the user may control any physical screen such as but not limited to IPTV, home theatre, and media center.

3. Keytop Control: This mode enables the user to control desktop and laptop computers. In this mode's settings, the IR camera is located at the upper rib of the computer screen, facing down towards the user's hand (typically lying on the keyboard). The user uses both hands to work with the keyboard and when s/he wishes to move the mouse cursor or do any other mouse operation such as clicking or scrolling, s/he does not need to lift her or his hand from the keyboard and hold the mouse—s/he uses the Input device while her or his hands are still on the keyboard. The IR camera located on the computer's screen detects the IR signals being emitted from the Input device and sends them to PC application module on the controlled computer which transforms them into mouse movements on the screen, e.g. as shown in FIGS. 1g and 1i. Using the Input device with desktop and laptop computers, the user may have full control of the keyboard and mouse while both her or his hands remain on the keyboard.

Advantages of certain embodiments include but are not limited to some or all of the following:

a. Effectiveness—the user's work rate increases as the move from mouse to keyboard requires zero setup time. Many users are wary of the constant move of hands from mouse to keyboard and work with one hand on the mouse and one hand on the keyboard. This approach suffers from limitations because keyboards are planned for two-hand use.

b. Ergonomics—The frequent move from keyboard to mouse wears the wrist and shoulder joints—a phenomenon which Input devices, according to certain embodiments of the invention, overcome. Additionally, it is a known fact that daily work with a regular mouse may, in the long-term, create issues such as Carpal Tunnel Syndrome and Repetitive Stress Injury. Beyond the pain, these effects cause considerable financial loss due to decreased work rate and, in more serious cases, punitive damages. The ability to work without needing to lift the hands every time to hold another object may drastically decrease such phenomena.

c. Space resources—the mouse located next to the computer requires additional table space, especially when padding surfaces are provided due to its inherent lack of ergonomics. This limitation becomes critical especially when working in limited spaces, usually with a laptop.

d. multitouch abilities on a huge virtual mouse pad which may for example be an order of magnitude bigger than conventional physical embedded mouse pads After embedding the IR camera in laptops at manufacturing stage the Input device may transform into a completely independent unit, communicating with the laptop without the need for external devices.

4. Touch screens—The wearable input device typically is operative to turn any surface into a fully operative multi-touch screen utilizing a finger touch control method, e.g. as follows:

A. when the screen is projected onto the surface and the sensor is pointing at the projected screen, the user touches a specific location, thereby to trigger the force sensor and the active light source turns on B. when the screen is a tangible screen and the sensor points at the tangible screen, the user touches a specific location thereby to trigger the force sensor and the active light source turns on C. when the surface has no screen on it at all and is used to control e.g. mouse pad and/or another screen, the user touches a specific location, thereby to trigger the force sensor and the active light source turns on.

Typically, there is no size limit for the controlled screen. For example, given a conventional projector, the apparatus of the present invention can, according to certain embodiments, convert a 200 inch wall sized surface into an enormous interactive multi-touch screen.

A particular advantage of certain embodiments of the Input device architecture, is that little development is required for future products that are to employ the input device shown and described herein. Typically, only two adjustments are made:

a. Mechanical adaptation of the IR camera to the new hardware or environment b. Code adaptation to the new operating system.

For example, to adapt the Input device to future applications such as Head-Up Display based on augmented reality, the IR camera as described herein is embedded in the Head-up display and its code adapted to the HUD's operating system.

According to certain embodiments, a docking station is provided, e.g. as shown in FIGS. 2a-2d. The roles of the docking station typically include some or all of:

a. Enabling the user to wear and remove the Input device from her or his hand quickly and efficiently and without the use of the other hand.

b. Protecting the Input device while in transit, e.g. inside a laptop bag.

c. Providing a casing for the Input device d. Charging the Input device. The docking station may be equipped with an internal large capacity rechargeable battery, and so is able to charge the Input device even when not connected to electricity. This extends the Input device's effective battery life much further. A preferred method for using the Input device shown and described herein in conjunction with a Docking Station, e.g. as shown in FIGS. 2a-2d, typically includes the following steps, suitably ordered e.g. as follows:

i. Wearing the device typically comprises:
   a. The user inserts her or his finger into the docking station
   b. The user rotates her or his finger 90 degrees counter-clockwise
   c. The user takes the finger out of the docking station with the Input device on it, ready to be used.

ii. Removing the Input device typically comprises:
   a. The user inserts her or his finger into the docking station while the Input device is on the finger.
   b. The user rotates her or his finger 90 degrees clockwise
   c. The user takes the finger out of the docking station, leaving the Input device inside.

Figure 4A:
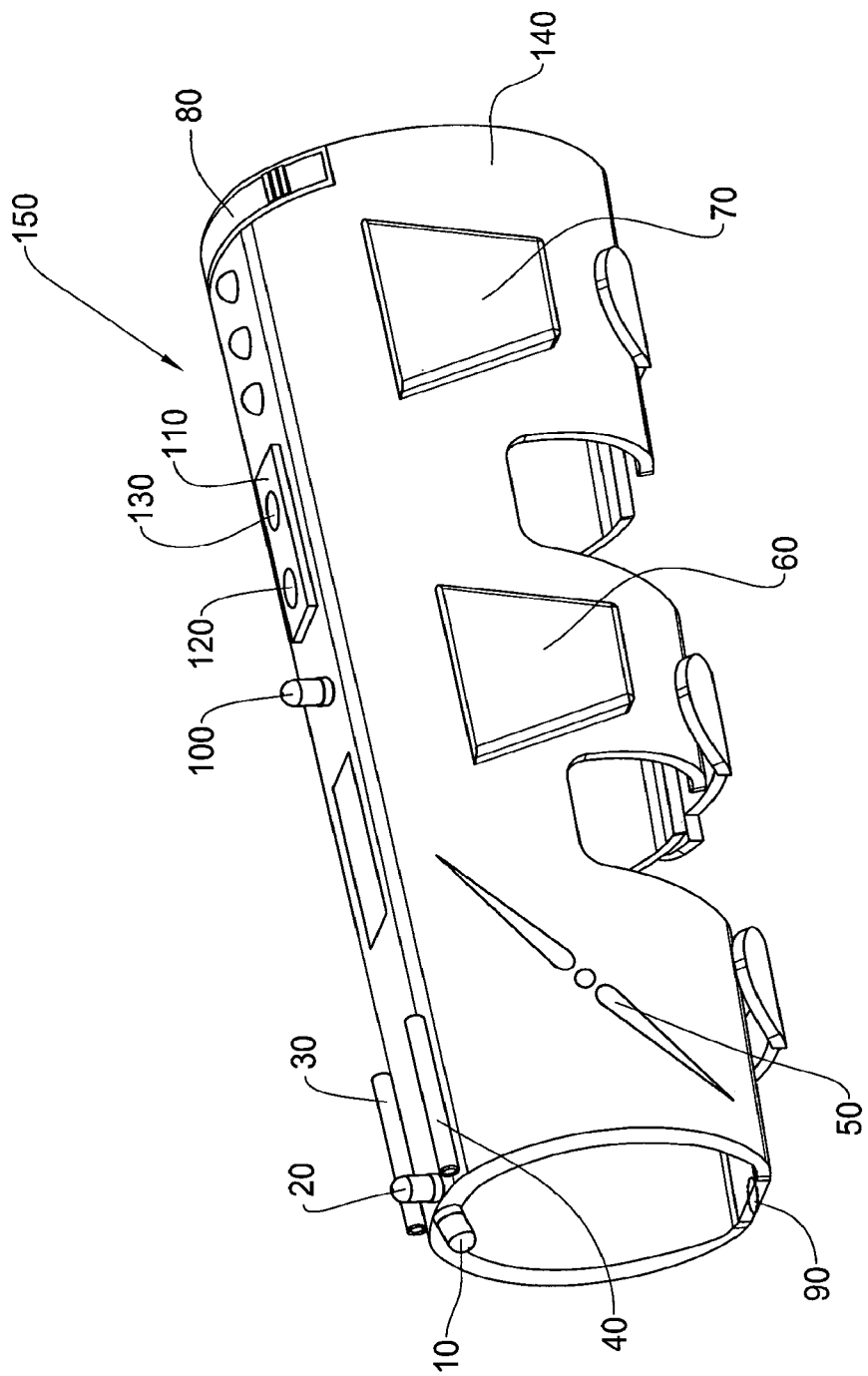
FIGS. 4a-4b are isometric views of a wearable "sleeve" device for generating computerized input to electronic devices, according to certain embodiments of the present invention.
Figure 4B:
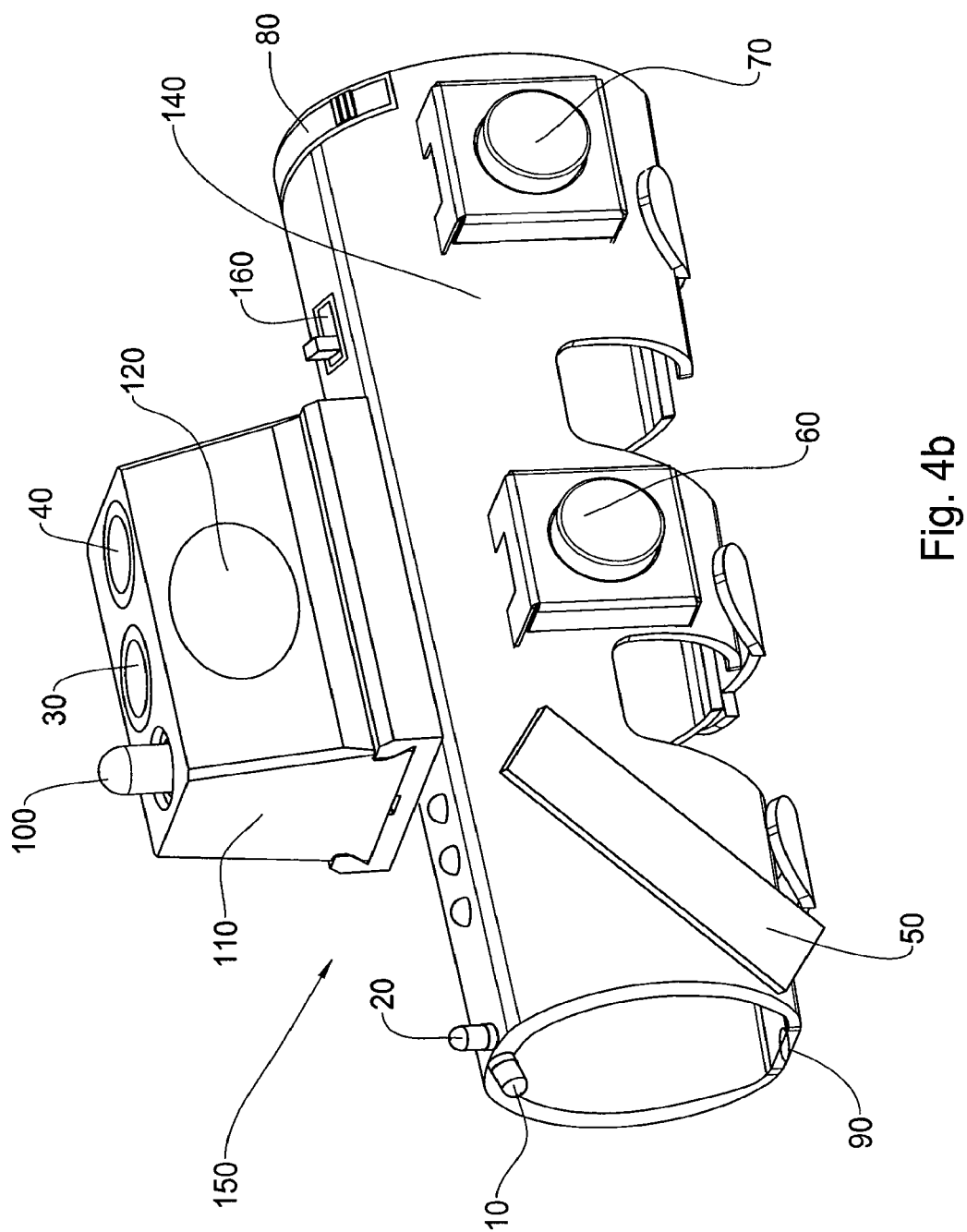

FIGS. 4a-4b are isometric views of a wearable "sleeve" device for generating computerized input to electronic devices, according to certain embodiments of the present invention. Typically, many of the components may be located anywhere on the sleeves without adversely affecting functionality and only the following components of the apparatus of FIGS. 4a-4b are location sensitive, e.g. as shown: Horizontal LED (light emitting diode) 10; Vertical LED 20; IR (Infra red) laser 30, Red laser 40, Touch scrolling bar 50, buttons 60 and 70, State selection actuator 80 and Force sensing actuator 90.

Figure 4C:
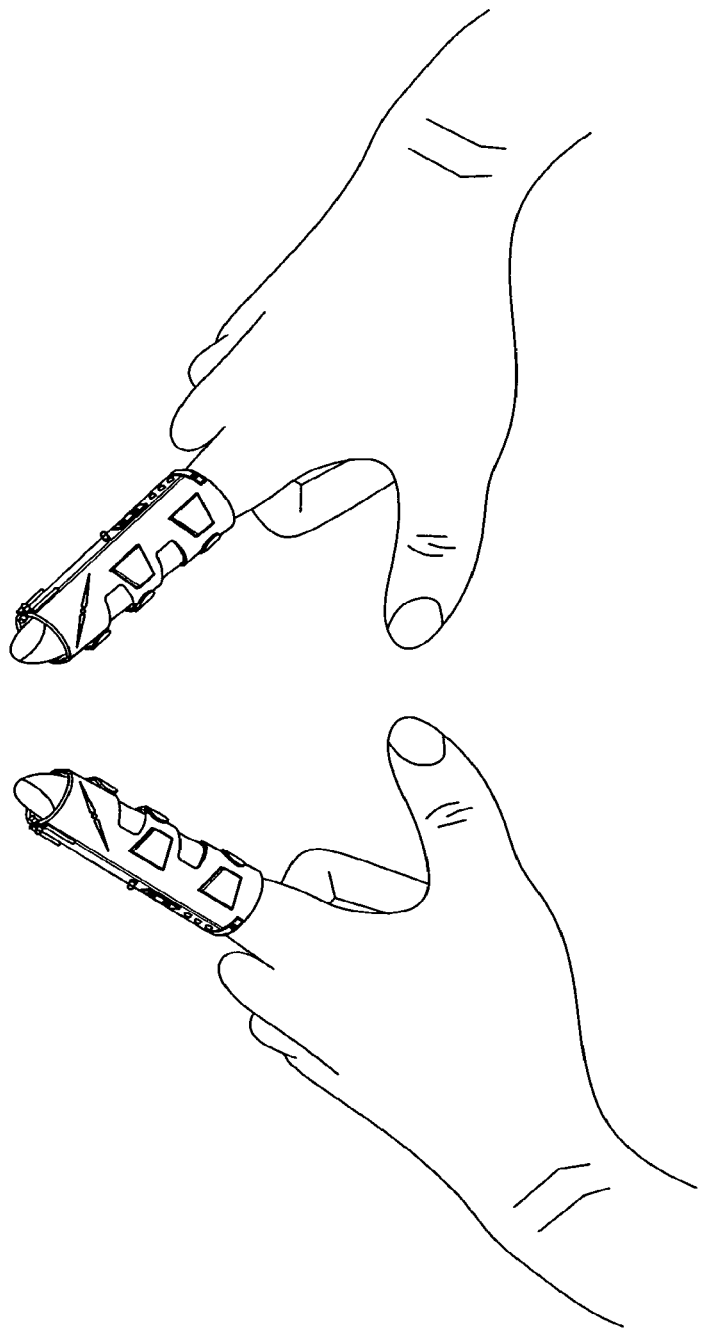
FIGS. 4c-4e are pictorial illustrations of the device of FIGS. 4a-4b as mounted on and manipulated by a user's hands, according to certain embodiments of the present invention.
Figure 4D:
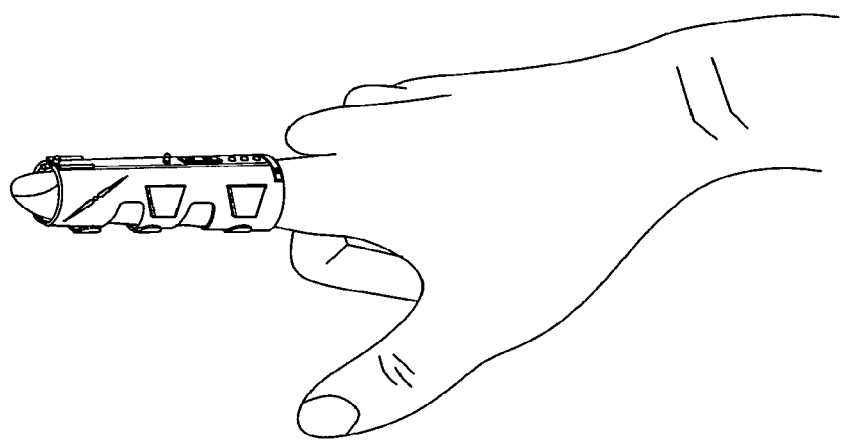
Figure 4E:
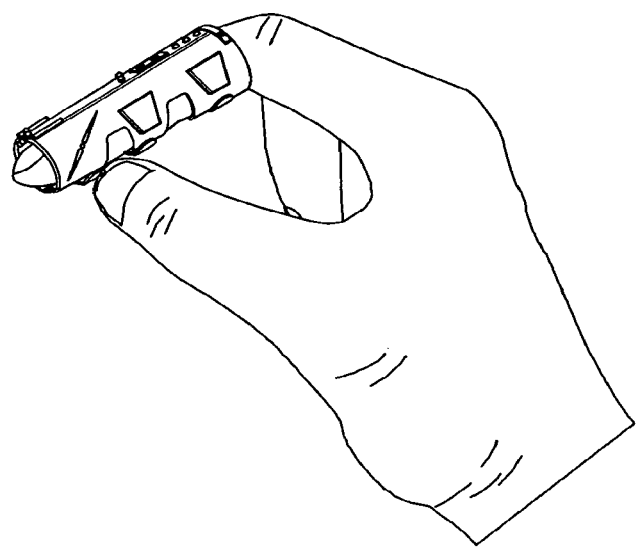

FIGS. 4c-4e are pictorial illustrations of the device of FIGS. 4a-4b as mounted on and manipulated by a user's hands, according to certain embodiments of the present invention.

FIG. 5a illustrates an exemplary plurality of work modes according to which the sleeve device of FIGS. 4a-4b may operate; which work modes are typically selectable as alternative states, using the state selection actuator 60 of FIGS. 4a-4b.

Multiple state selection functionality of the apparatus of FIGS. 4a-4b, according to certain embodiments, is now described. Using the state selection actuator 60 the user may select a work mode in which s/he wants the sleeve device to operate. The work modes differ from each other along two dimensions: type of active light source, and software operating mode. It is appreciated that the particular work modes included in the table of FIG. 5a are merely exemplary and none, one, some or all of these may in fact be provided.

The dimensions along which work modes differ may include one or both of:

a. Active light source dimension of sleeve's work mode: as described above, the sleeve device may have some or all of the following 4 light sources: IR Laser 30, Red Laser 40, Horizontal IR LED 10, Vertical IR LED 20. The active light source is typically triggered by the force sensing actuator 90.

b. Software operating mode dimension of sleeve's work mode: as described below e.g. with reference to FIGS. 6a-6b, 7a-7b, the sleeve device typically includes a software application which is typically resident on the controlled host e.g. computer or mobile communication device being controlled by inputs generated using the input generating system shown and described herein. The software application typically has several selectable operating modes, e.g. as shown in the rightmost column of the table of FIG. 5a, which differ from each other as to, e.g. input interpretation and operating method.

Each work mode is typically predesigned to control one or more environments such as one or more of the following controlled environments: projected screen environment (front or rear), physical screen environment, laptop/desktop computer environment, mobile devices with embedded pico projector and interactive surfaces environment. Table of FIG. 5A summarizes seven exemplary work modes, of the state selection actuator 60, some or all of which may be provided.

Figure 5B:
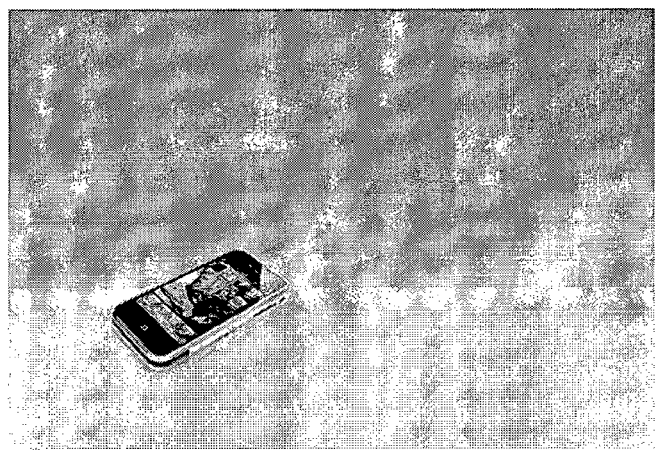
FIG. 5b illustrates a pico projector embedded in a mobile communication device such as a cellphone, which is operative in conjunction with a wearable input device according to certain embodiments of the present invention.

Four exemplary Controlled Environments (projected screen environment, physical screen environment, laptop/desktop computer environment, and interactive surfaces environment) controlled by the sleeve of FIGS. 4a-4b in accordance with a suitable work mode e.g. as shown in the table of FIG. 5a, are now described in detail. The selfsame input generating system, typically including sleeves of FIGS. 4a-4b, sensor of FIG. 1c, 1g, 1i, 5b or 5c, and software application described below with reference to FIGS. 6a-6b, 7a-7b, may be used to control multiple interactive environments such as but not limited to the four environments described below. Typically, the software application described below with reference to FIGS. 6a-6b, 7a-7b may interact with more than one sensor such that the user has the option of connecting an additional sensor to gain control of another environment simultaneously.

The Projected screen environment is now described in detail with reference to FIGS. 1c and 5b. Suitable work modes for the Projected screen environment may include the following work modes from the table of FIG. 5a: 1 (Touch interaction), 2 (Remote projected screen interaction) or 5 (Power point interaction). The sleeve device of FIGS. 4a-4b works with any projector including pico projectors whether they are standalone or embedded in another device (e.g. mobile phone), e.g. as shown in FIG. 5b.

Figure 5C:
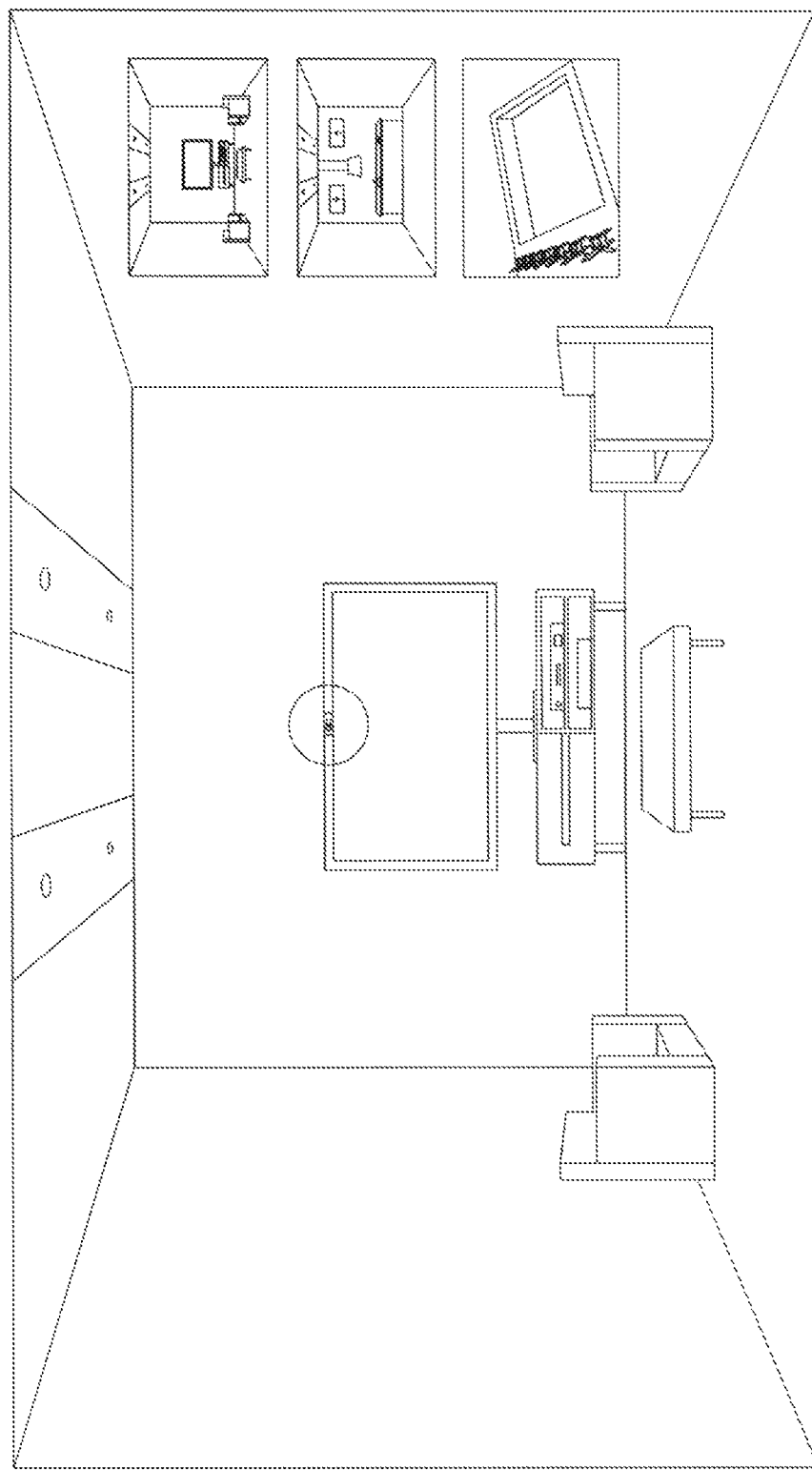
FIG. 5c illustrates a tangible screens environment which may be one of a selectable plurality of interactive environments in which the wearable input device shown and described herein is operative, according to certain embodiments of the present invention.

The Tangible screens environment is now described in detail with reference to FIG. 5c.

Suitable work modes for the Physical screen environment may include the following work modes from the table of FIG. 5a: 3 (Remote tangible screen interaction) or 5 (Power point interaction). The user may control any computer based application such as but not limited to an IPTV or a media center. When the sensor is pointing at the screen, from anywhere in the room, the user may perform touch interaction with the screen using work mode number 1 (Touch interaction) of FIG. 5a.

The Laptop/Desktop computer environment is now described in detail with reference to FIG. 1g. A suitable work mode for this environment may include the following work mode from the table of FIG. 5a: work-mode 4 (Laptop/Desktop computer interaction). The sensor may be mounted on an adjustable pivot which enables the user to raise it slightly and control the computer screen using work mode number 3 (Remote tangible screen interaction) e.g. as in environment 2 (Tangible screens). Typically, this environment employs optic communication between sleeve/s and sensor.

Figure 5D:
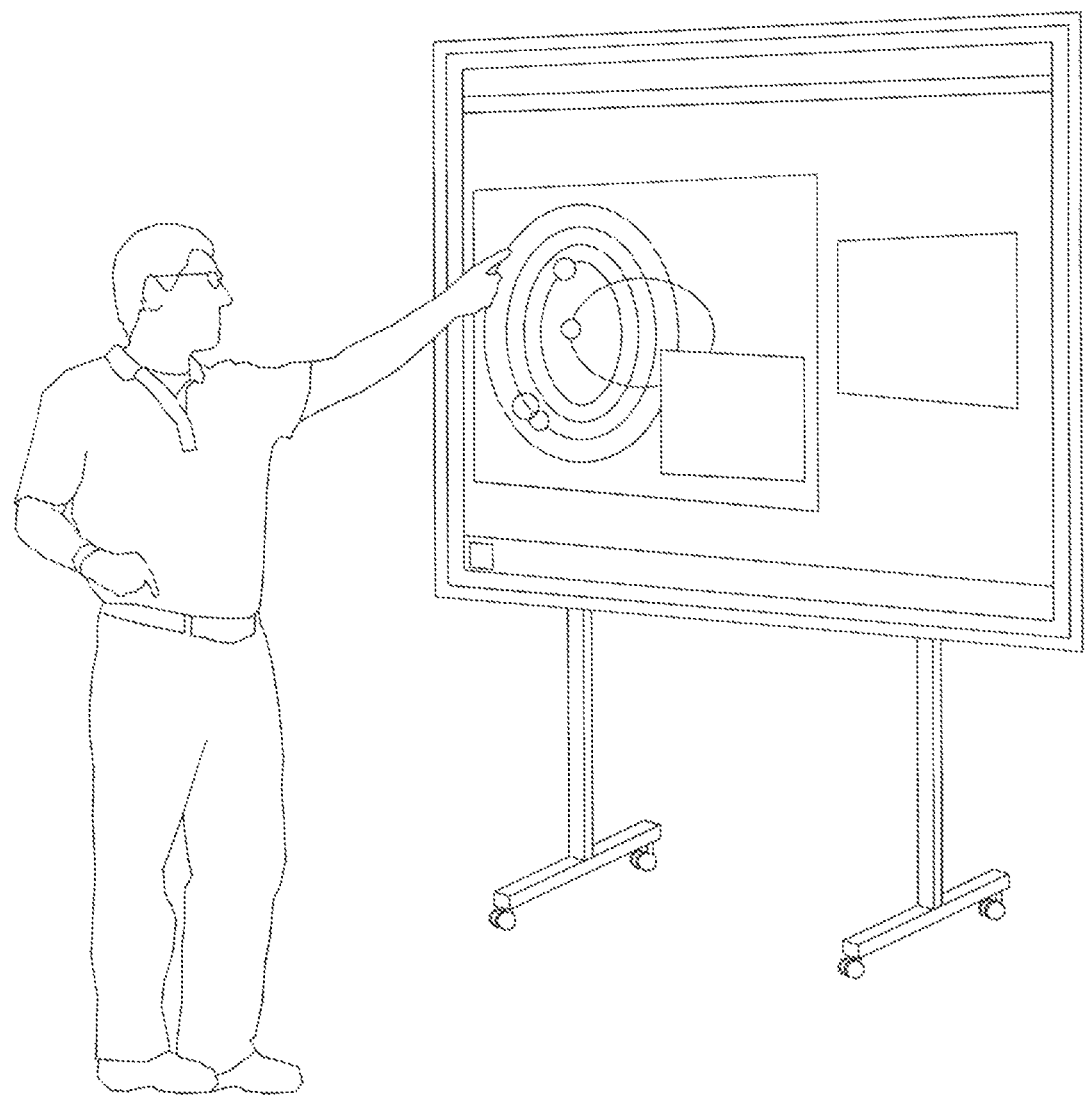
FIG. 5d illustrates an interactive surface environment which may be one of a selectable plurality of interactive environments in which the wearable input device shown and described herein is operative, according to certain embodiments of the present invention.

The Interactive surface environment is now described in detail with reference to FIG. 5d. In the Interactive surface the projecting unit and the sensor are both embedded within the surface's lower plane. A suitable work mode for this environment may be the following work mode from the table of FIG. 5a: work mode 6 (Surface interaction).

The input generating system shown and described herein typically provides communication channels between the following components: sleeves of FIGS. 4A-4B, software application as described below with reference to FIGS. 6A-6D, and a sensor e.g. the IR sensor mounted on a projector in FIG. 1c, on a laptop computer in FIGS. 1g and 1i, and on a mobile-communication device-mounted pico-projector in FIG. 5b. The communication channels may for example comprise:

a. Bi-directional wireless communication between the sleeve device of FIGS. 4a-4b and the software application resident on the controlled host.

b. Optic communication between the sleeve device (sleeves) and the sensor.

c. Bi-directional wireless communication between the sensor and the software application resident on the controlled host.

Each of communication channels a-c are now described in detail.

a. Wireless Communication Channel Between Sleeves of FIGS. 4a-4b and Software Application Resident on Controlled Host:

When the user changes the sleeve device's work mode using the state selection actuator 80, the application software receives a respective event which changes the application's operating mode according to the table of FIG. 5a. However, if the sensor is static and used for a specific environment permanently, the user may notify the application software to always address that specific sensor with the suitable operation mode e.g. as described below with reference to FIGS. 6a-6b.

Each of the sleeve device's buttons 60 and 70 is able to trigger multiple events transmitted to the application software. Examples for such events include some or all of the following:

Left hand left button down
Left hand left button up
Left hand right button down
Left hand right button up
Right hand left button down
Right hand left button up
Right hand right button down
Right hand right button up The sleeve device's touch scrolling bar 50 is able to trigger multiple events transmitted to the application software. Examples for such events include some or all of:

Left hand scroll down
Left hand scroll up
Right hand scroll down
Right hand scroll up Each of the events transferred to the software application may contain background information regarding the user such as not but limited to her or his identity and her or his sleeve device's current operating mode. Utilizing the bi-directional communication, aspects of the sleeve device's sleeves may be controlled and modified directly from the software application. Examples of this type of communication include but are not limited to changing the sleeve device's work mode, embedding and modifying the user's ID and preferences to the sleeves memory; and controlling the coding of the light sources in order to enable the sensor to distinguish between users, hands and light sources on the sleeve itself.

b. Optics Communication Channel Between Sleeves of FIGS. 4*a*-4*b* and the Sensor:

The optics communication between the sleeves of FIGS. 4*a*-4*b* and the sensor of FIG. 1*c*, 1*g*, 1*i*, 5*b* or 5*c* is now described. The optics communication between the sleeves and the sensor may be such that the sensor is pointing at the controlled screen, e.g. as in environments 1 and 4 in the table of FIG. 5*a*. Alternatively, the optic communication between the sleeves and the sensor may be such that the sensor is pointing at the sleeve device's sleeves which are mounted on the user's fingers e.g. as in environments 1, 2, 3 in the table of FIG. 5*a*. Each of the above two embodiments is now described in detail. It is appreciated that environment 1 (Projected screens) of FIG. 5*a* is typically controlled by either of the above two embodiments, selectably, using a single sensor.

Sensor Pointing at Controlled Screen:

In Environment 1 (projected screens), the sensor constantly monitors the projected screen area. When the user joins her or his thumb to a finger, on which the sleeve of FIGS. 4A-4B is mounted, s/he presses the force sensing actuator 90 which triggers the sleeve device's IR Laser according to the sleeve device's selected operating mode. The IR Laser 30 is then emitted from the sleeve device's sleeve and impinges upon the projected screen at a given point. After impinging upon the screen, the laser beam is scattered into the space of the room. The sensor detects the points on the screen where the laser beams are being scattered from.

In Environment 4 (surface interaction), the image is not projected onto the screen from the side of the user (frontal projection), but rather from behind (rear projection).

A touchless embodiment of the present invention is now described in detail with reference to FIGS. 7*a*-7*b*. In the touchless embodiment, the surface has a rear projection unit located at the bottom of the surface which projects onto the surface at a very acute angle. This obviates any need for a distance between the screen and the projecting unit thereby allowing the surface to be a 'flat unit' as opposed to conventional rear projecting setups which require considerable distance between the screen and the projecting unit. Also, because the screen is projected onto the surface light may pass through it as opposed to physical screens like LCD and Plasma. This enables the IR sensor, also located behind the screen next to the projecting unit, to "see" the light emitted from the sleeve device light sources. As a result, the user need not actually touch the screen, which is an improvement over conventional touch systems. Instead:

i. The user 'pinches' (joins her or his thumb and finger together), e.g. as shown in FIGS. 4*d*-4*e*, typically adjacent a desired screen location, thereby applying pressure to the force sensing actuator 90 which triggers the sleeve device's IR laser according to the sleeve device's current operating mode.

ii. Responsively, the IR Laser 30 is emitted from the sleeve device and impinges upon the surface at the pinching point. After striking the screen, the laser beam is scattered into the space of the room behind the surface due to its transparent character as described above.

iii. The rear sensor detects the points on the screen from which the laser beams are scattering.

For example, FIGS. 7*a*-7*b* are front and back isometric illustrations of a flat surface with rear projection configuration, characterized by projection at a very obtuse angle such that projection may be from very close, in conjunction with a rear sensor, whose field of view typically comprises the entire screen. The 4 dotted line segments emanate from, and signify a suitable "field of view" for, both the camera and the projector which as shown includes the entire screen.

Sensor Pointing at Sleeves:

In Environment 1 (projected screens), the sensor constantly monitors the screen. When the user touches the surface on which the screen is projected s/he applies pressure to the force sensing actuator 90 which triggers one of the sleeve device's IR LED's according to the sleeve device's current operating mode. The light is then emitted from the IR LED and absorbed in the sensor which detects the exact position of the user's fingertip.

In Environment 2 (tangible screens), the sensor constantly monitors the space of the room. When the user join her or his thumb and finger together s/he presses the force sensing actuator 90 which triggers one of the sleeve device's IR LED's according to the sleeve device's current operating mode. Light is then emitted from the IR LED and absorbed in the sensor which detects the exact position of the user's fingertip.

In Environment 3 (laptop/desktop computers), the sensor constantly monitors the keyboard area or the space in front of the screen e.g., if the sensor is pivot-mounted as described above, according to its pivot direction. When the user joins her or his thumb and finger together s/he applies pressure to the force sensing actuator 90 which triggers one of the sleeve device's IR LED's, according to the sleeve device's current operating mode. Light is then emitted from the IR LED and absorbed in the sensor which detects the exact position of the user's fingertip.

The light sources may be coded, e.g. digital coding using discrete on/off, or analog coding using continuous power alternating, in a predetermined manner which enables the light sources to send background information to the sensor regarding the user with which the light sources are associated. The background may for example include the user's identity, her or his sleeve device's current operating mode, and the specific light source currently being used by the user's sleeve device.

Whenever one of the sleeve device's buttons 60 or 70 is pressed and held for more than, say, 0.25 seconds (typically this value is a dynamic parameter), the active light source turns on according to the current work mode. This results in the sleeve device communicating with both the sensor and the application software concurrently which facilitates, for example, remote drag & drop.

c. Wireless Communication Channel Between Sensor of FIG. 1c, 1g, 1i, 5b or 5c and Software Application Resident on Controlled Host:

The sensor constantly processes the data it receives including light source position and background information and sends the output to the software application. Utilizing bi-directional communication, every aspect of the sensor may be controlled and modified directly from the software application such as but not limited to any or all of the following: modifying the sensor's state—on, off, standby; creating initial communication with the sensor, and adjusting the sensor's sensitivity.

According to certain embodiments, the system of the present invention includes a wearable input device, which is in two-way data communication with a controlling module, typically comprising a software application, which also is in two-way data communication with a sensor as described herein. The sensor in turn is in typically one-way data communication with the wearable input device. The controlling software application sends commands to an operating system of a controlled entity such as but not limited to a laptop, personal or other variety of computer (in which case the operating system may for example be a Windows operating system), or a cellular telephone or other variety of portable communication device (in which case the operating system may for example be a Symbian or Google Android operating system).

One implementation of the software application which serves as the controlling module is now described with reference to FIGS. 6a-6b, 7a-7b. Generally, the software application receives input from the wearable input device/s and from the optic sensor e.g. IR camera and sends control commands, responsively, to the operating system of the controlled entity and, typically, also to the optic sensor (e.g. wake up commands) and/or to sleeve itself (e.g. change work mode commands). In the following description of an embodiment of the controlling software application, which is typically resident in the controlled electronic device, the optical data is, for simplicity, represented by infra red (IR) light and the wireless data is, for simplicity, represented by radio frequency (RF) communication.

Figures 6A, 6B:
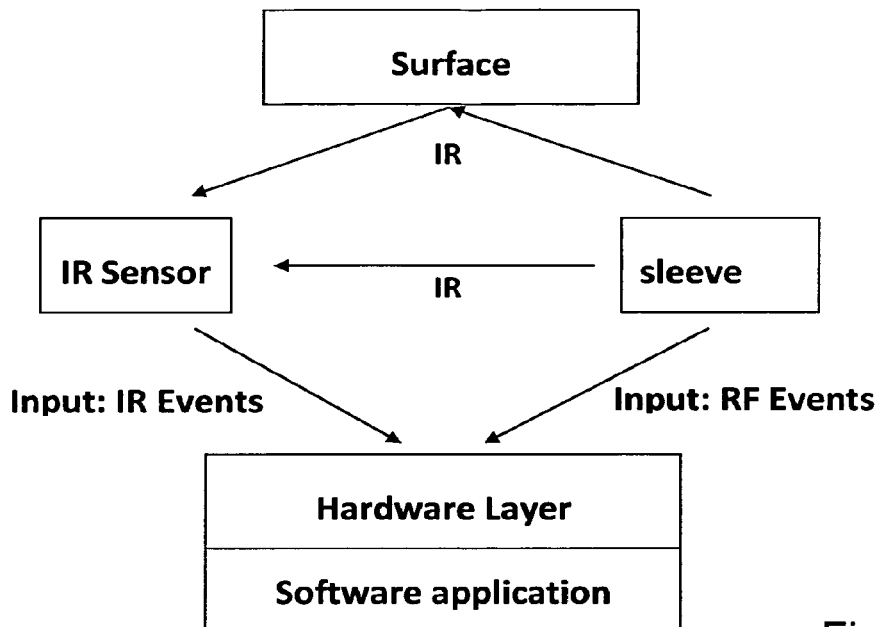

FIG. 6a is a simplified block diagram illustration of interactions between various components of the input-generating system, and the input the software application receives from the hardware (sensor or wearable input device), according to certain embodiments of the present invention. The inputs may include some or all of the data set out in the table of FIG. 6B. In FIG. 6b, "event type" refers to the type of application operating mode-changing event received by the software from the sleeve, via the wireless communication channel between Sleeves of FIGS. 4a-4b and software application resident on controlled host, as described above.

The hardware layer is responsible for receiving the raw data, processing it and sending it to the application layer. For example, the application layer might use DLL files or drivers in order to read the data from the hardware. Once the inputs have been received by the hardware layer, they are typically transmitted into the application layer. One way of implementing this, for example, is by using two threads that are continuously running in parallel and reading the inputs: one thread reads the IR data sent by the IR Sensor and one reads the RF data sent by the wearable input device itself.

Certain application modes are now described in detail.

Once the application receives the inputs from the hardware layer, it decides what to do with the information. The decision of action to execute may be decided using two factors:

a. The "state" of the application, also termed herein the "Application Mode".

b. The Input that has been received.

Provision of a plurality of application modes is optional yet advantageous. Using different application modes allows the system to run several forms of user interaction. For example, in the 'normal mode' (default), when receiving an IR event, the application may change the position of the operating system's cursors. In a different mode, when viewing maps using Google Earth, the IR movements may be translated into map movement, which is done using APIs. The same may be done with the RF inputs. The application is aware of its mode, and functions according to the method of operation which is associated with that mode.

The application may change modes in certain situations, such as but not limited to:

a. When a specific event occurs, for example, when a specific button on the Wearable input device has been pressed.

b. As a result of user interaction with the environment, for example, when the user is opening a new program.

c. When an outside event happens, for example, when a chat message appears on the screen.

Example Application Modes Include:

Normal (default) mode: may be used in order to control one or more of the applications. In this mode, the IR and RF inputs may control the operating system's cursors movement and clicks. This mode typically incorporates various "Operation Modes" which control the cursors differently, such as but not limited to some or all of the following operation modes each described in detail below: absolute position operation mode, touch operation mode, and mouse-pad operation mode.

a. Absolute Position—After retrieving the information from the IR Sensor, the application converts IR positioning values quantifying positions relative to the sensor's field of view into computer screen positioning values relative to the screen position, size and resolution, e.g. as per the calibration method described below. Once the application has calculated the IR position on the screen (X1, Y1) it commands the operating system to move the relevant cursor to the exact position (X1, Y1) when using windows, for example, it may use a Windows API called SetCursorPos. In this mode, mouse clicks may be effected using the RF signals (Wearable input device button clicks). For example—the sequence 'Right hand left click down'+'Right hand left click up' may implement a mouse click at the right cursor's current position.

b. Touch—This mode of operation uses the same cursor movement processing as does the Absolute position mode of operation described above. However, in Touch operating mode, mouse clicks may also be triggered by the IR input, in addition to triggering by RF input as described with reference to the absolute position operation mode.

a. The application monitors the number of IR sources found by the IR Sensor.

b. When it senses a new IR source it moves the mouse to the desired location on the screen AND sends a "mouse down" event to the operating system.

c. Likewise, whenever that IR source disappears, it sends a "mouse up" event to the operating system.

All of the above may be implemented for more than a single light source, typically limited only by the number of light sources the sensor may detect simultaneously. An example of a use case in which more than one light source may be useful employed is when controlling multi-touch application (e.g. Windows 7).

c. Mouse pad—The purpose of this mode of operation is to simulate a mouse pad using the IR information from the IR Sensor of FIG. 1c, 1g, 1i, 5b or 5c. This typically includes moving the cursor related to the cursor current location instead of an absolute location. To do so, the application waits until a new IR source appears, and saves some or all of the following values:
  a. The Initial mouse positioning—A1, B1 (where the cursor is currently before being moved, and exactly when the IR appears).
  b. The IR Initial Positioning (X1, Y1).

After the initial settings have been saved, the application monitors the movement of the IR. Upon reading that the IR has been moved, the application now typically knows:
  a. The initial IR Position (X1, Y1).
  b. The Current IR Position (X2, Y2).
  c. The Initial Cursor position on the screen (A1, B1)

Knowing these values, the application typically calculates the vector movement of the IR source (distance and direction), translates it into desired vector movement of cursor position (A2, B2) and moves the cursor accordingly.

Conversion ratio: Since the Mouse pad process uses a relation between the IR movement and the cursor movement the user may define a measurement conversion unit between the two. Setting this value may allow the user to move the cursor faster or slower, balancing speed with precision. For example—When setting this value to 2, a 10 inch movement of the IR source in space may trigger a 20 inch movement of the cursor on the controlled screen. In this mode, the application may simulate mouse clicks by reading the RF signals (Wearable input device button clicks) or by detecting an IR source that has been activated for a short period of time (less than a second, for example), just like in a tangible mouse pad.

FIG. 7a is a table setting out example results of various Operation Modes within the Normal Application Mode when an IR source is detected.

Calibration mode: Calibration is the process of defining the relation between the IR sensor's spectrum (scope of view) and the screen. When entering or starting operation in Calibration Mode, the Application shows visual indications on the screen/surface. Then, using the Wearable input device's IR source, the user signals that indicators location to the IR sensor. After the application receives the IR data, it has 2 sets of data: coordinates of the indicators on the screen {(A1, B1) (A2, B2) etc.} and coordinates of the sensor's scope from which the light has been received accordingly {(X1, Y1) (X2, Y2) etc.}. After calibrating more than 1 point the application uses trigonometric computation in order to convert the sensor's raw coordinates into screen coordinates.

The calibration computations also typically handle the direction of the conversion. For example, the left and right points at a sensor located behind the screen (i.e. environment number 4—surface interaction) are exactly opposite to those retrieved by a sensor located in front of the surface (i.e. environment number 1—projected screens).

Application mode: Activated when an application that may use the Wearable input device's inputs in a special way is opened such as but not limited to the Google Earth application. Because Google Earth may receive various kinds of inputs such as map moving, zoom in/out, pan and tilt, optic and wireless input received by the software application are converted into meaningful orders to Google Earth, as opposed to merely sending cursor movements and clicks to the operating system. To achieve this, when in application mode number 1, e.g. Google Earth, the software typically distinguishes between some or all of the following 3 sub-states (a)-(c) which differ from one another e.g. in their input interpretation:
  sub-state a—One IR Point, Moving the map: When the sensor detects only one IR source is moving, the application orders Google Earth to move the map, according to the distance and direction of the IR movement.
  sub-state b—Two IR Points, Rotate and Zoom: When the sensor detects two IR points AND the user has entered the rotate and zoom sub-state, the application orders Google Earth to move and rotate the earth concurrently, e.g. as illustrated by the example set out in FIG. 7b.
  sub-state c—Two IR Points, Pan and Tilt: When the sensor detects two IR points AND the user has entered the pan/tilt sub-state, the application orders Google Earth to Pan and Tilt the earth in space, rather than rotating and zooming as in sub-state b.

Examples of other special applications which may trigger a certain application mode include but are not limited to specific games where controlling the game is not achievable by conventional movement and click events, and advanced applications which employ complex interaction. The software typically provides individual support for each such application.

Gesture mode: A "gesture mode" may be provided which is used to activate a specific operation based on a pre-recorded path of IR inputs. The Gesture Mode may include one or both of the following two sub-states:
  a. Definition sub-state—The user defines an IR path which the application is recording, and adds an action to this path. Example: a first, e.g. V sign may open a specific virtual keyboard software, a second, e.g. @ sign may open a mail application, a third, e.g. 'e' sign may open a browser application etc.
  b. Execution sub-state—The user decides that s/he want to execute a gesture. S/he triggers the application to enter the execution sub-state, e.g. by holding down one button of the wearable input device for a period of at least a predetermined length e.g. a few seconds. The user then moves one or both of her or his hands to create the relevant gesture path. The application then compares this path to the internal gesture database and when finding a match, runs the desired action.

Optionally, multi-touch functionality and/or multi-user support are provided by the software application. According to this embodiment, e.g. as shown in FIG. 4c, the Wearable input device typically includes a pair of wearable input devices which are enantiomers i.e. are mirror images of each other such that they may be worn on both hands, the IR Sensor may send positions of a plurality of IR points to the application simultaneously and the software application is designed to handle multiple IR inputs concurrently. With operating systems that support multi touch, e.g. Windows 7, the standard multi-touch API may be employed in order to control default multi-touch behavior. With operating systems that do not support multi touch, a multi touch environment may be simulated. For example, multi-touch painting software may be created that may display several simulated cursors on the screen based on the detected IR sources. Since the RF and IR data typically include a unique identifier of the Wearable input device e.g. user ID plus identification of hand as either left or right) the application may contain the unique identifier of each Wearable input device that operates each cursor on the screen operated by more than one user. When receiving an RF event (left click up for example, also containing the Wearable input device's unique identifier), painting occurs on the screen, using the appropriately corresponding cursor and without affecting other users' cursors.

Optionally, user preferences are accommodated by the software application. Some or all of the variables that define the behavior of the application in specific modes may be saved in the software application's internal memory. However, each and every one of them may be saved per a specific user, specific sensor or any combination between the two. Examples include:
- A. Conversion ratio—a certain user defines that whenever s/he interacts with the system using the 'mouse pad' operating mode described herein, regardless of the controlled environment or the sensor being used, s/he always wants to use a conversion ratio size of, say, 4.
- B. Calibration—a certain sensor is permanently mounted atop a stationary projector. A user defines that regardless of the active user identity, the calibration setting may always be a particular value, for that specific sensor.
- C. Gestures—a certain user may define that when s/he interact with sensor A s/he wants a particular gesture V to do something but when s/he interact with sensor B s/he wants the gesture V to do something else. The user may also define different gestures on each sensor.

One implementation of hardware components of a wearable input device constructed and operative in accordance with certain embodiments of the present invention, is now described with reference to FIGS. 8a-8q. It is appreciated that this and other detailed implementations are described herein merely by way of example and are not of course intended to be limiting.

Figure 8A:
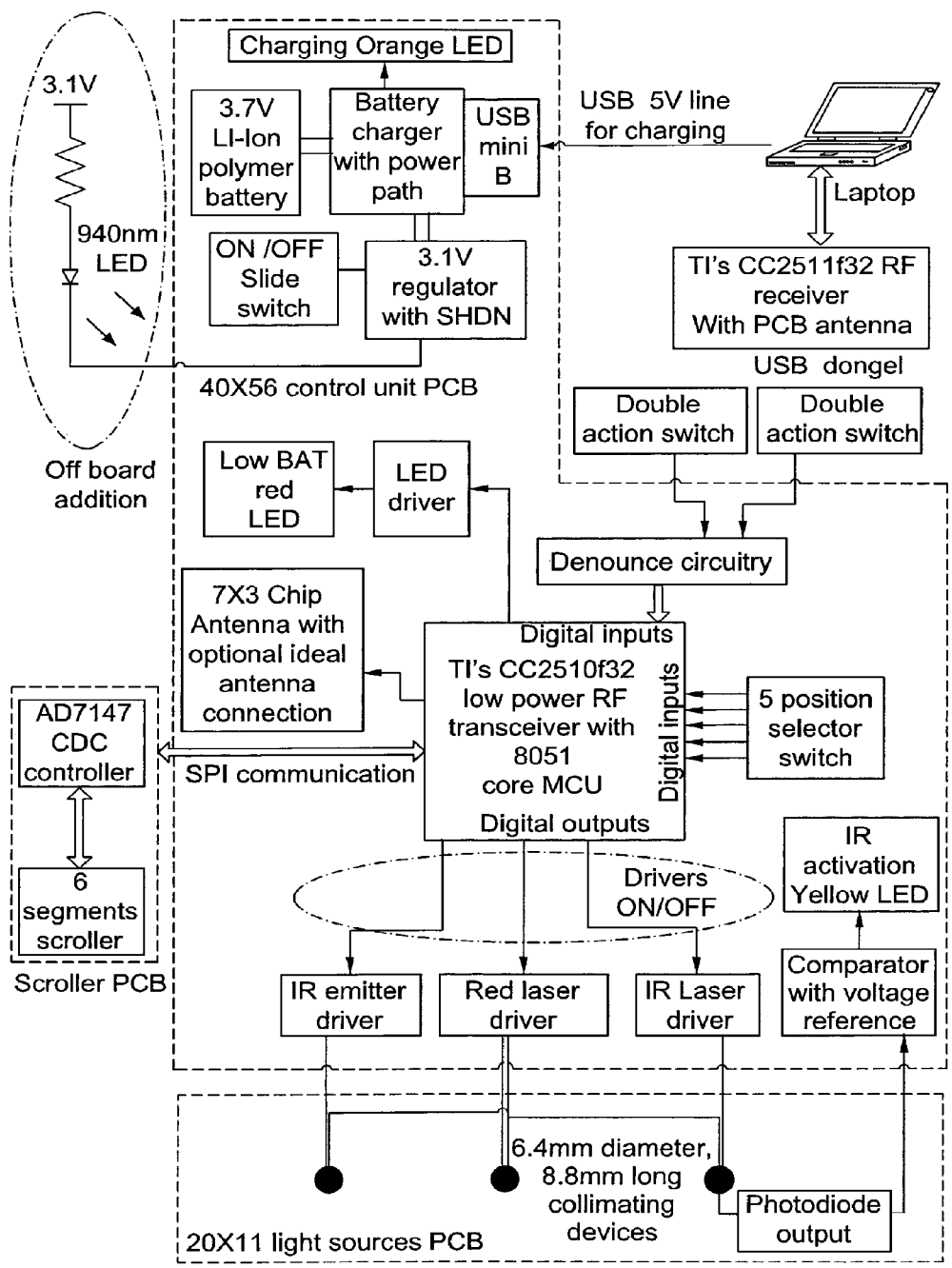
FIGS. 8a-8q are useful in understanding hardware components of a wearable input device constructed and operative in accordance with certain embodiments of the present invention.

FIG. 8a is a simplified block diagram of hardware components of a wearable input device constructed and operative in accordance with certain embodiments of the present invention. As shown, three light sources are provided which emit light at a certain wavelength and optical power in order to activate (or not, in case of the red laser) the sensor. The IR laser diode emits light at a wavelength of at least 800 nm where the wavelength corresponds to the sensor filter frequency response. The laser diode typically includes a built-in photo diode which absorbs light emitted from the laser and may be interfaced to a feedback circuit to monitor and indicate the laser activation. The IR laser diode may for example comprise a 5.6 mm diameter diode cased in a TO-18 footprint as shown in FIGS. 8b-8d. In order to produce a fine small circular beam shape, a specific laser collimator may be mounted on top of the diode which typically matches the 5.6 mm diode and may include a holding tube with a locking ring and a 4 mm plastic lens.

Figure 8E:
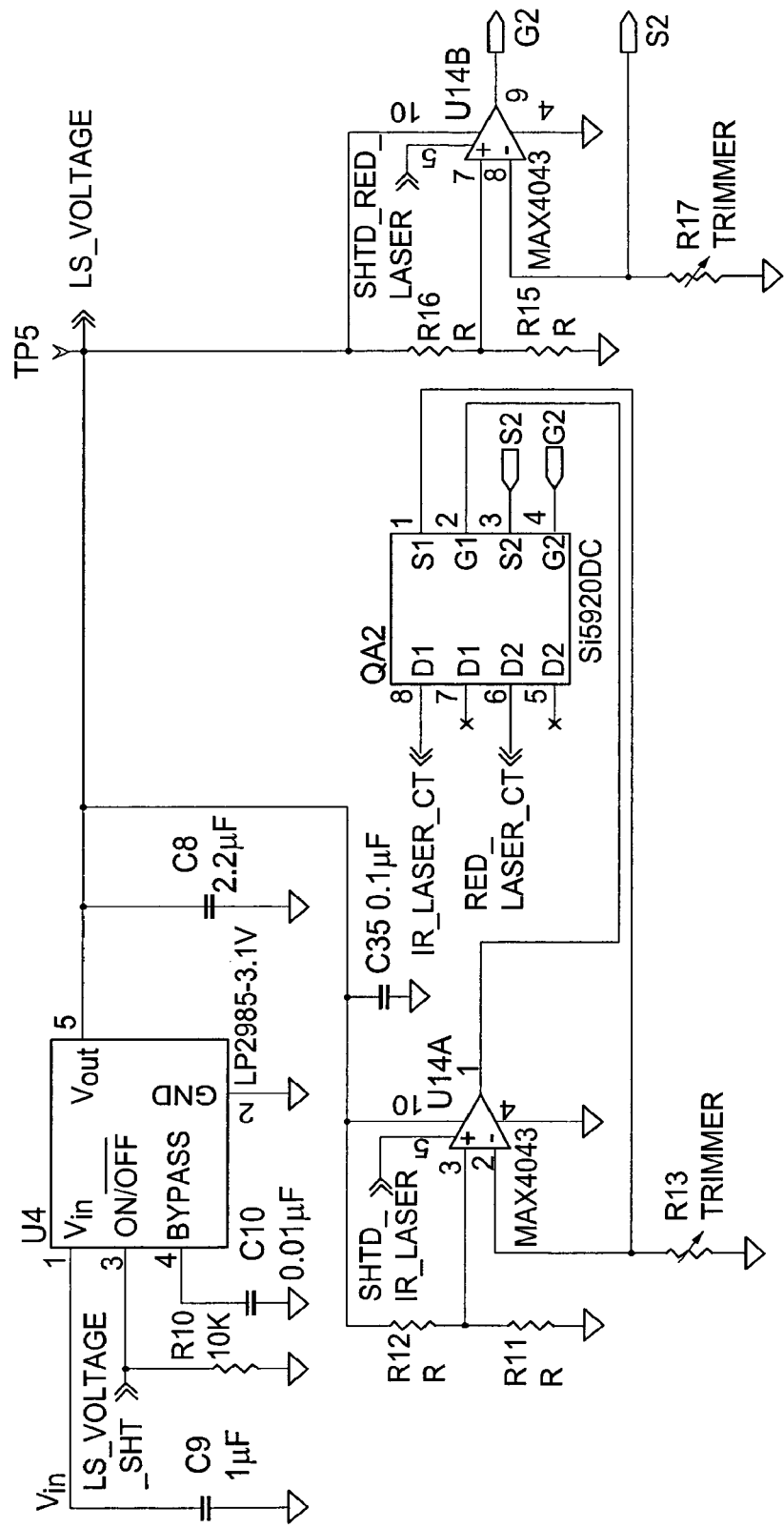

As for Laser diode driving circuits, an example implementation thereof is shown in FIG. 8e. The IR laser and RED laser may be driven using the same method. A current source controlled by an MCU may be used to supply a steady current to the laser diode. Trimmers R13 and R17 may be used to calibrate this current for the IR laser and red laser respectively, so as to calibrate each laser's current flow in order to control the optical emitted power by the lasers. Signals "SHTD_IR_LASER" and "SHTD_RED_LASER" are used to turn on the current sources supplying current to the laser diodes. The "LS_VOLTAGE_SHT" signal turns on/off the voltage supply to the lasers. This method assures a very low current consumption in the off state, when none of the lasers is turned on, and in the on state too by turning on only one circuit at a time (either the red laser circuit or IR laser circuit).

Figure 8F:
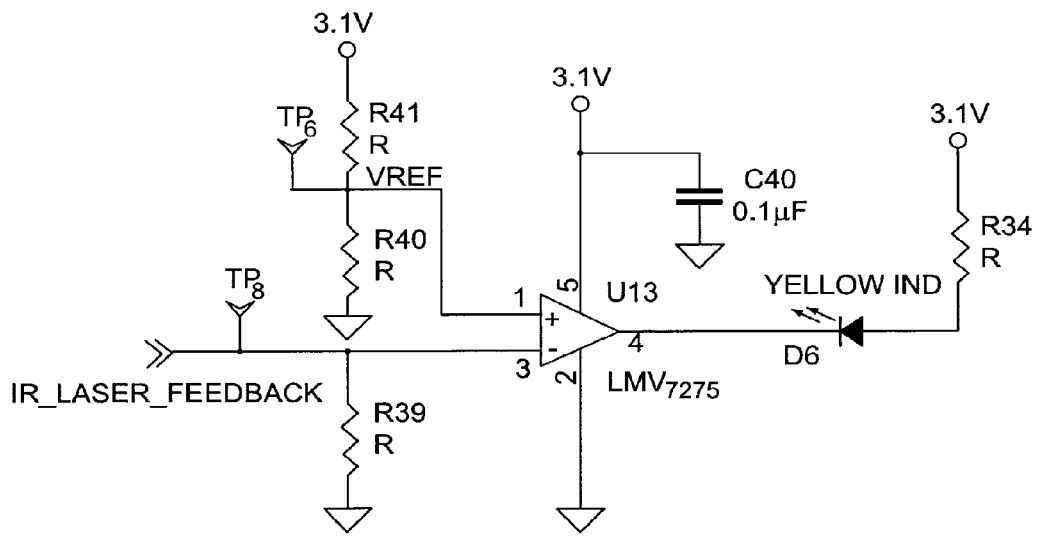

Suitable Feedback circuitry for the IR laser according to certain embodiments is shown in FIG. 8f. As shown, almost every laser diode is typically supplied with a photodiode which generates current upon laser activation, so as to provide a feedback circuit to trigger a LED each time the laser emits. The example circuit illustrated in FIG. 8f samples the current generated from the IR laser photodiode and converts it to measurable voltage. A yellow LED mounted on the control's unit panel is turned on when the IR laser is emitting. The red laser emits light at a wavelength visible to the human eye and is out of scale regarding the sensor filter frequency response. The red laser may have a 5.6 mm diameter case in a TO-18 footprint. Its collimation may be produced using the same type of collimator as the IR laser. Similar to the IR laser, the IR LED emits light at a wavelength of at least 800 nm, however, unlike the IR laser, the IR LED light is projected directly to the sensor. The radiant power of the LED should be at least 20 mW, to allow the sensor to detect it. The LED may comprise a 940 nm LED device with a typical radiant power of 20 mW and may have an outline of 3 mm and a length of 3 mm.

Figure 8G:
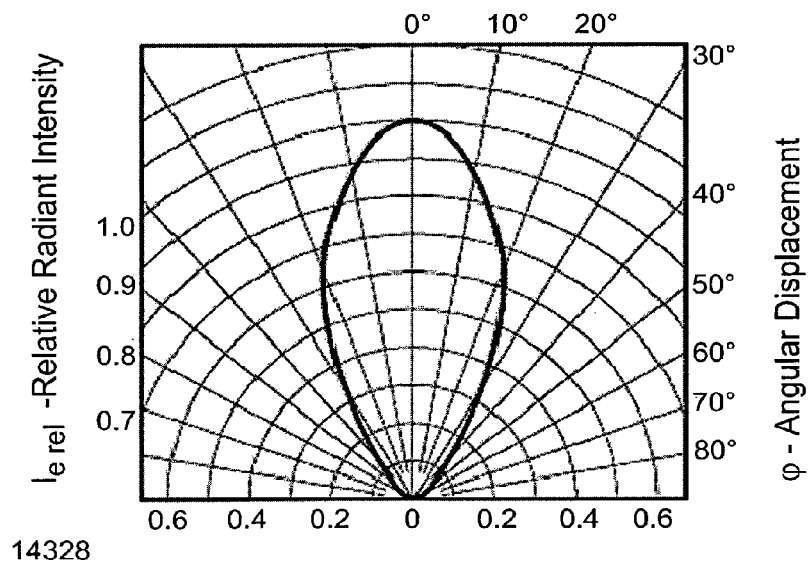

The relative radiant intensity vs. angular displacement of the LED is illustrated in FIG. 8g. The axes of the graph of FIG. 8g include a normalized radiant intensity from 0-1 and the emitted light angle from −90° to +90°. The parabolic lines mark the intensity axis and the straight lines mark the angles. As shown, each spot on the curve has a parabolic line leading to an intensity reading and a straight line leading to an angle reading. For example pointing at the 0.4 reading and moving along the line to a point on the curve results in a meeting with the 60° angle meaning that the LED has 40% intensity at an angle of 60°.

Figure 8H:
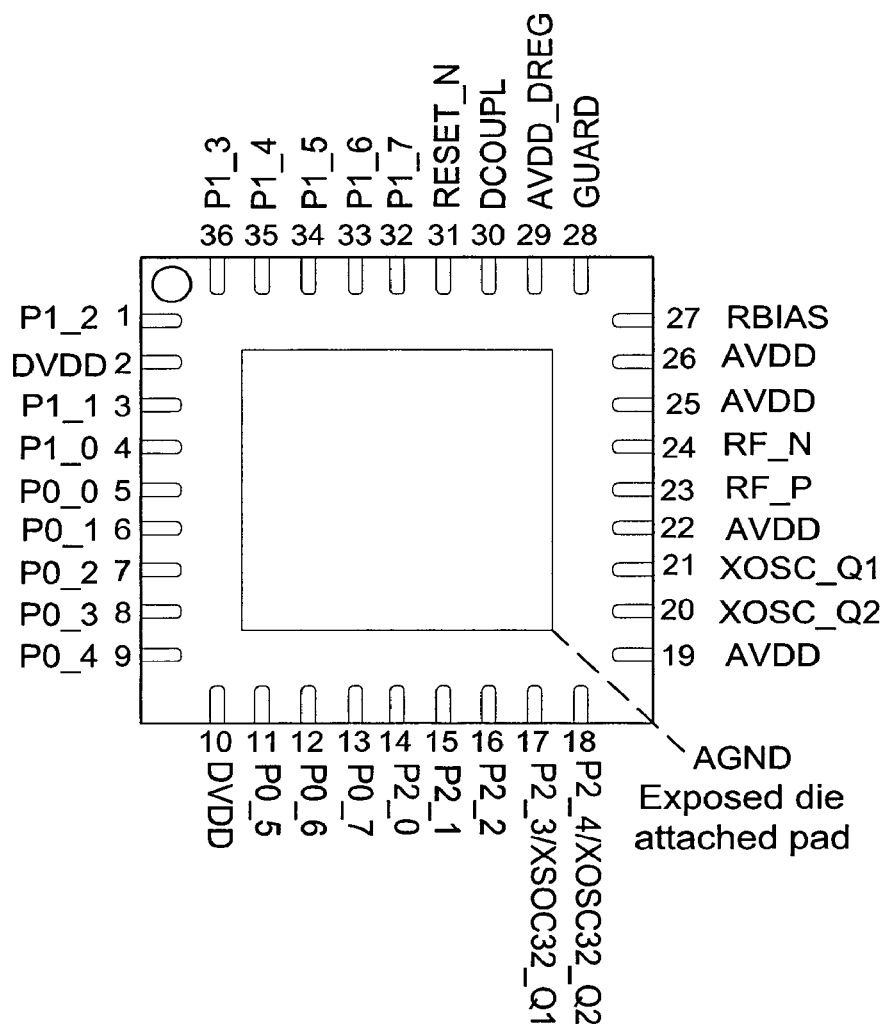
Figure 8I:
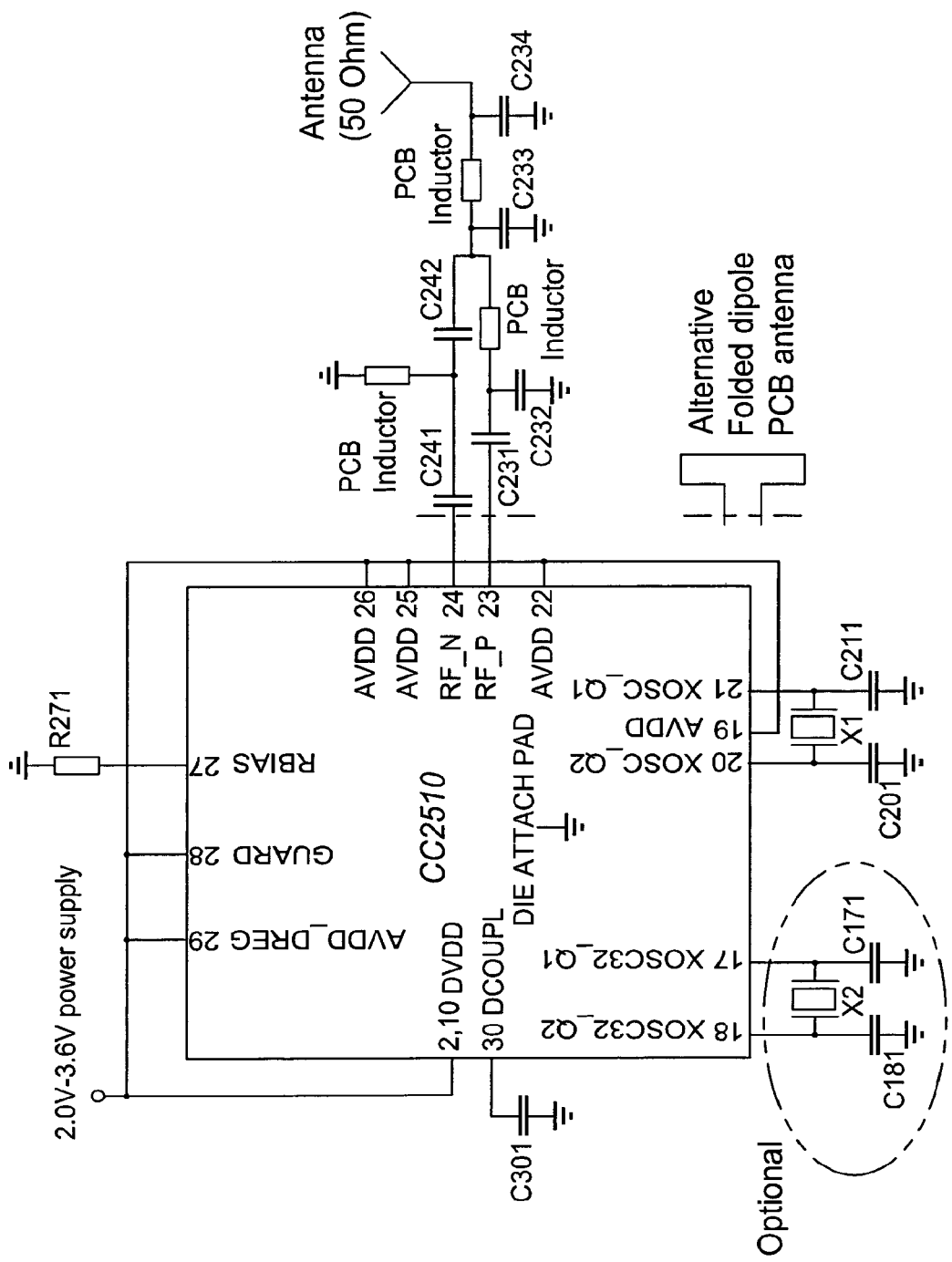

An example implementation for Wireless communication using RF is now described with reference to FIG. 8b which illustrates the CC2510f32 SOC by TI; this comes in a 4×4 mm QFN footprint to minimize board size. FIG. 8h is a top view, pin out illustration of the CC2510f32. FIG. 8i is an example of a suitable application circuit of the CC2510. The RF transceiver may use a 50Ω antenna. For space reduction reasons the antenna is typically a chip antenna of a very small size such as a Fractus ANT 2.4 GHZ 802.11 BLUETOOTH SMD. The board space used for this type of antenna is very small (proximally 5×15 mm of board area). The chip itself has a very low profile of 7×3 mm rectangular shape.

USB dongle: The CC2511f32 is a 2.4 GHz SOC that includes a full speed USB controller. RF connectivity from the control unit is received in the host side using one PCB dongle device which incorporates the CC2511f32 SOC.

Figure 8J:
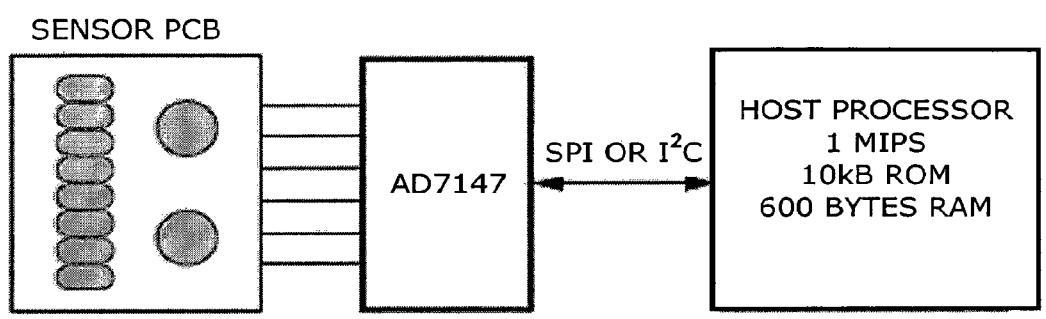

The scroller is operative capacitance sensing. If the application requires high resolution sensors such as scroll bars or wheels, software, running on the host processor, may be employed. The memory for the host typically, depending on the sensor type, stores 10 KB of code and 600 bytes of data memory. FIG. 8j illustrates a three part capacitance to sensor solution.

Figure 8K:
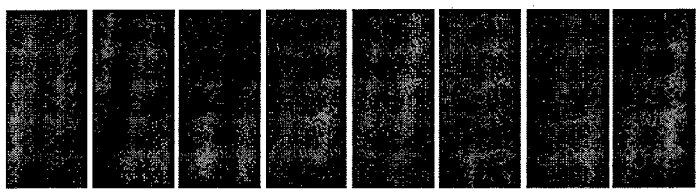
Figure 8L:
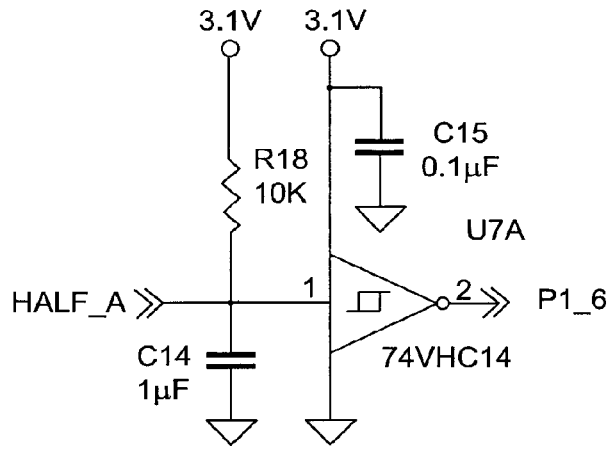
Figure 8M:
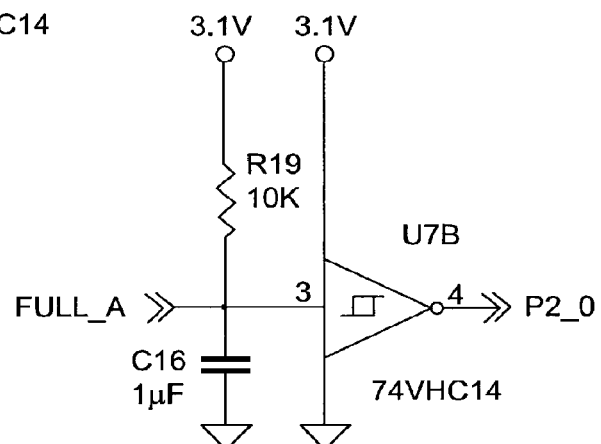
Figure 8N:
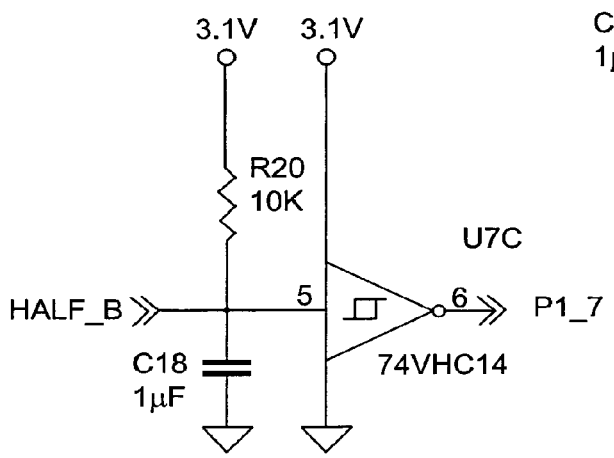
Figure 8O:
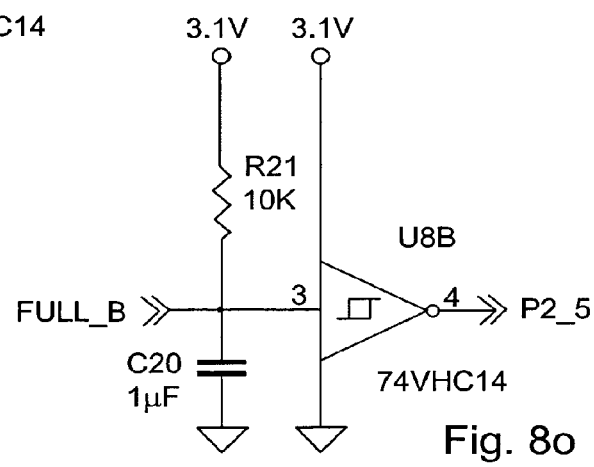

A slider, as shown in FIG. 8k, may comprise 5 to 8 or more discrete sensor segments depending on the sensor length, with each segment connected to a CIN input pin on the AD7147/AD7148. Discrete sliders may be used for applications that employ linear, repeatable output position locations and may comprise discrete sensors elements arranged in a strip, one after the other. The discrete sensing segments may operate like buttons. Each sensing segment is arranged in close proximity to the next sensor; thus, when a user moves a finger along the slider, more than one sensor segment is activated at a time. The slider of FIG. 8k can produce up to 128 output positions. Each segment of the slider employs one CIN input connection to the AD7147/AD7148.

Double action surface mounted switches are provided according to certain embodiments. A double action switch allows a two signal device actuated by two different forces to be provided. A first press on the switch triggers a "half press signal" and a subsequent press triggers a "full press signal". This mechanism exhibits a mechanical feedback for each of the presses so as to produce the following 4 electrical signals as shown in FIGS. 8L, 8m, 8n and 8o: no to half press, half to full press, full to half press and half to no press.

Referring to the denounce circuitry for denouncing a mechanical switch illustrated in FIGS. 8L, 8m, 8n and 8o, it is appreciated that when a switch is operated by a human, spikes of low and high voltages always occur across that switch resulting into a series of high and low signals that may be interpreted by a digital circuit as more than one pulse instead of as one clean pulse or as a transition from a logic state to another. The circuitry of FIGS. 8L, 8m, 8n and 8o includes a denounce circuit including a capacitor, pull up resistor and Schmitt trigger IC.

Figure 8P:
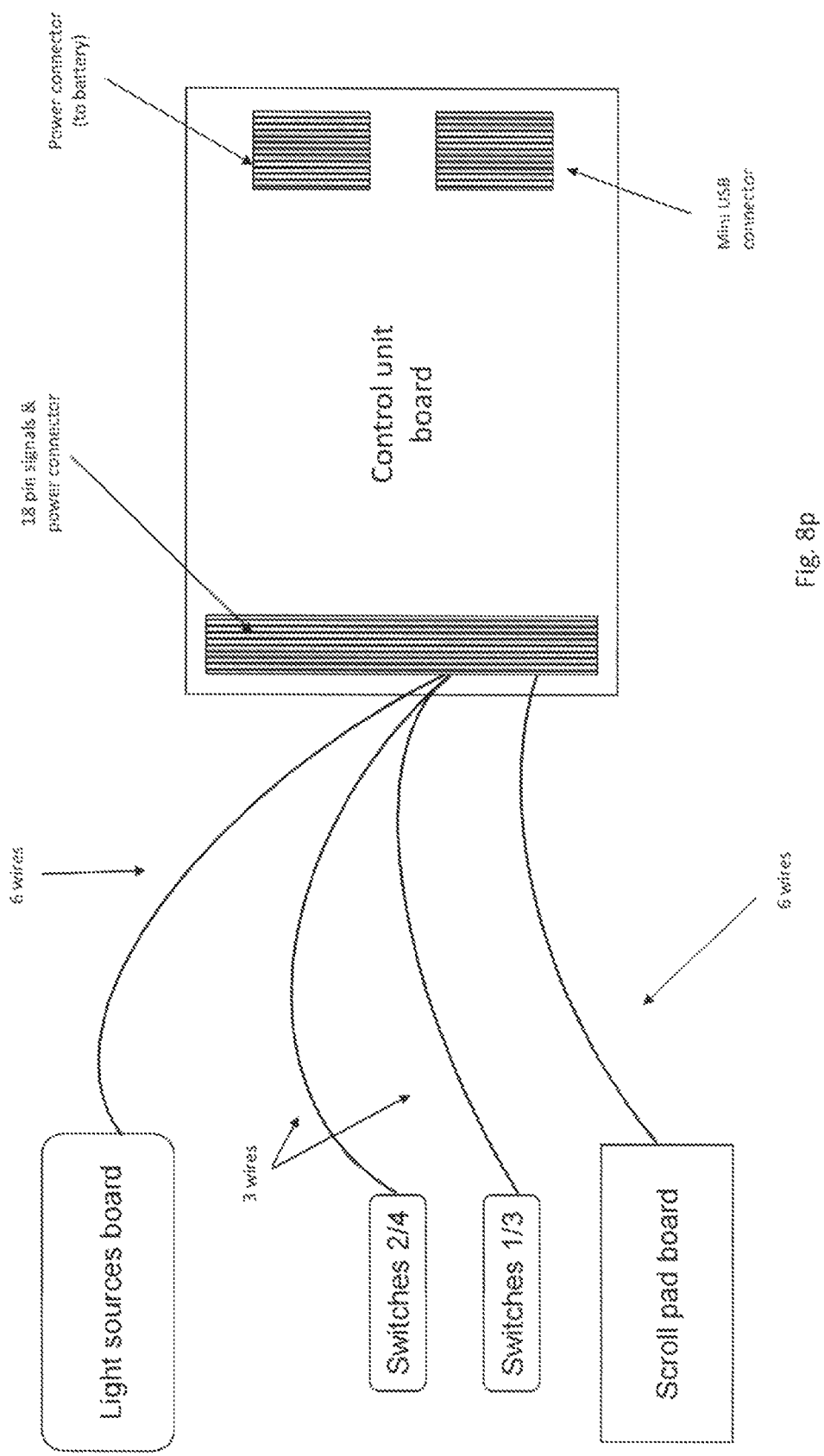

System connectivity may be provided by the example connection scheme illustrated in FIG. 8p. As shown, a light sources board (LSPCB) has 6 SMD pads lined at the rear and connects directly to a 1 mm pitch right angle 18 pin connector on the control board PCB (CPCB). Typically, the control board may be unplugged by the operator from the finger without opening the enclosure. The switches are connected to the same 18 pin connector on the CPCB. The cable is soldered directly to the switches. The scroll pad PCB (SPCB) is connected to the same 18 pin connector.

FIG. 8q is a table providing a glossary of terms used in FIGS. 8a-8p and in the description thereof, and elsewhere.

One implementation of software components of a wearable input device constructed and operative in accordance with certain embodiments of the present invention, is now described with reference to FIGS. 9a-9f.

Figure 9A:
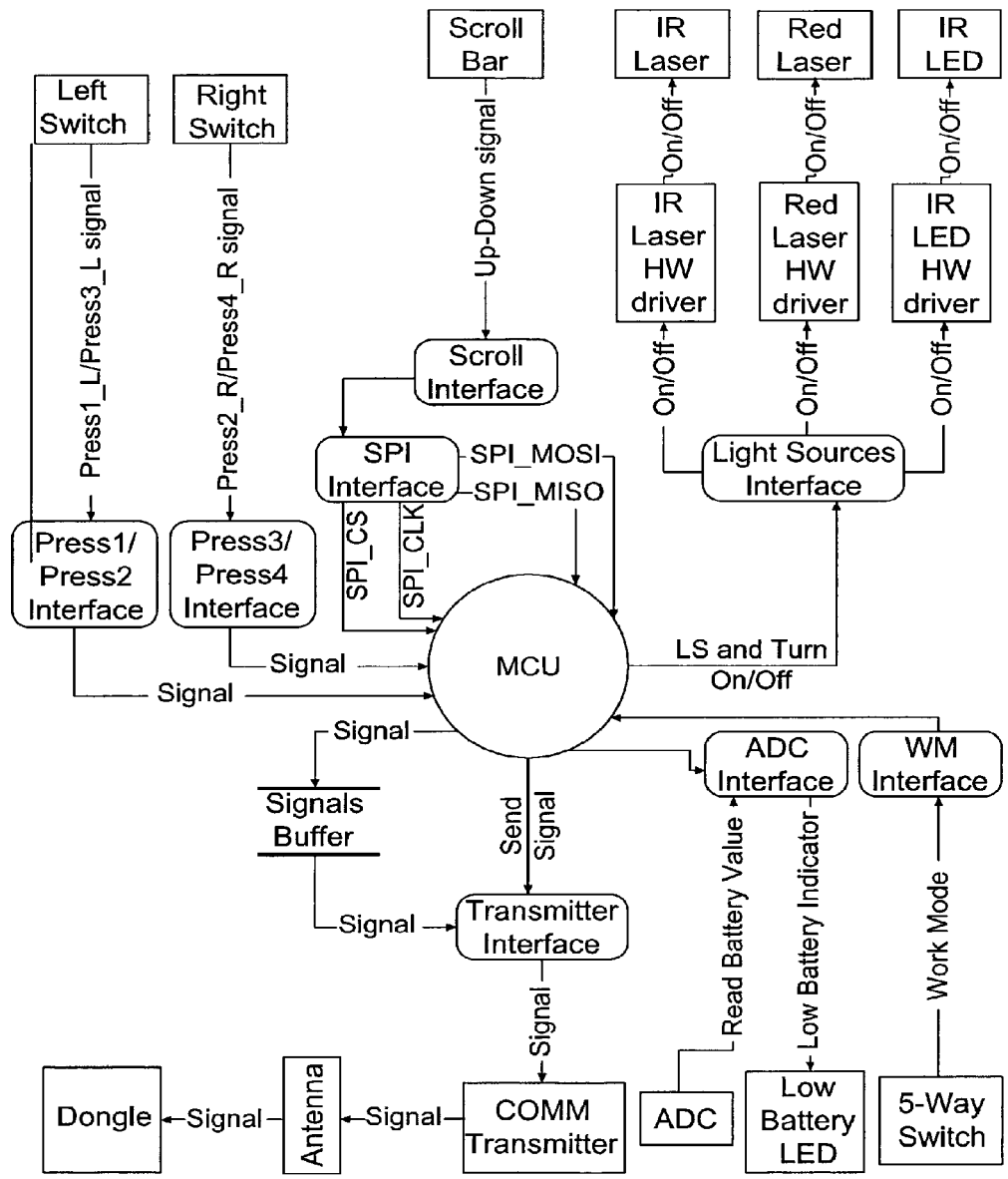

FIG. 9A is an example Sleeves Data flow diagram illustrating example interactions between all HW actors of a wearable input device e.g. Sleeve via which SW interface actors may interact.

Figure 9B:
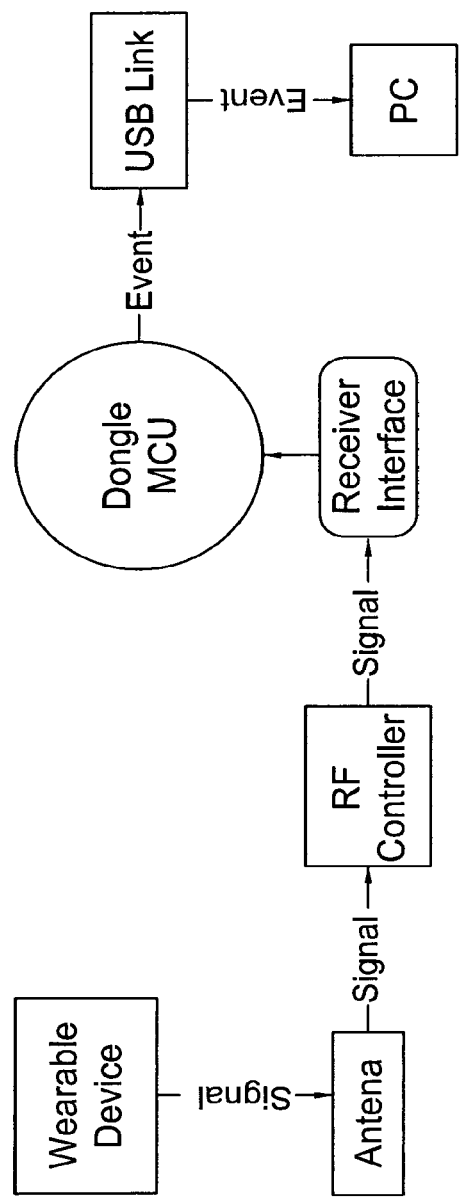

FIG. 9b is an example Dongle Data flow illustrating example interactions between all HW actors of a Dongle provided in accordance with certain embodiments, via which SW interface actors interact.

Figure 9C:
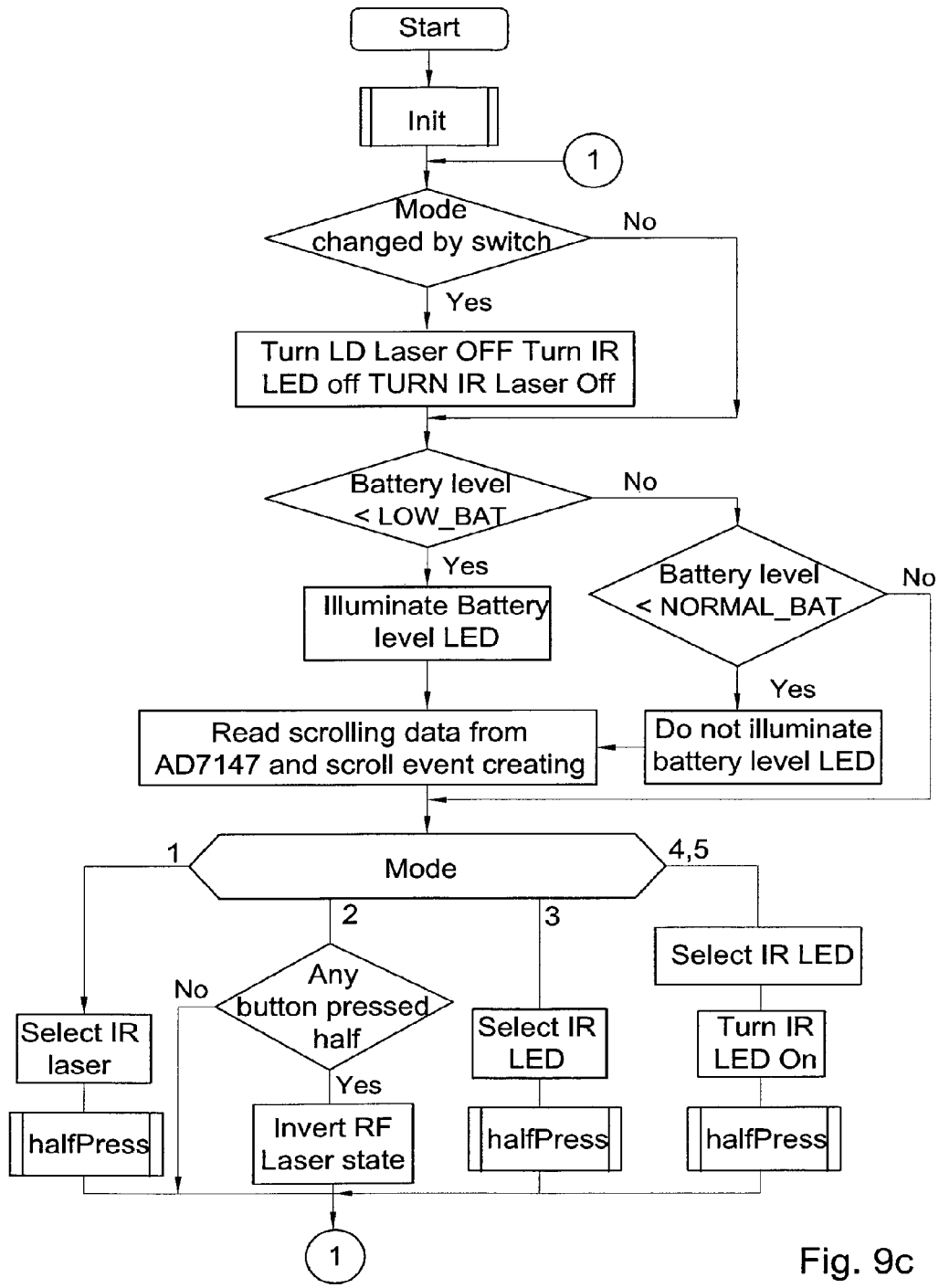
Figure 9D:
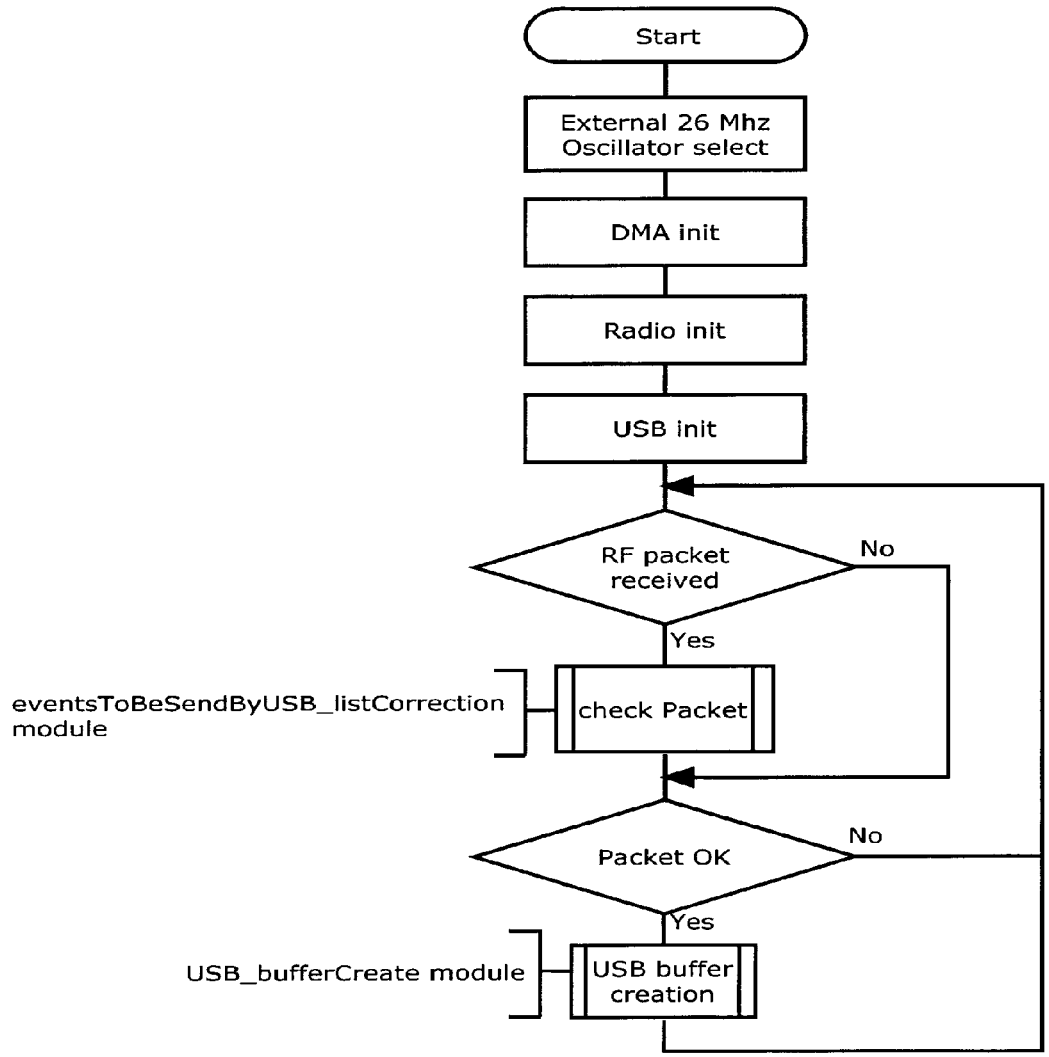

FIG. 9c is an example Main module Flow Chart for a wearable input device e.g. Sleeve in which a main module of a wearable input device e.g. that of FIGS. 4a-4b, monitors and manages some or all of the buttons, state selection, slider and light sources e.g. as shown and described herein, and sends event signals accordingly.

FIG. 9c is an example flow chart for the dongle of FIG. 9b according to which dongle software residing in the dongle receives the RF events messages from a Laser Pointer device, prepares the buffer for events list sending to a USB and sends data according to a Host request, where the host typically comprises the electronic device being controlled by the wearable input device shown and described herein. The Dongle main module typically waits for RF message receiving, tests it and, if the message is valid, adds new events to the USB input buffer etc.

The host DLL (PC, for example) typically contains variables and methods for receiving by USB and displaying the buttons and slider events (among other events). An example Events list, which may be transmitted by protocol RF, from Device to Dongle is set out in the table of FIG. 9e. FIG. 9f is a table providing a glossary of terms used in FIGS. 9a-9e and in the description thereof, and elsewhere.

A Multi Disciplinary Spatial Operating System is Described Below.

The engine of the above system may be operative to transform an area to one continuous screen, entitled a 'Continuous Spatial Screen' (CSS). The objects working in the CSS area are screens/parts of screens that are interactive within themselves and within the space.

An Agent, according to certain embodiments, is shown and described herein below with reference to FIGS. 10-11. More generally, the term "agent" as used herein may include a computerized unit with complete freedom of movement in an area and which may change its characteristics based on the input it gets from the environment. It may thus influence the content of the screen as well as the characteristics of the screen which it is projecting. An Agent is generally hung from a ceiling or from another high point, but may be positioned anywhere in an open or closed area. When an Agent receives appropriate input from a user, it changes its characteristics, including changes in its internal settings, its shape, and its physical position in the area etc. As a result, the characteristics of the projected screen change accordingly, including the size of the screen, its position, and essentially anything including the content of the projection. The input may reach the Agent through an input channel including an IR camera, microphone, camera, wireless communication etc.

The Agent's components may comprise some or all of the following:

1. Output components:
   a. Projectors
   b. Loudspeaker
   c. Light sources: Lasers & Led
2. Input components:
   a. Gesture Recognition functionality including multiple IR Led and IR cameras
   b. Microphones
   c. Video Cameras
3. Wireless communication unit
4. Memory unit
5. Processing unit An example implementation of a method of operation of the above agent, also termed herein the "engine", when the controlling functionality is a G-Mouse, is now described with reference to FIG. 28. The method includes some or all of the following steps, suitably ordered e.g. as shown:

2810: The Agent is hung from the ceiling in the center of a house

2820: It is connected to an energy source and a personal computer

2830: The projector unit of the Agent projects the image of the computer on the wall 2840: The IR-camera unit of the Agent photographs the area of the screen continuously 2850: The user controls the content of the screen using the G-Mouse (The IR unit of the Agent transfers to the engine the position of the points of light it sees in order to control the cursor)

2860: When the user wants to move from the content of the screen to control of the characteristics of the screen he informs the engine. The user may do so using one, some or all of multiple communication methods including:
   a. Wireless communication using button/combination of buttons on the G-Mouse
   b. Button/combination of buttons on the G-Mouse may cause difference encoding of the light source that is being transmitted. The IR-camera in the Agent may detect the change in encoding of the light and may alert the engine that the user wants to control the characteristics of the screen.

c. Voice commands d. Gesture on the projected screen or at the open space

2880: From this moment, instead of controlling the content, the engine may use the points and characteristics of light it identifies (and its wireless communication with the user) to control one or more of the characteristics (location, size, shape) of the screen, e.g. as per one or more of the methods of FIGS. 29-31 respectively.

2890: When a user wants to return to the content of the screen, the Agent returns to the regular mechanism or mode such that the position of the points of light and the wireless communication are transmitted to the G-Mouse application or other input device application as cursor control.

FIG. 29 is a simplified flowchart illustration of a method for moving a projected screen. The method includes some or all of the following steps, suitably ordered e.g. as shown:

2910: The point of light is found in a specific coordinate in the Scope of the IR-camera $(X_1, Y_1)$

2920: The user moves this point of light

2930: The Agent, in response, updates the position of the IR Camera in order to maintain the same relative coordinates $(X_1, Y_1)$

2940: The position of the projection unit of the agent may change accordingly based on the position of the IR-camera. Thus, the position of the screen may change according to the user's pointing location. The result may be a Drag&Drop of the entire screen like the well-known Drag&Drop of windows/objects in engines.

FIG. 30 is a simplified flowchart illustration of a method for effecting a Change in the size of the Screen. The method includes some or all of the following steps, suitably ordered e.g. as shown:

3010: 2 points of light found in specific coordinates in the scope of the IR-camera are moved by a user.

3020: When the points get close to each other, the projector unit of the Agent reduces the size of the screen

3020*i*: A relative movement on the horizontal/vertical axis may cause a reduction of the screen on the axis in a manner that is proportional to the movement of the points of light.

3020*ii*: A relative motion on the axes may cause a reduction in the screen on the two axes simultaneously proportional to the motion of the points of light.

3030: When the lights move away from each other, the projecting unit of the Agent may enlarge the screen in the same manner as described in step 3020, sub-steps i and ii respectively.

3040: When the points move in the same direction the screen may move as a unit in the correct direction as described above with reference to FIG. 29.

FIG. 31 is a simplified flowchart illustration of a method for effecting a Change in the shape of the screen. The method includes some or all of the following steps, suitably ordered e.g. as shown:

3110: When the points move in a circle in the same direction, the Agent may revolve on its axis, thus causing the projecting screen to turn on its central point.

3120: When one point stays the same and the other point moves in a correlated motion, the screen may change shape (turn, grow bigger/smaller) in relation to the anchor point.

3130: The user may touch 4 points on the projected area and the agent may project a rectangle screen between those points.

The following describes how the overall engine and the Agent work as a integral interrelated unit, such that together they create another engine layer which may be disposed above a conventional engine. This layer may connect between the users and the different engines, the different devices and different environments with which the users wish to interact. Other control functionalities, besides the G-mouse, may be employed, including Gesture Recognition with hands-free operation and Computer Brain Interaction. The G-Mouse is used only as an example and alternatively, a broad-spectrum of input devices that may be used. The term "agent" here refers to physical components of the apparatus shown and described herein, whereas the term "engine" refers to the agent plus communication between components thereof plus software components and their communication with physical or other software components.

Multiple Agents

The overall engine may be composed of more than one Agent. An unlimited number of Agents may create CSS areas that are extremely large, and which may be scattered both in internal and external areas.

Every Agent, as a separate digital unit, may communicate with other Agents (and even with several Agents simultaneously) using a protocol package called Projecting Control Protocol—PCP. These protocols are hybrids which mix P2P communication between the Agents themselves and Client-Server communication between the Agents and the application's overall engine.

Following are two examples of 2 central protocols from the PCP family:

1. The Sequence Effect

When a user wants to move an object from position X to position Y in the CSS area, (from the kitchen to the living room for example) there could be a number of reasons why one single Agent cannot support the entire process and to project the desired object in the two positions and all the in between points (the route). For example:

The distance of the projection became too large/small in relation to the required characteristics of the objects (size, shape etc.)

The angle of the projection became too large/small in relation to the required characteristics of the object Several of the points on the route/endpoint are not in the direct line of projection from the Agent (such as when the walls are interior walls, for example)

Executing a 'Switch' in real time on the Agent that is controlling the projected object, the user is enabled to travel the entire route from point X to point Y as a full continuum. A method for implementing this embodiment is described herein with reference to FIG. 27. The method of FIG. 27 typically includes some or all of the following steps, suitably ordered e.g. as shown:

2710: The borders of the projected object may be delineated by a number of scattered points of laser beams that come from the Agent.

2720: When the Agent is alerted that the projected object is nearing the edge of its control it immediately sends out a switch request to all the other Agents. This request encompasses identification, description of the current position of the projected object and all other relevant information which may facilitate communication.

2730: At the same time, the acting Agent delineates the borders of the projected object by specific encoding of the laser beams that were described in point 1.

2740: The relevant Agent reacts to the message sent as described in point 2 (naturally, the Agent has to be available and in the appropriate position relative to the projected object).

2750: If there are a number of Agents that are equally appropriate to all the conditions—the choice may be random.

2760: The chosen Agent focuses on the relevant object.

2770: Simultaneously, the overall engine, which has full knowledge of which objects are being projected by which Agents at any given moment, alerts the replacement Agent which object it should be projecting.

2780: The replacement Agent alerts the current Agent that it is ready to switch.

2790: When the fields of vision of the two Agents overlap, the communication between them may be more complex both from direct wireless communication and from appropriate encoding of their laser beams.

2795: At the end of this process, the controlling Agent stops projecting, and the replacement Agent starts to project the relevant object and turns into the controlling Agent of that Object.

The result of the process of FIG. 27 is 'Spatial Continuity' for the user. The entire area becomes a unified and continuous screen, and is thus termed a Continuous Spatial Screen.

Protocols based on the method of FIG. 27 are also useful for enabling the 'agent switch' of a static object as necessary. (For example the acting Agent is required for another operation, the user requested a replacement etc).

2. Objects Relationship

Each time there is overlap between the scope of the 2 or more Agents, they may connect between themselves through established encoding of laser beams. The application of the engine typically knows exactly which object is being projected by which Agent at any given moment As a result interaction is provided between the objects themselves. In order to demonstrate this further, an example method for direct interaction between projected objects e.g. Drag&Drop of files into folders is now described with reference to FIGS. 26a-26b.

The method of FIGS. 26a-26b typically includes some or all of the following steps, suitably ordered e.g. as shown:

2610: A user is working on an object, say a Word document called 'My business plan' on point X of the area.

2620: After the user finishes working on the document, the user wants to move it to an object or virtual location, e.g. the 'My document' folder which is in position Y in the area.

2630: The user moves the object 'My business plan' in the direction of the object 'My documents'.

2640: While it is being moved, the Agent changes its encoding of its laser beams to 'move'.

2650: Where an overall engine is created between the scopes of the two Agents, the controlling agent of the object 'My documents' understands that another Agent has moved to it a specific object and gives the user feedback of some sort—visual, audio etc.

2660: After the user 'leaves' the object 'My business plan' in the territory of 'My documents' the following processes occur:
  a. The controlling Agent (termed herein No. 5 by way of example) on the object 'My document' emits an encoded laser signal which says 'I'm Agent number 5, please identify yourself'
  b. The Agent controlling the object 'My business plan' (termed herein No. 2 by way of example) emits an encoded laser signal which says 'I'm Agent number 2'.
  c. Agent No. 5 sends a message to the overall engine with the following command: 'save Agent number 2 in Agent number 5'.
  d. The overall engine, which, as stated, knows exactly which objects each Agent is projecting at any given time, sends the following message to the engine controlling the environment (like Windows): "Save the file 'My business plan' in the folder 'My document'".

The result is direct interaction in the area between the projected object 'My business plan' and the projected object 'My documents', without dependence on the Agents projecting them or their position.

It is appreciated that the above method of communication may be useful for:
  All types of objects (projected and physical)
  An unlimited number of objects/Agents
  All types of interaction Multiple Controlled Environments The overall engine typically has a unique interface that is the basis for all devices and environments that may be controlled by it. It is possible to take any action including choosing the environment to control and total customization of the overall engine, according to the detailed conditions and preferences of the user.

The Spatial Operating System acts as an 'interface hub' for all the environments that require interaction with the user including televisions, computers, cell phone, smart home applications, media centers, audio center, timetables for transportation (outdoor application) etc. In addition, the user may add to the system new environments in dynamic behavior (for example a new cellular phone, new computer etc.).

User control may be enabled in a number of ways:
  a. Interaction with the environment through its screen—projection of the original screen of the controlled environment
  b. Interaction with the environment using its control methods—such as virtual keyboards, mouse pads, remotes (all types), etc.
  c. Interaction facilitated by a custom made object—planning and creation of a personal controlling object which enables the user to interact with more than one environment simultaneously.

The communication between the system and the controlled environment may be expressed in a number of ways. For example:
  a. Control facilitated by an API function using wireless/wire communication
  b. Control use IR waves:
  On specific devices that are controlled by remote controls (such as television) there is an IR eye that identifies specifically encoded IR waves emanating from the remote and translates them to the relevant commands. One way to control these types of devices is as follows: When the user requests to execute a specific comment on a specific device (for example changing the channel on the television), one of the Agents emits an IR wave in the relevant encoding in the direction of the eye of the appropriate device. The television accepts the command as if it received it directly from the remote and executes the command. Naturally, it has to be initially defined in the system where the eye of each device is positioned within the area. An example implementation of this embodiment is described hereinbelow with reference to FIG. 24.

Projection

The system's functionality for projection may utilize all innovation and development in new projection technologies without any dependence on the rest of the components of the system.

In order to have maximum mobility, the system uses a relatively small and light projection unit which may move freely in the area; for example any type of pico projector.

In addition, the system requires a projection technology that enables changing the characteristics of the screen without renewed intervention by the user each time. For example, laser diffraction technology enables changing the distance of the projection without necessitating a change in focus (and may even project on two objects at different distances, simultaneously).

The Agents may project on all types of surfaces including ceilings, interior and exterior walls, floor, furniture, windows, non-planar surfaces and even on a human body.

Projection at an Angle

In order to project at large angles, and to maintain proper display, the system utilizes special algorithms that correct the distortions. The Agent uses its own Gesture Recognition functionality to adapt itself to type of surface it is projecting onto. When it receives the input, the Agent may adapt its characteristics including its position in the area (to aim for better projection), its algorithms as described above, its internal projection functionality etc.

Static Dynamic Projection

Situations where the change of the direction of the projection necessitated a change of the placement of the screen, have been described above. However, as stated, a change of the characteristics of the screen in general and change of the position of the screen specifically may occur utilizing changes in the internal functionality of the Agents and projection units. For example, a mirror, which scatters the beams and directs the projected object to the appropriate position in the space, may move according to the commands of the user and thus move the object to a new position, and at the same time not move its own position.

360 Degree Agent

The 360 degree agent utilizes the static dynamic projection technologies described above.

The 360 degree agent may project in all directions by changes to its internal functionalities only. This is made possible by an outer permeable casing in which the directional projection resides.

By using multiple core projection, the 360 degree agent may project more than one object simultaneously. Every object may be projected to a different location in the area—this feature is also applicable to the regular agent, not only to the 360 degree agent.

360 degree agent has a number of IR cameras which together may record the entire area that surrounds the Agent. These IR cameras may record any IR light which comes from any IR sources such as the IR sources of the G-Mouse.

360 degree agent may emit IR Led beams to the space around it. The IR cameras analyze the beams that are returned (for example the functionalities of Gesture Computing) and thus an encompassing image is created of the space surrounding the Agent.

3-D Projection

The technology of screening/projection is a different element from the system that is being described. The system may use any technology to turn projected objects into 3-D objects. The result may be the highest level of integration ever between the digital world and the physical world where the CSS that surrounds the user immediately gets another dimension of depth and thus becomes more real.

RTLS—Real Time Locating System

Reference is now made to physical control tools such as the input device shown and described herein with reference to FIGS. 1a-9f, also termed herein the "G-Mouse".

The system may use any type of Real Time Locating Systems in order to detect where exactly the user is located at any given moment. There are many ways to implement this, e.g. as demonstrated by the following examples:

1. A user control tool (like the G-Mouse for example) is utilized as a beacon and emits wireless communication signals which are received by Agents acting as Readers. When the control method is personal (like the G-Mouse), the signals may identify the user. The Agents use the signals as input that, with their help, analyze (through triangulation, for example) the exact location of the user and his identity within the space.
2. Control tools of the user contain a RFID tag as the work space is tiled with RFID readers.
3. In addition, when the source of light from the control device (like the G-Mouse for example) enters the range of vision of the agent, it may also use the input from the light source in order to get to the user.

The system typically knows exactly where every user is at any given time which enables a wide range of solutions. Following are two examples.

1. Implementation of the 'Screens on Demand' functionality:
   This functionality enables users to have interactive screens from every point in the area simply by clicking on the specific button on the control device, for example. The 'Screens on Demand' functionality enables a user, in effect to instantly have an interactive screen from every point in the space/area at the click of a button. Furthermore, the Screens on Demand functionality may act as a medium for renting screens on demand at a variety of public spaces such as restaurants, malls, public transportation, and others.
2. Implementing the 'individual content' functionality:
   An advantage of this functionality is that the system knows to transfer to the user in real time individualized content to the exact location where he is located without the user demanding it at that moment. For example:
   a. When a call comes in to a cell phone, the system may instantly project the screen of the telephone next to the user.
   b. Similarly with text messages and other networking applications (forums, mail, social networks etc.)
   c. The user may set reminders/alerts with any trigger he wishes. As a result, when that trigger is activated, the system may project the requested content directly to his spatial location.

All individual content that has not been answered by the user for whatever reason, may be marked as missed content, and each time the system identifies the user, it may continue to notify him there is missed content, until he views the content.

When control is effected without a control device (as in Gesture Recognition which is hands free), the position and identity of the user cannot be identified by a conventional RTLS system. This may be overcome as follows:

1. A Gesture Recognition functionality identifies the position and identity of the user; and/or
2. A wearable device without tracks (a ring for example) could emit the necessary signals for location (or may contain the RFID tag) and allow the system to identify the position of the user and the user himself at any given moment.

Screen Configuration

In the system, the projected object need not be square, in fact, it may be any shape at all. Projected objects may be at any shape which may be created with pixels including menus, icons, buttons, rulers etc.

Control of the shape of the projected object may be implemented in a number of ways, for example:
1. IR sources defining and designing the projected object
   a. IR sources coming from a control device of the user (such as the G-Mouse). The user may 'create' the display of the projected object with a finger, define its borders with a number of points, shape it with his fingers etc.
   b. IR sources that come from existing sources in the physical environment of the user (such as furniture).
2. Controlling the shape of the projected object by the application Audio & Video Communication Video Communication (Video Phone)
   a. The projecting Agent: One Agent projects the second side of the conversation in a specific part of the space based on the choices of the user. The control of the position of the projector is identical to the control of the position of a regular projected object
   b. The filming Agent: A second Agent films the user from a specific point in the space based on the choice of the user. The control of the position of the filming Agent and the angle of the filming may be implemented in a number of ways, as follows:
      b1. Control from within the application—the user can see what the filming Agent sees and thus can control it easily (its position, angle of the filming etc).
      b2. The filming Agent knows how to follow the user in the space. There are a number of technologies to implement this, including Gesture Recognition, face recognition, motion sensing, and many more. In the event that the user may be helped by a control device that is capable of emitting IR sources (such as the G-Mouse), the filming Agent may follow the IR source and thus follow the user in the space.
   c. A separate axis of Agent's filming unit may enable the combination of both the Projecting Agent and the Filming Agent in the same Agent. This Agent may project the other side of the conversation in the space while the filming unit (on a separate axis) films the user.
   d. Foldable rear screen projection—the Agent knows how to spread out a folding fabric for projecting from the rear. When it does this, the projected object 'collides' with the screen and is thus displayed upon it. Naturally, the IR camera (which by default faces in the same direction as the projection unit) films the screen. In this manner there is direct eye contact between the sides. The position and content of the screen is controlled in the same way as a regular projected object.

Audio Communication
a. The sound of the second side of the conversation comes out of the built-in speakers of the Agent (or any other Agent chosen by the user).
b. The sound of the user is recorded by built-in microphone of the Agent (or any other Agent chosen by the user).
c. If the user is assisted by a control device with embedded microphones and speakers (like the G-Mouse), the sound may be heard and recorded by the control device itself.

C1. The sound that enters first arrives at the Agent and from there is transferred to the control device using any PAN (Personalized Area Network) protocol (or any other protocol).
   C2. The sound may be recorded initially by the built-in microphones of the control device and from there may be transferred to the Agent using any PAN protocol (or any other protocol). The Agent may continue to transfer the session to the relevant destination.
   C3. In addition, all sound communication may be directly implemented between the control device and the controlled environment (such as a cellular phone) in a similar manner to the way BT earphones work.
d. A user may take advantage of any other sound device (like BT earphones) that may communicate with the Agent or directly with the controlled environment.

Such Audio and Video communication may be implemented in long distance communication—meaning outside the system (cell phone calls, Skype etc.)—and with internal communication within the system itself (between separate rooms at the same working envelope for example). Following are two examples of potential internal communication use:
   a. The user may request from Agent X a projected object which displays what Agent Y can see and even control Agent Y using Agent X's projected object
   b. In addition, the user may also implement voice communication with the rest of the users within the system's working envelope, either facilitated by the Agents alone or by an appropriate control device (such as the G-Mouse).

Tangible User Interface

IR sources in the space may define areas and physical actions. These sources may move in the space as a result of the user's interaction with his physical space. In this manner the user may define connections between actions and results between the position and condition of the sources and the characteristics and content of the projected objects. For example, if an IR source defines an area on the refrigerator door, when the refrigerator opens the sources disappear or change the relative distance from each other. The user may define that the projected object may be active as long as the door is closed, and when the door opens, the projected object is turned off. With the gestural computing functionality, the system may scan its physical environment and respond to changes without any need for IR point scattered at the area (as mentioned above).

The connection between action and result may be any connection and may be determined on the user level by the application.

Another example of the abilities of the system's tangible user interface is the interaction between the physical screens in the space. The system knows the location of all the physical screens in the space (using an IR source for example) and thus enables the physical screen to inherit all the characteristics of an ordinary projected object. For example, the Drag&Drop of the projected objects of the physical screen may be implemented as follows:
   a. Dragging the object to the physical screen: As soon as the Agent notices that the projected object is dragged to the area of the physical screen, and stays there for a specified time, it turns off its projector unit and transfers to the system a command to display the appropriate object on the physical screen.
   b. Dragging the object from the physical screen: The moment the Agent that faces the physical screen notices that the user wants to drag an object beyond the borders of the screen, it transfers a command to the system to turn off the physical screen. The system turns off the physical screen and transfers the information about the displayed object to the Agent. The Agent, in response, lights the projector unit and displays the object to the user.

Additional optional Features are now described. It is appreciated that in general, the above-described features need not all be provided and instead, any suitably subset thereof may be provided. Similarly, the features described below need not all be provided and instead, any suitably subset thereof may be provided.

Modular Objects

The system enables the creation of a modular object which may be put together from several projected objects. As such, every projected object may be of any shape—therefore the modular object may also be of any shape. In fact, the modular object inherits all its characteristics from the regular object and is able to relate to it as a regular projected object.

For example, the user may move a modular object in the space as one unit, exactly as it would move a regular object. The significance is that all the Agents that make up the modular object move in relation to one another in order to maintain its shape all the while the user is moving it in the space. Even if not all the agents which make up the modular object may 'see' the request of the user to move the object in the space, the Agent/s that do see it may pass on to the other relevant Agents the required change in the characteristics of the projected object that they are controlling.

Bookmarks

The system enables the user to save conditions of one of more Agents. The 'condition' relates to the characteristics of the projected object (its size, position in the space, shape etc.) and to its content. A bookmark may be triggered in many ways, for instance by voice commands, GUI, gestures etc.

Spatial Social Interface

The system enables several Agents to project objects that display the same content in several places in the area of the CSS. The significance here is that several users may interact with the same content from several different places and get feedback in real time of the interactions of the other users.

Advanced Communication

In order to implement the communication that is necessary between the components of the system (Agents, main application, controlled environments, physical screens etc.) the system uses many different types of communication in addition to traditional communication channels. For example, it uses the home electrical grid as a communication network (using technologies such as X10) and utilizes technologies of wireless display (such as the WiDi technology of Intel).

Application Store

The system offers the user a full SDK that enables creation of an application that is entirely defined by the user, in a completely free manner.

The Spatial Operating System with its Agent Functionality introduces a new and innovative digital environment.

It turn, the space where the user is located into a continuous spatial screen (CSS) where the wallpaper and screensaver are the reality which surrounds the user daily. In effect it is possible to say that the user actually lives 'inside' the system.

The user interface in the system is a new type of interface: 'Spatial-Hybrid GUI'. This interface is hybrid because it combines virtual objects (projected objects) with physical objects (static physical screens, furniture, and in effect any physical object).

The system and the Agent act as an Interface Hub and create together an additional layer on top of those currently in engines. This layer connects between users on the one hand, and all their digital environments on the other.

As described above, every Agent, as a separate digital unit, may communicate with other Agents (and even with several Agents simultaneously) using any available communication method such as 802.11 or Bluetooth for example.

The term "agent" as used herein is not intended to be limiting and refers to any digital display projecting system providing one, any suitable combination of, or all of, the following agent features:

1. controllable projected screen generator which receives from user at least one desired characteristic of projected screen, other than or in addition to the screen's content and responsively varies at least one projection parameter so as to achieve the desired projected screen characteristic. The above may include one some or all of 1. screen position 2. screen shape 3. screen size 4. screen content e.g. as per features 1, 2, or 3 below.

2. a controllable projected screen generator which allows user to control position of projected screen, defined e.g. by drag and drop.

3. a controllable projected screen generator which allows user to control shape of projected screen. Because laser diffraction conventionally creates screen displays sequentially pixel by pixel, it is practical to control the shape of the projected screen.

4. The projected screen is typically interactive in that it accepts input, typically either remotely or by touch, selectably; e.g. by employing the "G-mouse" input device shown and described herein with reference to FIGS. 1-9f both to implement each mode (remote, touch) and to allow the user to select one or another of these modes.

5. The system typically handles shape distortion e.g. a trapezoid on the floor or ceiling, or projection at an angle, e.g. using any of the 3 methods of distortion handling described herein inter alia with reference to FIG. 23.

6. The system is operative to project screens representing pre-stored content such as a pre-stored virtual control panel of an electronic device. For example, the user interface may include a gallery of all supported remote control devices. The user, when he wishes to control electronic apparatus ("environment"), such as a television or air-conditioner, remotely, uses the remote control device which matches that apparatus and selects a suitable remote control device from the gallery. Alternatively, the user may key in or select the exact name and model of the environment (e.g. Electra air conditioner model 224) and a projected screen with the relevant remote control device is automatically generated, if supported. Support may be provided by the manufacturer of the device or by a suitable app store on the web. It is appreciated that the selected content may be projected to a location, size and shape which suits both the user's comfort and the application. For example, the user may project a virtual TV remote control device to the arm of his armchair, and may project a virtual keyboard to a desktop, e.g. if he is on the move and does not have his habitual keyboard with him. It is appreciated that the size, position and shape of the desired projection may have previously been bookmarked by the user such that s/he needs only to select the appropriate projection each time s/he wishes to watch television in that armchair or use a keyboard on that desktop.

Figure 25:
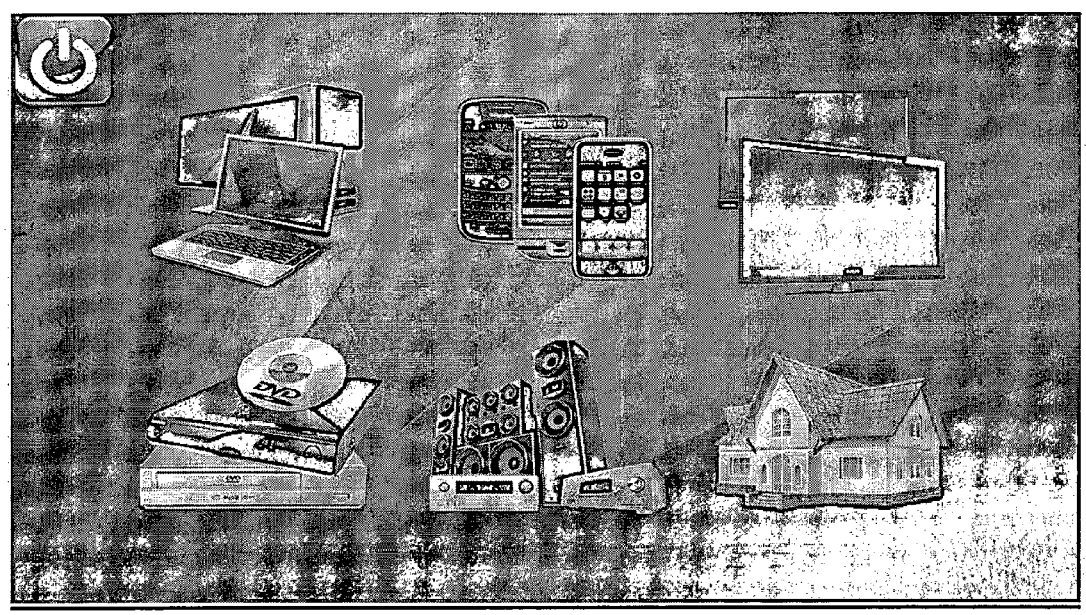
FIG. 25 is an example screenshot illustration of a top-level menu provided in accordance with certain embodiments of the present invention.
Figure 32D:
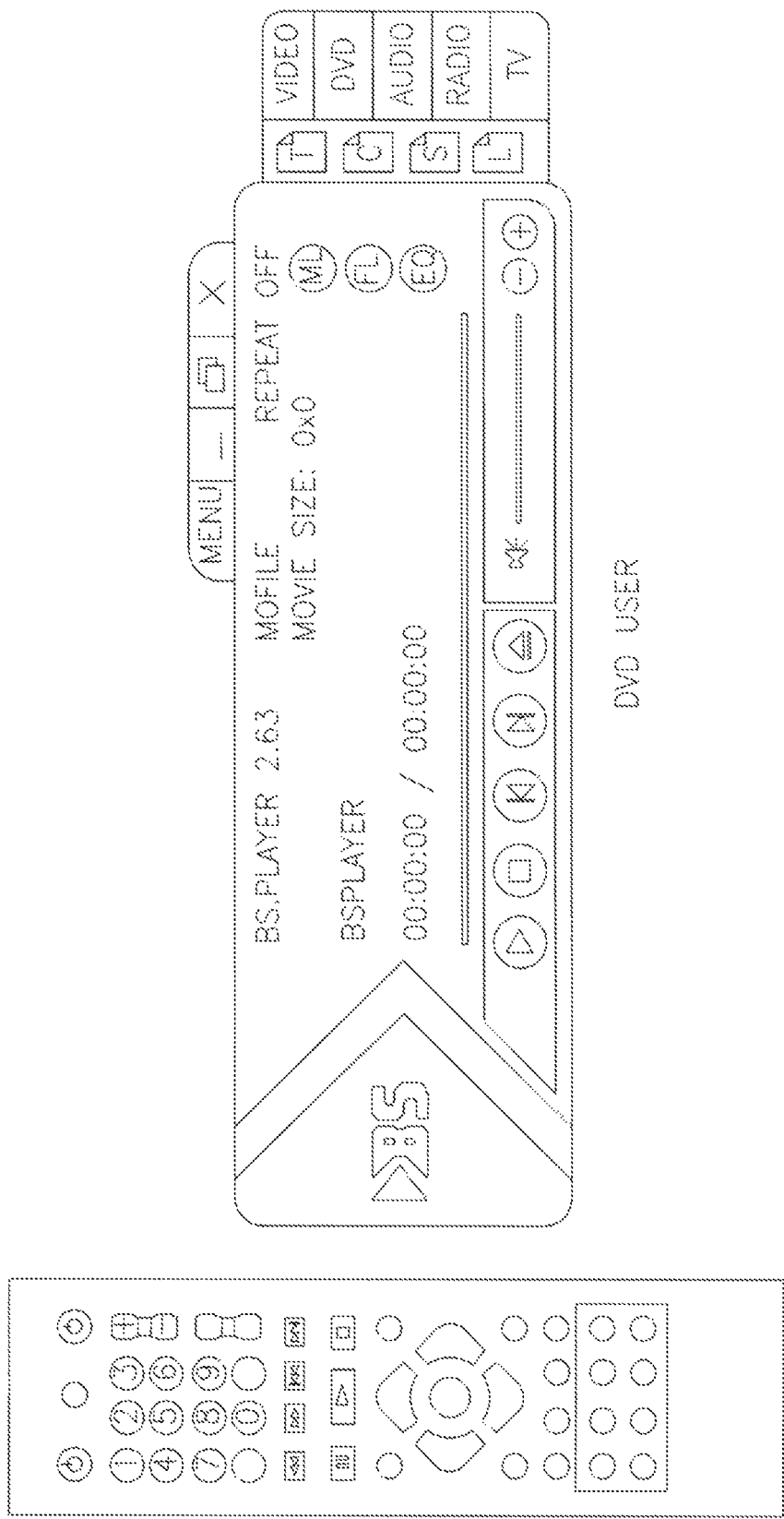
Figure 32F:
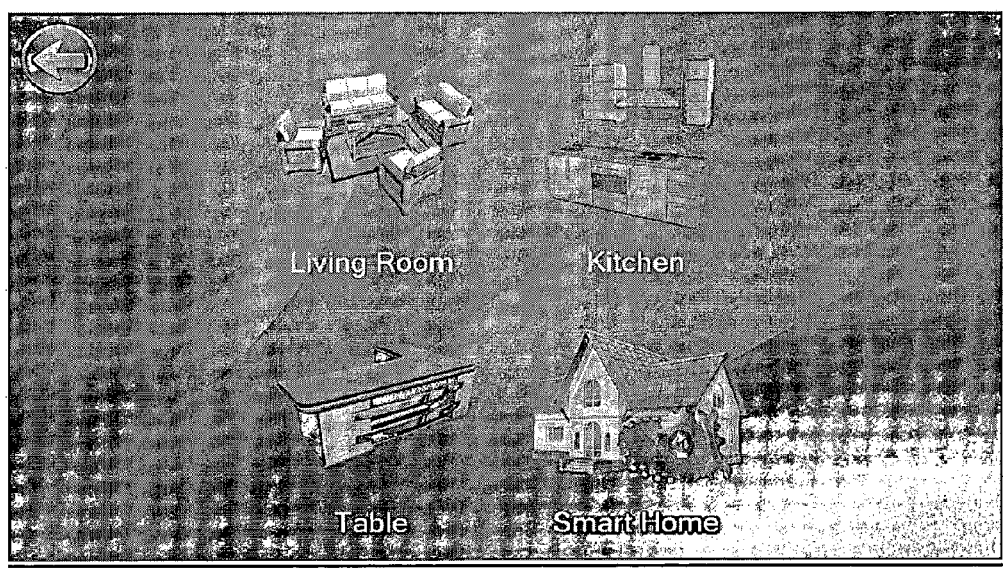

7. Interacts with a plurality of electronic systems serving the user, such as phones, pet's, TV and remote control, audio players, smart home. Typically, interactions with such systems may be initiated by a user, using a main screen, e.g. as shown in FIG. 25, allowing the user to select one or another electronic system for which bookmarks, defining suitable projected screens, may have previously been defined. If the computer icon (say) is selected, the user may be shown another screen with various computers available in the covered area e.g. in the entire house, for the user's selection. Other options may be suitably hierarchically presented to the user.

8. Remote control setup when using an IR based environment: an environment (e.g. TV) uses IR communication to communicate with its remote control according to an embodiment of the present invention, e.g. as per the method of FIG. 24.

FIG. 24 is a simplified flowchart illustration of a method for Remote control setup when using an IR based environment. In a set-up stage, the method "teaches" the IR emitter unit located on the agent where the IR sensor of a user-selected environment (e.g. the user's TV) is located. This information is then used for remote control. The method typically includes some or all of the following steps, suitably ordered e.g. as shown:

2410: Drag the IR sensor unit to point to the TV. The functionality may be similar to the screen dragging functionality described herein, e.g. using the IR laser located on the input device shown and described herein with reference to FIG. 1*a*-9*f*.

2420: Once the IR sensor unit of the agent has been pointed at (say) the TV, e.g. as confirmed in a predetermined manner using a suitable user input device, the system save the pointed at direction e.g. as a vector parameter (x,y,z).

2430: Now the user is expected to tell the system where exactly the TV's IR sensor is. The user may do one of two things:
  i. Touch the IR sensor e.g. with a pointing finger
  ii. Point the IR laser to the TV's IR sensor

2440: the result is that an IR light is emitted from (or reflected from, if the laser is used) the TV's IR sensor.

2450: The system saves that point as (X1,Y1). Having completed "set-up" steps

2410-2450, the system now has 2 parameters stored:
  i. (x,y,z)—The pointing direction of the IR sensor unit of the agent as a vector parameter.
  ii. (X1,Y1)—The exact coordinate of the TV's IR sensor at the scope of the agent's IR sensor unit (relative to its pointing direction).

2460: When the user want to control the TV (say) using projected remote control, the IR emitter unit of the agent apparatus shown and described herein is automatically directed to the vector direction saved at the setup stage (x,y,z). When the user selects a suitable input option, e.g. touches a 'volume up' button, the IR emitter unit emits the relevant information to point (X1,Y1) which is exactly where the TV's IR sensor is located. The IR emitter unit may use any suitable IR remote control protocol such as RC5, RC6, SIRCS, Ruwido, R-Step, NEC TC101.

When using an environment (e.g TV) that communicates with its remote control using wireless communication (where there is no direct eye contact between the remote control and the TV) e.g. Bluetooth, the setup described above may be omitted.

9. bookmarks of content, position, size, shape of a previously defined projected screen.

10. wireless display used by agent's computer to transmit content of screen to agent. It is appreciated that the wireless display is only one possible method for transmitting the content of the screen to the agent. Other options are:
  i. Using the power grid of the house (or office) to transmit the screen content to the Agent using any suitable power line communication (or broadband over power lines—BPL) such as IEEE P1901, ITU G.hn home grids protocol for example. In this case, the environment (e.g. computer) may be connected to the power grid using a custom made adapter that sends the screen's content to the built in receiver on the agent.
  ii. Using tangible cables such as VGA, DVI, HDMI etc.

11. Entire house is in field of view of a plurality of agents, and when a user proceeds from room to room, his approaching the limits of a particular (first) agent's field of view is noticed, a suitable (second) agent covering the user's current position and/or the direction in which the user is headed is identified, and the user is "handed" from the first agent to the second agent, using a suitable protocol such as P2p. This class of embodiments includes the "sequence effect", 'Spatial Continuity'" and "Continuous Spatial Screen" embodiments shown and described herein.

12. User interface for determining projected screen location, size and shape. In set-up the user may select the 4 vertices of a desired projected screen, or just the two opposite vertices, may draw a line representing the diagonal of a desired rectangular screen, and so forth.

13. Typically, each of several users of the system has an ID and each user may entitle (or not) other users to use electronic devices (such as a particular computer or cellphone) that are "his". The authorization functionality may comprise two levels:
  a. Is the device currently enabled for remote control using an agent. (Enabled/Disabled)
  b. Who is allowed to watch/control that device when Remote control is Enabled/Disabled.

Alternatively, the authorization functionality may be more complex, e.g. John may control Robert's computer on Enable mode only on Saturday but may view content on Robert's computer, when on disable mode, any time.

14. "tangible user interface" embodiment in which, in the user's experience, the screen jumps into and out of a device with an integral screen, such as a television or computer. A set-up process first occurs, in which the user pre-defines the location of the TV (say) e.g. telling the system where the IR sensor of the TV is e.g. as per the method of FIG. 24. the agent is turned on. If the user drags the screen to the known location of the TV, the agent then, using a predetermined protocol, requests the TV to display on its physical screen, the content to be displayed. If the user later indicates a projection location other than the known location of the TV, the agent then typically terminates the TV display and, instead, generates a projection of the desired content at the desired location.

15. multi-agent embodiment, as described herein.

16. "360 degree" embodiment (also termed herein the "agent 360"), as described herein; including a static-dynamic embodiment as described herein in which mirrors move. The Agent 360 typically includes a plurality of IR cameras which together may record the entire area that surrounds the Agent. These IR cameras may record any IR light which comes from any IR sources such as the IR sources of the G-Mouse. It is appreciated that the applicability of this feature is not restricted to the "Static embodiment" shown and described herein. Typically, multiple IR cameras each pointed to a different direction with overlapping fields of view are provided. When their fields of view are digitally stitched together, this results in a complete 3D panoramic view of the entire spatial area that surrounds the Agent. The stitching process may use conventional technologies such as image registration, image calibration and image blending and/or may use existing dedicated programs such as but not limited to Autostitch, Ptgui, Stitcher Unlimited (Autodesk), Panorama Tools, Microsoft Image Composite Editor, Photoshop CS4.

Figure 11:
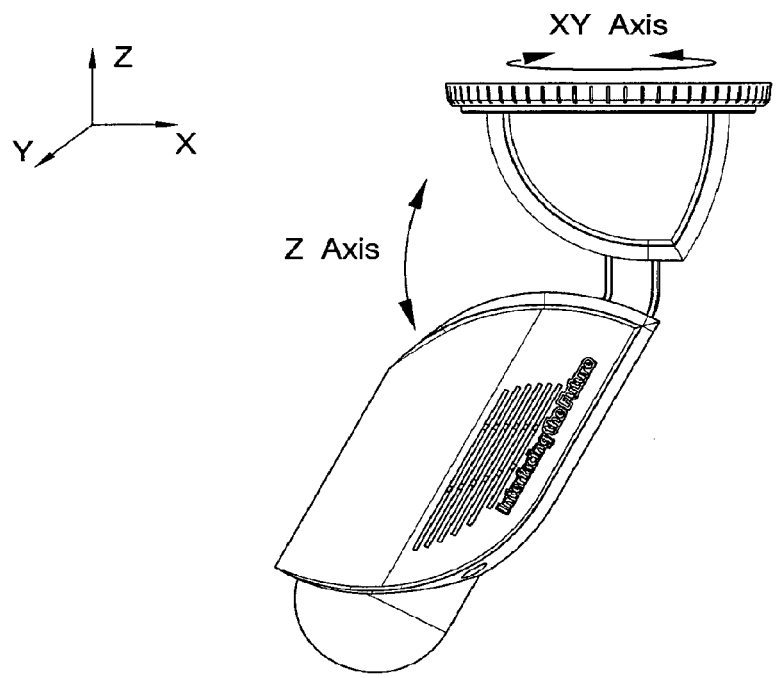

17. ceiling-projecting agent which is mounted on the ceiling e.g. as shown in FIG. 11. Regardless of the spatial movement mechanism employed to allow the agent to project in a desired direction, because the agent is installed on the ceiling, a certain distance from the ceiling may be achieved, to enable projection of a large screen on the ceiling. Generally, the larger the distance, the larger the ceiling-projected screen may be. Typically, an elastic arm is provided which is long enough to achieve the desired distance from the ceiling without any additional adjustment.

18. Typically, several pre-defined work modes may be provided, such as productive mode, entertainment mode, etc. In each mode, one or more agents may change their projection content, size, shape and place according to the predefined user preferences of each mode. For example, when productive work mode is chosen, one agent projects a virtual keyboard and a virtual mouse pad on the desktop, second agent projects a computer screen on the wall, and third agent projects a certain web site on the floor.

19. RTLS (real time locating systems); comprising functionality which enables the "screens on demand" and "individual content" features described herein.

20. a controllable projected screen generator which allows user to control size of projected screen e.g. simply by bringing her or his hands far apart or close together to define, say, a small cellphone screen which may display a virtual representation of all input options of a selected cellphone including its screen and buttons if any, a suitably elongate keyboard screen which may display a virtual representation of a keyboard including all its keys, a small, elongate remote control device which may display a virtual representation of all input options of a selected remote control device, a large screen for television applications, and so forth.

21. "Object relations" method of FIGS. 26a-26b.

22. video communications functionality enabling the videophone feature shown and described herein.

According to certain embodiments of the present invention, the agent may be characterized by one or more of the following:

a. each of the agent's units (e.g. Projecting, IR, Video camera) may move on a different axis b. more than one unit of one (or more) of the categories described above c. voice commands to control bookmarks d. 3-D projection as described herein e. audio communication as described herein f. Modular objects as described herein g. an SDK (software development kit) to allow users to create, share, sell and buy application from an app store.

It is appreciated that the applicability of the foldable rear screen projection feature described hereinabove includes all suitable embodiments of the agent shown and described herein and is not limited to the video communication functionality shown and described herein.

Figure 10:
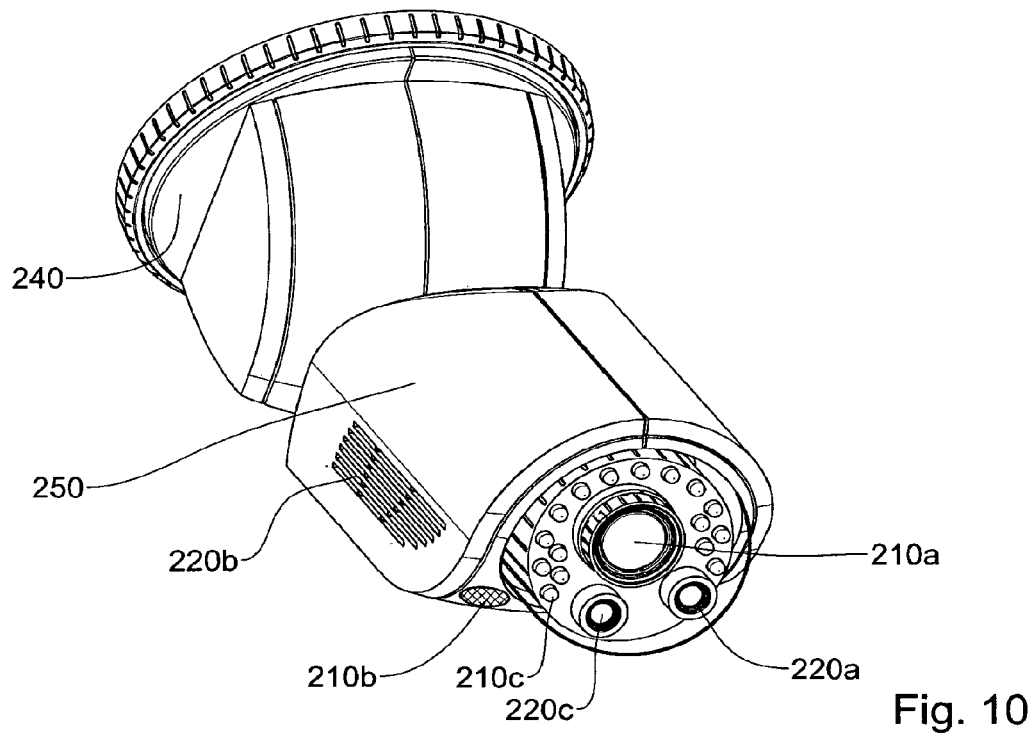
FIGS. 10-12 and 14 illustrate physical components of agent apparatus constructed and operative in accordance with certain embodiments of the present invention.

FIG. 10 illustrates an "agent" according to an embodiment of the present invention. As shown, the agent of FIG. 10 typically comprises a Projector 210a, a Microphone 210b, a Light sources array (Lasers & Led's) 210c, an Infra-red sensor 220a, Speakers 220b, a Video camera 220c, a Mounting unit 230 and an Electronic processing and control unit 240 which typically includes a wireless communication unit, memory unit and processing unit (also termed herein "component nos. 3-5" respectively). FIG. 11 demonstrates spatial movement of the agent of FIG. 10 according to certain embodiments of the invention.

Figure 12:
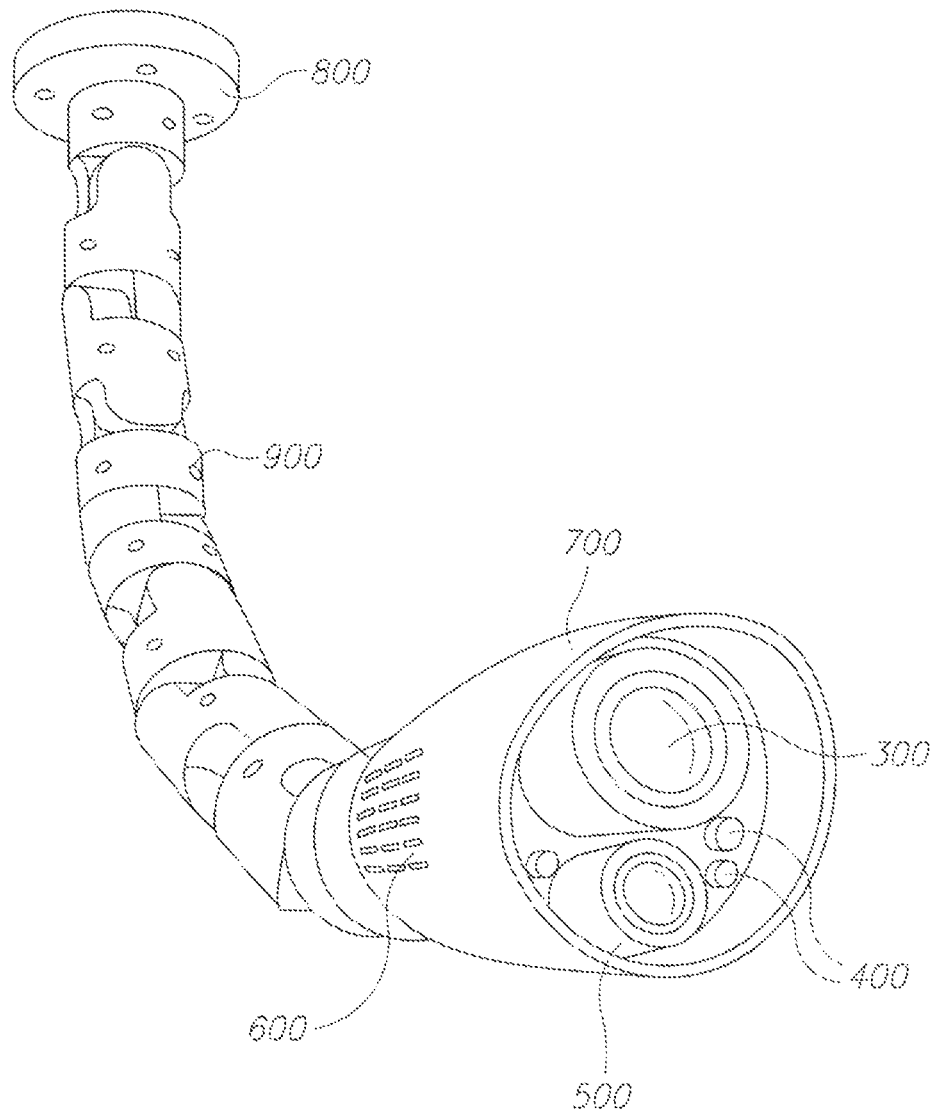
Figure 13:
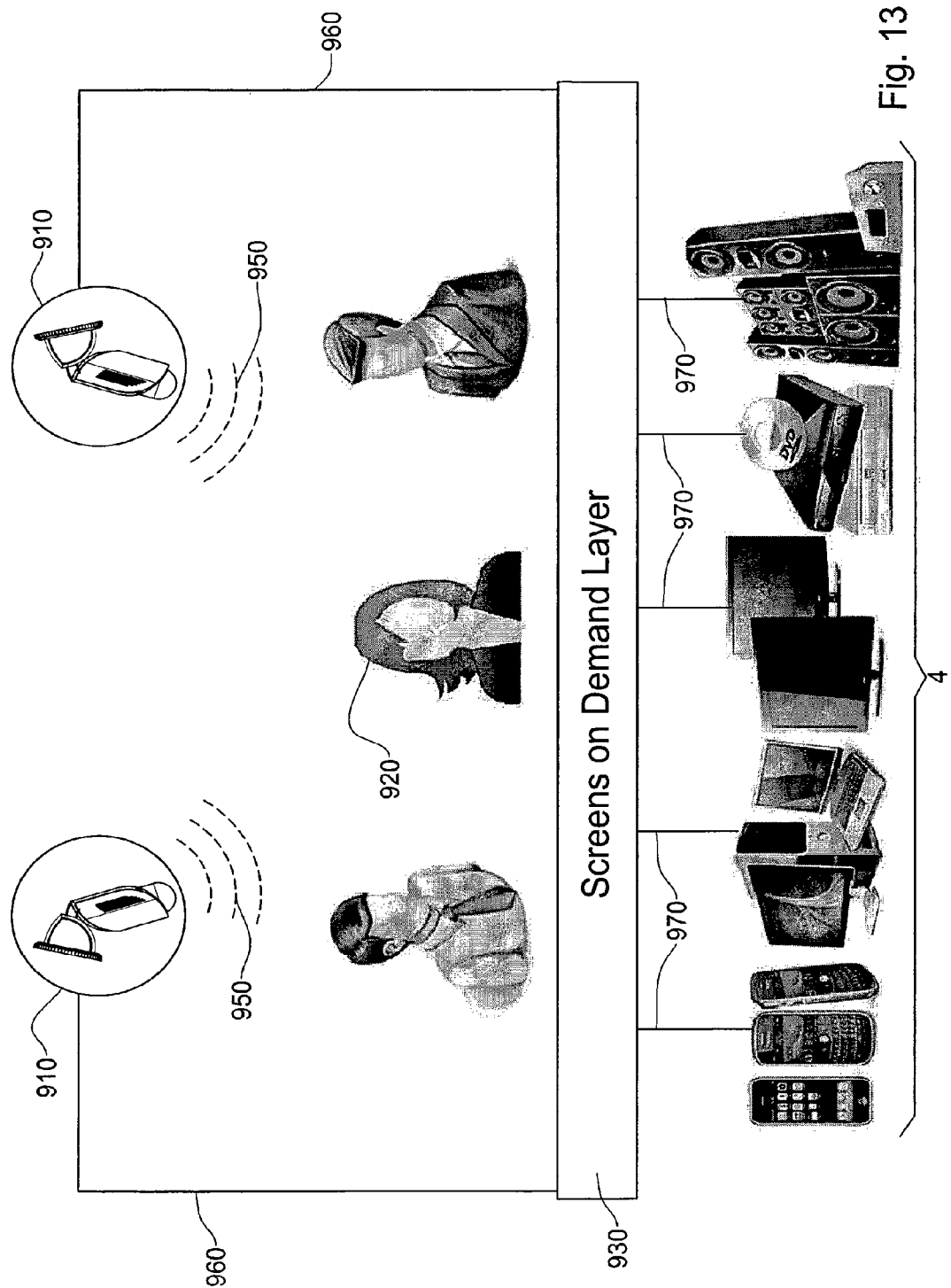
FIG. 13 is a diagram of a "screens on demand" embodiment of the present invention.

FIG. 12 illustrates an "agent" according to an embodiment of the present invention including a Projector 300, Light sources array including e.g. lasers and/or LEDs 400, a Camera/Infra-red camera 500, Speakers and Microphone 600, Electronic processing and control unit 700, Mounting unit 800, and a Spatial movement arm 900. FIG. 13 represents components of a system including any of the agents shown and described herein and interconnections therebetween.

The apparatus of FIG. 13 typically includes one or more Agents 910, Users 920 interacting with the system, "screen on demand" software functionality 930 performing one, some or all of the methods shown and described herein e.g. the computational, information storage and information presentation steps of FIGS. 23, 24, 26-31; Environments 940, and communication layers typically including a User-Agent communication layer 950, an Agent-Program communication layer 960, and a Program-Environment communication layer 970.

The "screen on demand" software functionality 930 may reside on any computer around the house. The software may be installed once and may initiate itself every time after restart or shut down event. In more advanced settings, the "screen on demand" software functionality 930 may reside on the existing infrastructure of one or more of the agents, rather than on a separate computer. Possible interconnections between the software and its surroundings are described hereinbelow.

An environment 940 is defined to be any electronic system that supports interaction with the user, such as but not limited to televisions, computers, mobile phones, audio and video systems, air conditioners etc.

User—Agent communication layer 950: The communication between the user and the agent is typically wireless only. It extends over different methods such as projected light as screens, transmitting and receiving wireless signals from the g-mouse (or any other controlling device), Transmitting and receiving voice from the user, receiving optic signals from the g-mouse (or any other controlling device) etc.

Agent—Program communication layer 960: When residing on a computer, the software e.g. "screen on demand" software functionality 930 uses the computer's communication components to communication with the agent (and with the environment and the g-mouse, if used). The communication may be achieved using one or more methods, for example either of the following 2 methods:

Method A: The input the agent receives from the user (or from the g-mouse), may be sent to the program to interpretation and response, using signals created and transmitted by the agent's wireless communication unit and than being captured by the computer's communication unit (e.g. BT, WiFi, flash dongle attached to the computer with a RF receiver etc.). And the process may go vice versa when the program needs to inform the agent to move to a different direction for example.

Method B: Another option is to use any kind of power line communication (or broadband over power lines—BPL) such as IEEE P1901, ITU G.hn home grids protocol for example. Using method B, the resident computer may be connected to the power using a fitted adapter supplied with the kit for it to operate the appropriate power line communication standards (unless it already has an embedded unit for it).

When residing on the agent itself, the program may directly interact with agent's sensors and other components.

Program—Environment communication layer 970: The software e.g. "screen on demand" software functionality 930 typically receives all the input data from the agent, the users, and the input device e.g. g-mouse, processes it, and then sends appropriate output to the relevant environment being used. When the controlled environment is the computer housing the program, the software interacts with the Operation system's available API's. When the controlled environment is any other one, the input/output stream may again be directed to the physical layer to be sent to the relevant environment (e.g. cellular phone) either by using any wireless communication method (e.g. method A above) or any power line communication standard, typically only when the cellular phone is connected to the power grid, (e.g. method B above.

Additional information streams may be available, for example one or both of the following:

a. The content of the environment's screen may be directly transmitted to the agent even when the program residents on a local computer.

b. Wireless signals from the G-mouse (or any other controlling device) may be received directly by the computer hosting the main program without the information pass thru the agent.

Figure 14:
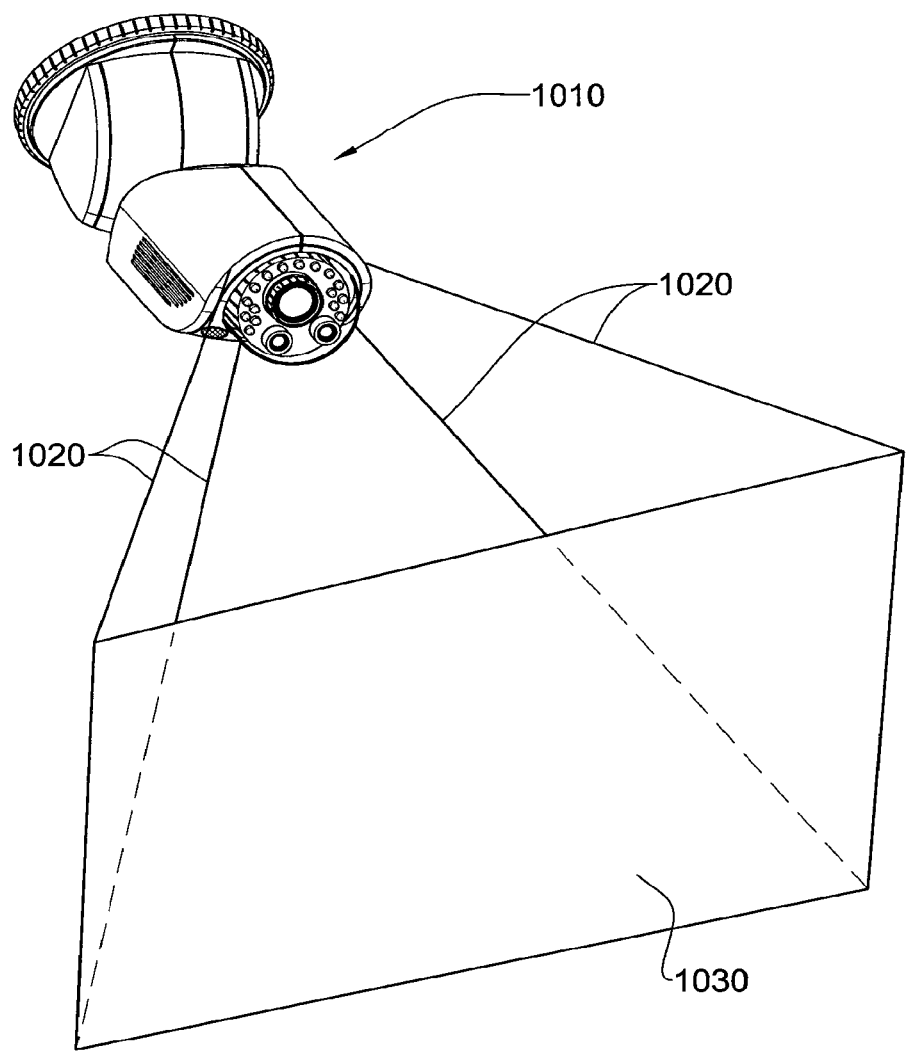
Figure 16A:
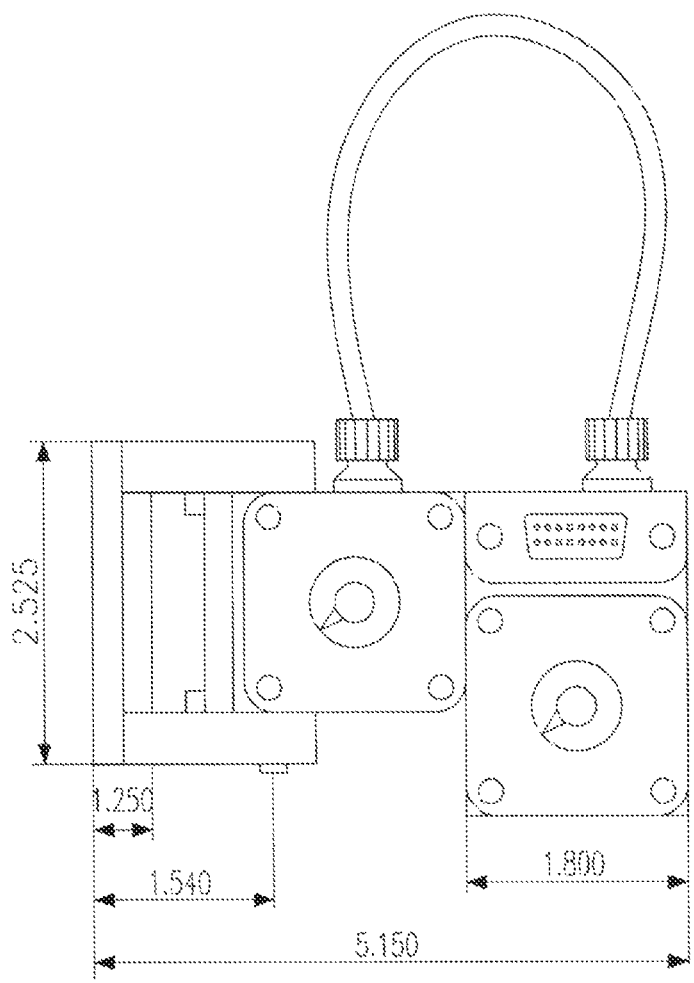
Figure 16B:
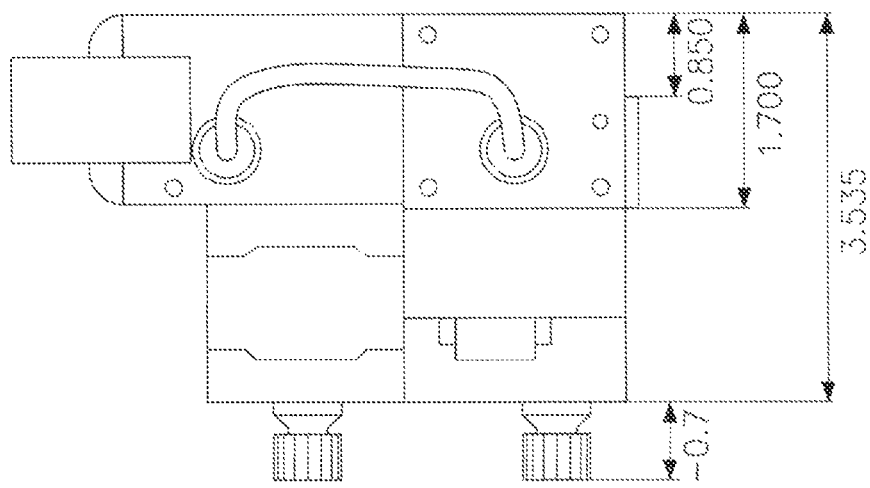
Figure 17A:
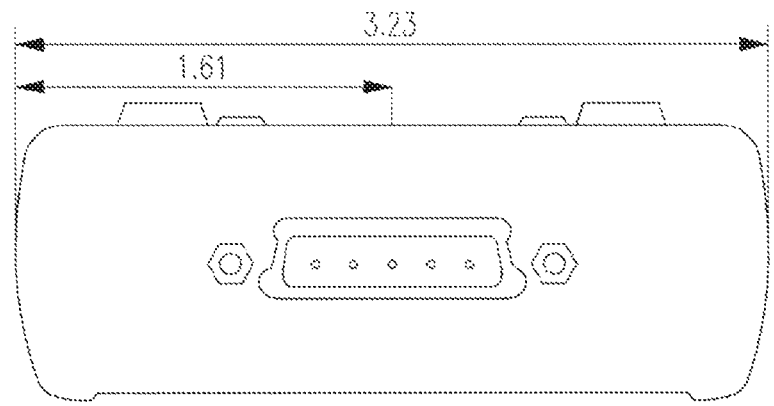
Figure 17B:
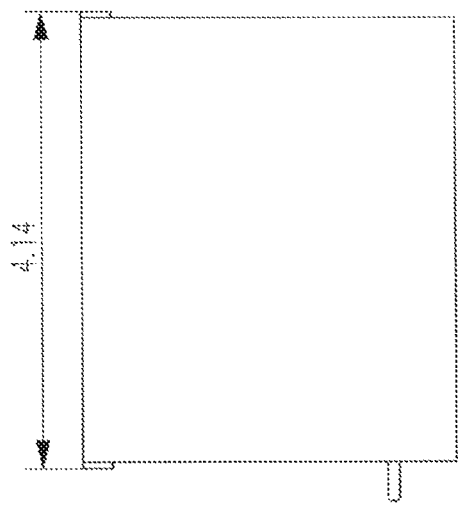
Figure 17C:
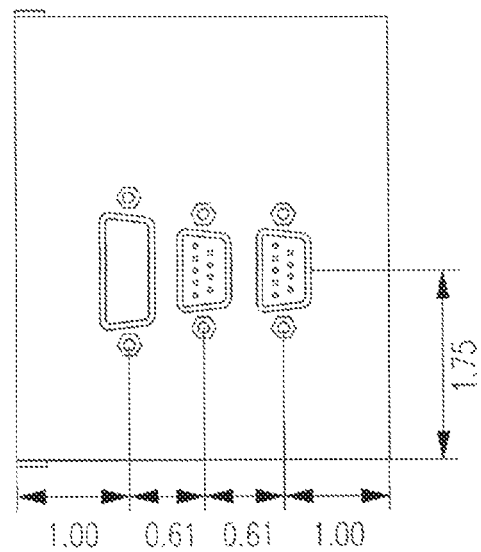
Figure 17D:
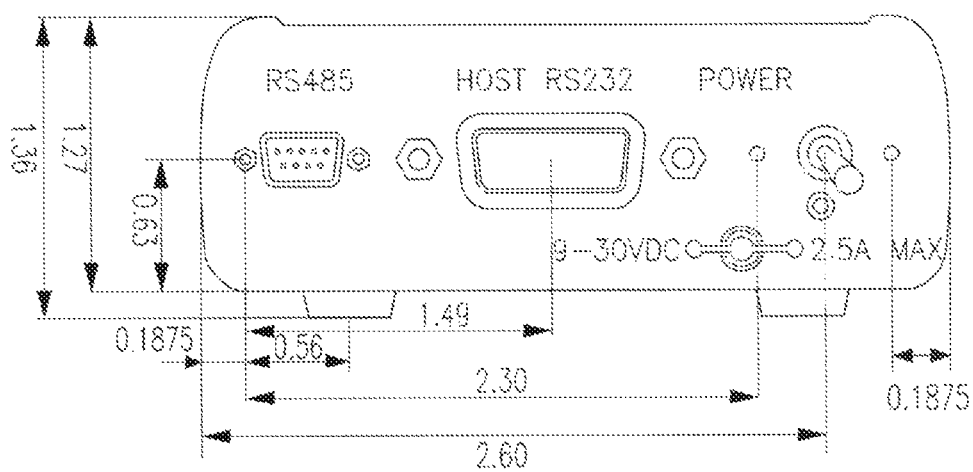
Figure 17D:
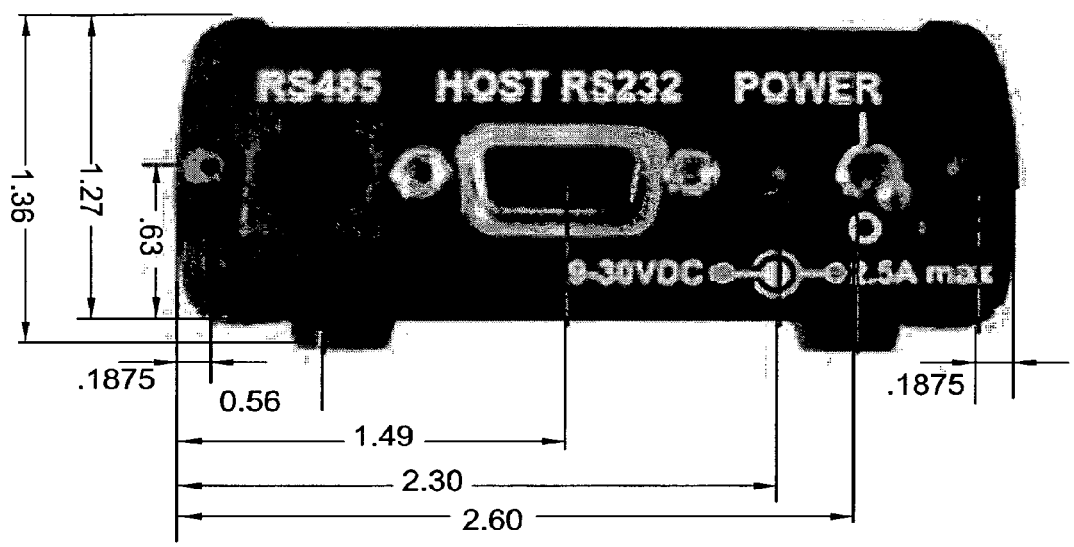

FIG. 14 illustrates an agent 1020, according to any of the embodiments shown and described herein, a plurality of holder 1020 e.g. four holders, and a Fabric 1030 having rear projecting capabilities as described herein, Such as AERO-VIEW 70/100, LUMIFLEX 130, FILMSCREEN 100/150.

Figure 33A:
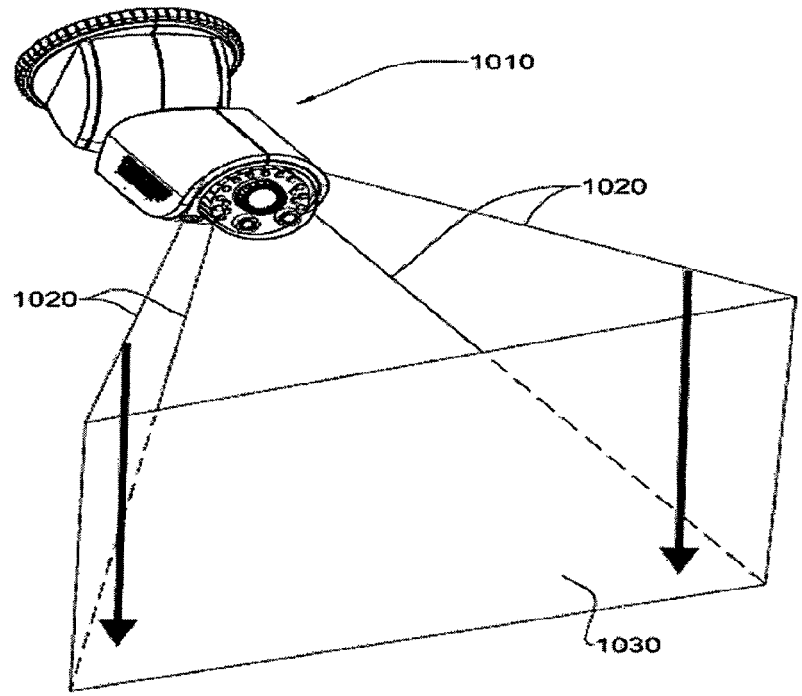
FIGS. 33a-33d are useful in understanding certain operation modes of the apparatus of FIG. 14, according to certain embodiments of the present invention.
Figure 33B:
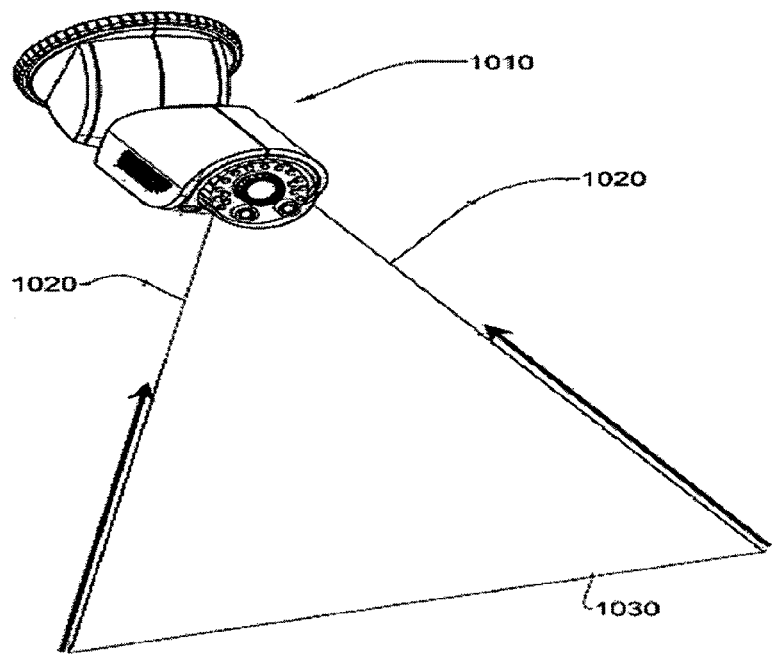
Figure 33C:
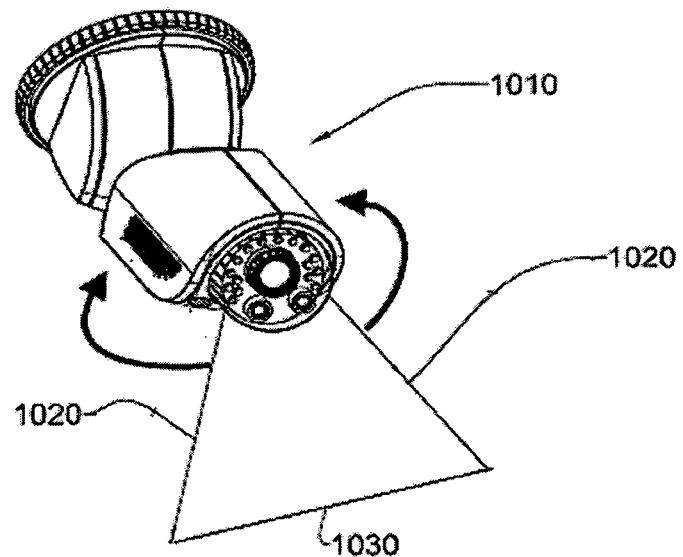
Figure 33D:
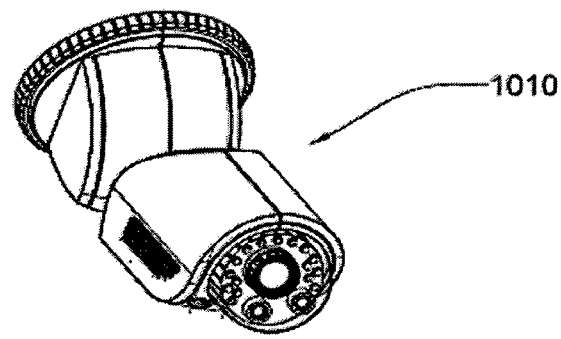

In this embodiment, the system may supply, upon request, an extracted apparatus which locates a fabric with rear projecting capabilities a certain distance in front the agent facing its projecting unit. Simultaneously, the projecting is replaced to rear projection mode, creating an appropriate screen to the user looking from front. The holders may be of any kind including telescopic rod, rigid metals, elastic arms (as described at FIG. 2) etc. The trigger to the extraction of the apparatus may be a voice command given to the agent, a command coming from the GUI, or any other source. The folding and extracting mechanism of the apparatus may for example be as follows:

The two upper holders move down towards the two lower holders and converge with them e.g. as shown in FIG. 33a. If the holders are telescopic rods, they will shrink to the proper size as shown in FIG. 33b. Then, the two converged rods continue to move around their movement axis (which is their connection point with the agent) with the screen folds between them until they attach to the bottom of the agent as shown in FIG. 33c. Eventually, the entire drawn apparatus may be invisible to the user, as shown in FIG. 33d. The extraction process could alternatively be ordered vice versa.

Three example methods for handling distortions are now described. The terms "distortion handling" and the like, and "screen shape control" and the like, are used herein generally interchangeably.

FIG. 23 is a simplified flowchart illustration of a first distortion handling method which is also termed herein the "absolute edge points location method". The method of FIG. 23 may include some or all of the following steps, suitably ordered e.g. as shown:

Step 2310: The agent is pointed to some area the user want to project a screen to (the floor, for example).

Step 2320: The system waits for the user to define the 4 edge points (vertices) of the desired screen. Any suitable methodology may be used for this, such as but not limited to actual user-definition of all 4 points or user definition of 2 diagonally located vertices.

Step 2330: the user uses his input device, e.g. the "G-mouse" input device described above with reference to FIGS. 1-9f, to touch one of the edge points, for example—the upper left point of the desired screen. The IR sensor captures that point's position and saves it as (X1,Y1).

Step 2340: The projection unit projects a visual feedback, a small blue dot for example, to point (X1, Y1) for the user's convenience.

Since the IR sensor unit and projection unit may have individual moving axes, in order to perform step 2340, they are each typically in their respective 'natural states' e.g. both pointing to precisely the same direction since otherwise, the projection unit's (X1,Y1) and the IR sensor unit's (X1,Y1) may not be the same actual point in space. When in their natural state e.g. pointing to exact same direction, both units are typically pre-calibrated at the manufacturing stage so the system may translate between the IR sensor absolute coordinates to the projection unit absolute coordinates. This arrangement regarding natural states and pre calibration typically applies to all direction sensitive units of the agent such as its web cam, IR emitter, IR sensor, and projection unit.

Step 2350: Currently, what the user can see is a blue dot on the left upper point of the desired screen. Now according to that dot position the user may select, by touch, the next edge point, typically in a predetermined order (right upper point for example). The IR sensor captures that point's position and saves it (X2,Y2).

Step 2360: Step 2340 is repeated; now the user can see two blue points on the desired area, representing, say, the left and the right upper edge points of the desired screen.

Step 2370: The user defines, similarly, the next 2 edge points until the system has (X3,Y3) and (X4,Y4). Preferably, from the system point of view, the desired screen as defined by the user need not be rectangular. It may be at any shape including undefined geometrical shapes, e.g. the example shape illustrated in FIG. 15A. The projection unit projects a screen at the shape as defined. But when the light beams hit the desired surface the output is typically a rectangular screen confined within the 4 edge points defined by the user.

Step 2390: The user saves the characteristic of this surface using a dedicated 'save' button on the GUI or speech recognition (for example).

Step 2395: From now on, when the user wants to move the screen on the same surface (floor for example) or change its size, the system may remember the proportion of a Projection angles of that surface and adjust accordingly. For example, all shapes illustrated in FIGS. 15B-15E typically reflect as rectangular screens on (say) the floor.

The second distortion handling method is also termed herein the "relative edge points location" method. Conventional distortion treatment, for conventional static projectors, assumes that the projecting surface is a vertical wall standing directly in front of the projector. Thus, conventional built in distortion treatment methods only reduce or enlarge the bases of the trapezoid projected on the wall, typically using a user-selected one of two options such as plus/minus. The agent shown and described herein, in contrast, projects screens on any surface in the environment, thus, the system enables the user to control the entire shape of the projection by controlling the exact location of each edge point.

Referring again to the example of FIG. 15A, the user may vary the coordinates of each edge point separately. For example, given a reference e.g. user-selected initial vertex X1,Y1, the user may select to increment or decrement either of the coordinates, thereby to obtain the following vertices respectively:

1. -X: (X1-1,Y1)
2. +X: (X1+1,Y1)
3. -Y: (X1,Y1-1)
4. +Y: (X1,Y1+1), where the unit is (say) a single pixel. Typically, if one of the edge point's coordinates is changed, it naturally influences the entire shape of the projected screen according to user's wishes. For example, the user changes the left upper edge point (defined as P3 from now on) to be one pixel higher, from (X1,Y1) to (X1, Y1+1). Under default preferences the edge points are connected by a straight line, so the line equation between P3 to its neighbors (the right-upper point and the left lower point) are altered to connect to point (X1,Y1+1) and not to point (X1, Y1).

The third distortion handling method is also termed herein the "topography detection" method. The agent may use any kind of topography detection method to understand the 3d topography of the environment (e.g home, office) on which an image is to be projected, such as but not limited to short distance sonar and use of depth sensing cameras. Ones the agent understands the 3d topography of the environment, including the relative angle of each surface, it may auto adjust the projection shape so reflect a rectangular screen when hitting the surface.

It is appreciated that the system may also implement any combination of the three distortion handling methods above. Typically, projector manufacturer's cooperation is sought to obtain complete control of the projector itself in order to enable the system to manipulate the exact projected shape. Typically, at any time the user may save all characteristics (e.g. location, shape, content) of a screen s/he has defined, or any combination of such characteristics, as bookmarks, using a suitable GUI or speech recognition. For example:
 a. save location as 'table'
 b. save location+shape as table 'screen 1'
 c. save location+shape+content as 'my screen'

Example

An example agent is now described, with reference to FIGS. 16a-22. In the example, the movement mechanism of the agent includes a pan-tilt unit such as but not limited to the PTU-D46 Pan Tilt unit commercially available from Directed Perception Inc., illustrated generally in FIGS. 16a-17d, or any other suitable pan tilt unit having some or preferably all of the Pan Tilt performance parameters set out in the table of FIG. 21 and some or all of the Pan Tilt features set out in the table of FIG. 22.

Figure 18:
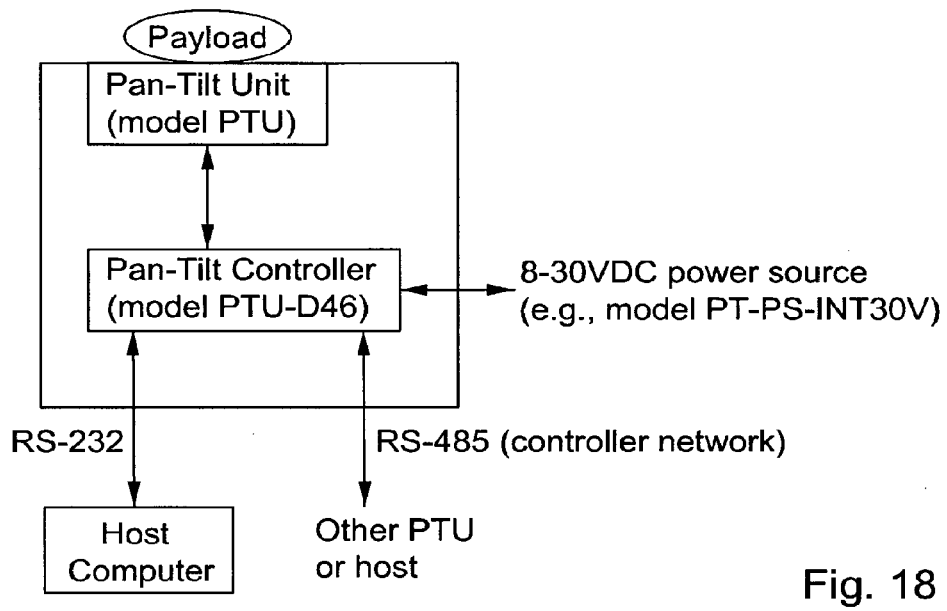
Figure 19:
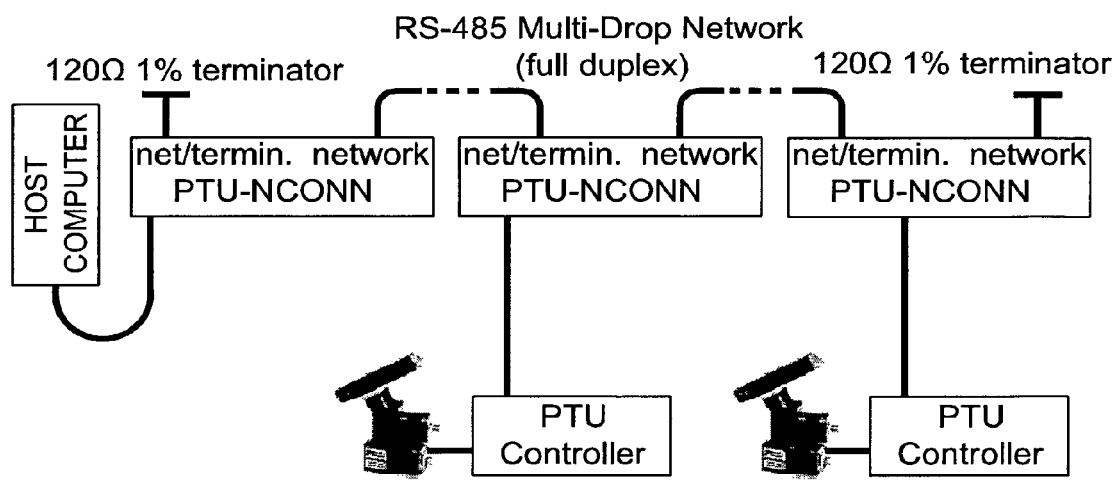

In the example, as shown in FIG. 18, the Pan Tilt unit (PTU) is connected to a controller which accepts command via RS-232 from a host computer, and drives the position of the Pan and Tilt units separately. The controller may also be connected to other controllers via a multiple RS-485 network so that a single host computer may control multiple Pan Tilt units (and therefore multiple agents). Regarding Multiple Agents, each PTU controller has a built in RS-232 to RS-485 converter, and the host computer may be connected to the RS-485 controller network by connecting to the RS-232 connector on a PTU controller. The PTU controllers are then connected together via an RS-485 multi drop network (full duplex), as shown in FIG. 19.

The IR sensor unit of the Agent's prototype may comprise a unit similar to or identical to the IR sensor serving the input device of FIGS. 1-9f. This unit may be installed on the PTU unit so it moves in accordance with its movement. Each IR sensor is connected to the host computer e.g. utilizing Bluetooth communication and using any suitable driver installed on the host computer, such as a Bluesoleil driver.

The projecting unit of the Agent's prototype may for example be implemented using an "off the shelf" laser diffraction based Pico Projector such as L1 laser Pico Projector commercially available from AAXA Technologies. The projecting unit may be installed on the PTU unit such that, it moves together with the IR sensor unit hence their relative positions always remain the same. More generally, any suitable laser diffraction based Projector could be used; weight, volume, energy consumption being generally of any value except as dictated by application-specific considerations.

Each Agent's Projector connects to a different video out port of a video matrix switcher, using any suitable video cable such as but not limited to VGA, DVI, HDMI. Regarding the Video Matrix Switcher, while each Agent's projector connects to a different video-out port of the video matrix switcher, each environment (e.g. computer, television, mobile phone etc.) connects to a different video-in port of the video matrix switcher.

In addition, the switcher is connected to the computer host which runs the main program using an appropriate data channel such as RS-232 or Ethernet. One example of a suitable video matrix switcher is VP-4×4K, supplied by Kramer Electronics Ltd. However, any video matrix switcher which is operative to support a proper bandwidth with a sufficient amount of video in/out ports, depending on the number of controlled environments desired to be provided, may alternatively be employed, such as but not limited to DVTel, Optibase, Scopus, Aver Media, Autopatch, Crestron, Extron, Polycom. It is appreciated that if a suitable wireless display technology, such as Intel's WiDi or Amimon technology is employed, the switching process may be controlled and managed by the main program which is typically resident on the host computer. Using this wireless implementation method, the physical video matrix switcher may be eliminated.

The video camera may comprise an "off the shelf" Webcam installed on the PTU unit thus moving with the projecting and the IR unit as one piece. The Webcam may be from Logitech's quick cam series or alternatively may comprise any other suitable webcam such as Apple iSight series, creative live! Cam series etc. Each agent's webcam is connected to the host computer with a USB cable, e.g. using a USB HUB connected to the host computer. The input device used to control the Agent may comprise the "G-mouse input device" described above with reference to FIGS. 1-9f. The input device is typically operative to control a projected screen's content both from up close and from a distance, typically using both of a human user's hands as described above in detail. The input device may control one or more of the projected screen's position, size and shape as described herein e.g. with reference to FIGS. 15a-15e and FIG. 23.

FIGS. 32a-32f are example screenshot illustrations of menus which are respectively displayed responsive to a user selection of the exemplary 6 menu options shown in FIG. 25 respectively.

It is appreciated that any suitable mechanism may be provided to adjust the position/direction of any of the following units: projection unit, IR sensor unit, IR emitter unit, web cam unit. Each unit may or may not have its own individual engine for this purpose.

It is appreciated that the agent typically is operative, selectably, to project a screen to the entire surrounding azimuth (360 degrees) e.g. using the axes of motion provided in FIG. 11. This is the case both for the so-called "360 degree agent" shown and described herein and for other embodiments. The static embodiment may include all features described herein with reference to the static dynamic projection embodiment, combined with all features described herein with reference to the 360 degree agent embodiment.

Generally, it is appreciated that the apparatus shown and described herein may be provided in a static embodiment or in a static-dynamic embodiment. The latter may be similar to the apparatus of FIGS. 10-12 except that the agent does not move. The static embodiment typically includes one or more mirrors located inside the agent which break or refract the projected light beams such that the screen is projected to a desired location place without the projecting unit moving at all. The mirrors typically refract or break the light beams according to Snell's law. The mirrors can be disposed oriented and operative in a variety of ways to achieve 3d spatial coverage abilities. For example, using the axes as defined in FIG. 11:

1. The projecting unit is always directed in the negative direction of the Z Axis ("Down").
2. The first mirror is mounted in a way that its movement axis is the Y axis.
   a. The plane equation of the mirror is $Z=-AX$ where A is a parameter controlled by the system. For example, if $A=1$, the projected screen which is directed to the negative Z axis ("Down") breaks or refracts at an angle of 45 degrees (according to Snell's law) and is projected to the positive direction of the X axis ("RIGHT").
   b. The range of values of parameter A is $(-\infty, +\infty)$ so the first mirror covers the entire (X,Z) plane.
3. The second mirror is mounted such that its movement axis is the X axis.
   a. The plane equation of the mirror is $Z=-BY$ where B is a parameter controlled by the system.
   b. The range of values of parameter B is $(-\infty, +\infty)$ so the first mirror covers the entire (Y,Z) plane.
4. The third mirror is mounted in a way that its movement axis is the Z axis.
   a. The plane equation of the mirror is $Y=-CX$ where C is a parameter controlled by the system.
   b. The range of values of parameter C is $(-\infty, +\infty)$ so the first mirror covers the entire (X,Z) plane.
5. By controlling parameters A, B and C, the system controls the exact direction to which the screen is projected, such that the exact direction exactly corresponds to the user's input.

A particular advantage of certain of the embodiments shown and described herein is great ease and convenience of use of electronic apparatus. For example, an iphone control may be projected on the kitchen table, a TV screen may be projected on any wall, a youtube control may be projected on the bed for use before sleep, a TV-remote control device may be projected on an arm-rest, and so forth. Bookmarks may be used to make it easy to provide each of these use cases at any time during the day.

It is appreciated that certain embodiments of the present invention described in the context of mouse-operated applications may if desired be modified for cursor-based applications other than mouse-operated applications. It is appreciated that IR-based implementations described herein are only by way of example and any other suitable technology may replace the IR implementation described herein. Also, buttons illustrated herein may of course be replaced by any other suitable actuator. Flowchart illustrations shown and described herein are intended to represent any methods which include some or all of the illustrated steps, suitably ordered e.g. as shown.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

What is claimed is:

1. A system comprising:
   (a) a finger-wearable device comprising:
   a force sensing actuator configured to sense multiple operating modes comprising a pinching of thumb to finger and a touching of a screen,
   multiple light sources comprising:
     (i) an infrared (IR) laser, and
     (ii) an IR light-emitting diode (LED),
   a controller configured to:
     (iii) trigger a first one of the multiple light sources when the force sensing actuator senses a first one of the operating modes, and
     (iv) trigger a second one of the multiple light sources when the force sensing actuator senses a second one of the operating modes;
   (b) an optic sensitive apparatus; and
   (c) a controller associated with the optic sensitive apparatus and configured to:
   communicate with a host computer that utilizes a visual content projector to project visual content onto the screen, and
   based on signals received from the optic sensitive apparatus:
     (v) trigger a first input functionality in the host computer, wherein the first input functionality is based on a location on the screen corresponding to where an IR beam from the first one of the light sources is emitted, and
     (vi) trigger a second input functionality in the host computer, wherein the second input functionality is based on a location on the screen corresponding to where an IR beam from the second one of the light sources is emitted.

2. The system according to claim 1, wherein the first input functionality is a drag-and-drop functionality, wherein:
   dragging starts at a location on the screen where the pinching initiates; and
   dropping occurs at a location on the screen where the pinching ceases.

3. The system according to claim 1, wherein the first input functionality is a swiping or scrolling functionality, wherein:
   swiping or scrolling start at a location on the screen where the pinching initiates; and
   swiping or scrolling end at a location on the screen where the pinching ceases.

4. The system according to claim 1, wherein any one of the first and second input functionality is a clicking functionality.

5. The system according to claim 1, wherein said force sensing actuator comprises:
   a capacitor configured to sense the first one of the operating modes; and
   a physical control configured to sense the second one of the operating modes.

6. The system according to claim 1, wherein said IR laser is positioned such that it emits its IR beam substantially along a longitudinal axis of said finger-wearable device.

7. The system according to claim 1, wherein said IR LED is positioned such that it emits its IR beam substantially perpendicularly to a longitudinal axis of said finger-wearable device.

8. The system according to claim 1, wherein:
   said finger-wearable device further comprises a radio-frequency (RF) transmitter; and
   the system further comprises an RF receiver coupled to said controller that is associated with the optic sensitive apparatus.

9. The system according to claim 8, wherein:
   said finger-wearable device further comprises a touch-sensitive electronic pad; and
   said controller of said finger-wearable device is further configured to transmit signals from said RF transmitter to said RF receiver, wherein the signals are indicative of motion of a thumb over said touch-sensitive electronic pad.

10. The system according to claim 1, wherein said optic sensitive apparatus is directed towards both of the finger-wearable device and the screen, such that the finger-wearable device and the visual content are both within a field of view of the optic sensitive apparatus.

11. The system according to claim 1, wherein said controller that is associated with the optic sensitive apparatus is further configured to communicate with said host computer by way of masquerading as a computer mouse that triggers the first and the second input functionalities.

12. The system according to claim 1, wherein said controller that is associated with the optic sensitive apparatus is further configured to facilitate calibration of the system, wherein:
   the host computer utilizes the visual content projector to project visual indications onto the screen;
   the finger-wearable device is utilized to mark the screen where the visual indications appear; and
   said controller that is associated with the optic sensitive apparatus correlates coordinates of where the optic sensitive apparatus detects the marking of the finger-wearable device with coordinates of the visual indications.

13. The system according to claim 1, wherein the optic sensitive apparatus is an IR camera.

14. The system according to claim 13, wherein the IR camera is directed towards the screen and the finger-wearable device is not in a field of view of the IR camera.

15. The system according to claim 1, wherein any one of the first or second operating modes are associated with a half-press mechanism.

16. The system according to claim 1, wherein any one of the first and second input functionalities are selected from the group consisting of: typing text on a virtual keyboard, opening a mail application, opening and closing the virtual keyboard, and drawing a shape.

17. The system according to claim 1, wherein the force sensing actuator is further configured to communicate a level of pressure put on the force sensing actuator to the controller associated with the optic sensitive apparatus, and wherein the controller associated with the optic sensitive apparatus is configured to execute different actions based on the level of pressure.

18. The system according to claim 1, wherein a gentle level of pressure causes an execution of a computer mouse movement, and wherein a pressure level that is greater than the gentle level causes a drag-and-drop functionality.

19. The system according to claim 1, wherein the first one of the multiple operating modes comprises the pinching, and wherein the second one of the multiple operating modes comprises the touching.

20. The system according to claim 1, wherein the first one of the light sources is the IR laser, and wherein the second one of the light sources is the IR LED.

21. The system according to claim 1, wherein the IR laser is positioned such that it emits its IR beam substantially along a lateral axis of the finger-wearable device.

22. The system according to claim 8, wherein the finger-wearable device further comprises an RF receiver.

23. The system according to claim 9, wherein the controller that is associated with the optic sensitive apparatus is further configured to trigger a scrolling functionality in the host computer, wherein the scrolling is based on the motion of the thumb over the touch-sensitive electronic pad.

* * * * *